US009588536B2

(12) United States Patent
Uchikawa

(10) Patent No.: US 9,588,536 B2
(45) Date of Patent: Mar. 7, 2017

(54) POWER SUPPLY SYSTEM CONTROL METHOD FOR THE SAME, AND RECORDING MEDIUM

(71) Applicant: NEC Platforms, Ltd., Kanagawa (JP)

(72) Inventor: Takafumi Uchikawa, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 383 days.

(21) Appl. No.: 14/466,109

(22) Filed: Aug. 22, 2014

(65) Prior Publication Data

US 2015/0057827 A1 Feb. 26, 2015

(30) Foreign Application Priority Data

Aug. 22, 2013 (JP) ................................ 2013-171878

(51) Int. Cl.
*G06F 19/00* (2011.01)
*G05F 1/66* (2006.01)

(52) U.S. Cl.
CPC .................................... *G05F 1/66* (2013.01)

(58) Field of Classification Search
CPC ......... G05F 1/66; G05B 15/02; G06F 1/3296; H02J 1/10
See application file for complete search history.

(56) References Cited

U.S. PATENT DOCUMENTS 7,739,522 B2 * 6/2010 Festo .................... H03F 1/0205 330/199
8,456,149 B2 * 6/2013 Tokunaga ............ G01R 21/133 324/76.11
(Continued)

FOREIGN PATENT DOCUMENTS

JP 2005-291607 A 10/2005
JP 2011-022022 A 2/2011
(Continued)

OTHER PUBLICATIONS

Shao, Hui, Chi-Ying Tsui, and Wing-Hung Ki. "A micro power management system and maximum output power control for solar energy harvesting applications." Low Power Electronics and Design (ISLPED), 2007 ACM/IEEE International Symposium on. IEEE, 2007.*
(Continued)

*Primary Examiner* — Michael D Masinick
(74) *Attorney, Agent, or Firm* — Young & Thompson

(57) ABSTRACT

Is provided a power supply system optimizing a power conversion efficiency of its entire system, including at least one main power supply unit converting an input power into an output power supplied to a load; an auxiliary power supply unit including a power storage unit supplying an output power by the power storage unit to the load; a power measurement unit for measuring an output power from the main and auxiliary power supply units; and a power supply control unit for calculating an optimal output power in the main power supply unit maximizing its power conversion efficiency according to the output power measured by the power measurement unit and an optimal output power or charge power in the auxiliary power supply unit, controlling the main power supply unit based on the optimal output power, and controlling the auxiliary power supply unit based on the optimal output power or charge power.

10 Claims, 32 Drawing Sheets

(56) References Cited

U.S. PATENT DOCUMENTS

2006/0005055 A1* 1/2006 Potega .................. G06F 1/1632 713/300
2007/0194759 A1* 8/2007 Shimizu ................ H02J 7/0016 320/166
2009/0271642 A1* 10/2009 Cheng ..................... G06F 1/263 713/300
2010/0280774 A1* 11/2010 Ewing ...................... H04Q 9/00 702/60
2010/0281281 A1* 11/2010 Humphrey ............ G06F 1/3203 713/323
2012/0021704 A1* 1/2012 Chan .................... H03G 3/3042 455/95
2012/0066519 A1* 3/2012 El-Essawy ........... H05K 7/1492 713/300
2012/0216055 A1* 8/2012 Dumas ...................... G06F 1/26 713/320
2013/0342178 A1* 12/2013 Wang ........................ G05F 1/66 323/234
2015/0039152 A1* 2/2015 Uchikawa ........... H02J 13/0096 700/297
2015/0057827 A1* 2/2015 Uchikawa ................. G05F 1/66 700/297
2015/0180278 A1* 6/2015 Tsai ........................ H02J 9/061 307/23
2016/0239079 A1* 8/2016 Yuasa ................... G06F 1/3296

FOREIGN PATENT DOCUMENTS

JP 2013-504986 A 2/2013
WO 02-061917 A1 8/2002

OTHER PUBLICATIONS

Chao, Yuan-Hsin, et al. "A primary-side control strategy for series-parallel loosely coupled inductive power transfer systems." 2007 2nd IEEE Conference on Industrial Electronics and Applications. IEEE, 2007.*

* cited by examiner

POWER SUPPLY SYSTEM CONTROL METHOD FOR THE SAME, AND RECORDING MEDIUM

This application is based upon and claims the benefit of priority from Japanese Patent Application No. 2013-171878, filed on Aug. 22 2013, the disclosure of which is incorporated herein in its entirety by reference.

TECHNICAL FIELD

The present invention relates to a power supply system, and more specifically, to a power supply system including a main power supply unit and an auxiliary power supply unit (a sub power supply unit) and a technique of a control method and the like for the power supply system.

BACKGROUND ART

Over recent years, from interest in energy conservation, the reduction of power consumption in a variety of devices and efficiency improvement of a power supply system are being promoted. Also for a power supply apparatus such as an AC/DC conversion apparatus and the like mounted in a variety of devices, efficiency improvement of power conversion is needed. In a common power supply apparatus, efficiency characteristics of power conversion tend to vary with an output power (a magnitude of a load). In a low load region where the output power of the power supply apparatus is small, a consumption of power necessary to drive the power supply apparatus itself appears as lowering factors (a loss) of power conversion efficiency. On the other hand, in a high load region where the output power of the power supply apparatus is large, output current increases and therefore, a loss due to an impedance of a power conversion circuit in the power supply apparatus, and iron loss, copper loss, and the like appear as lowering factors.

In response to such variations of power consumption, improvement of power conversion efficiency of the entire power supply system is needed. To improve power conversion efficiency, there is known a technique for operating a main power supply unit using commercial power or the like as a main power supply source and an auxiliary power supply unit (a sub power supply unit) using a secondary battery as a power supply source in combination therewith. For example, related arts prior to the present application are disclosed in the following patent literature.

Patent literature 1 (WO 2002/061917) discloses a technique including a main power supply unit for outputting DC power using a commercial AC voltage and an auxiliary power supply unit for supplying power during power failure using a secondary battery. In the technique disclosed in the patent literature 1, output power from the auxiliary power supply unit is also supplied to a load during a time other than power failure according to power consumption consumed by a load.

Patent literature 2 (Japanese Laid-open Patent Publication No. 2005-291607) discloses a technique regarding a heat pump apparatus for supplying power to a load by combining a power generation unit using an engine and an external power supply using a secondary battery. Patent literature 2 discloses a technique for optimizing power generation efficiency in the power generation unit by controlling power supply from the external power supply and a charge power to the external power supply in the heat pump apparatus.

As a technique for improving power conversion efficiency in response to a variation of power consumption, a technique that changes the number of power supply apparatuses to be operated, and a technique that switches different types of power conversion apparatuses to be operated are known.

For example, Patent literature 3 (Japanese Translation of PCT International Application Publication No. 2013-504986) discloses a technique, for a power supply system including a plurality of power supply apparatuses being connected in parallel to a load, that the operation number of the power supply apparatuses is switched according to power consumption consumed by the load to prevent a decrease in a power conversion efficiency of the entire power supply system.

The power conversion efficiency is expressed by a ratio of an output power to an input power. In connection therewith, the applicant of the present application has proposed a method for calculating an input power by using a measurement of an output power, that is easily measurable, in Patent literature 4 (Japanese Laid-open Patent Publication No. 2011-022022).

SUMMARY

Technical Problem

The power supply systems including the main power supply unit and the auxiliary power supply unit using a secondary battery, disclosed in the aforementioned related arts, includes problems as described below.

When the secondary battery included in the auxiliary power supply unit is charged, the main power supply unit needs to supply additional power necessary for the charge to the auxiliary power supply unit. Therefore, compared with the case where power from the main power supply unit is simply supplied only to a load, power consumption of the entire system may be increased. As a result, power conversion efficiency in the entire power supply system may be decreased.

In a power supply system operated by switching a plurality of power supply apparatuses, from the viewpoint of optimizing power conversion efficiency between an input power and an output power, it is desirable to achieve an appropriate balance between the input power and the output power by adjusting output powers of the individual power supply apparatuses.

Accordingly, one of a main object of the present invention is to provide a power supply control system and the like, in which when at least one power supply unit that is a main power supply source and an auxiliary power supply unit using a secondary battery are connected as a single power supply system, output powers from the main power supply unit and the auxiliary power supply unit are adjusted so as to optimize a power conversion efficiency as the entire system.

Solution to Problem

To achieve the object, a power supply system according to one aspect of the present invention includes the following configuration. Specifically, the power supply system according to one aspect of the present invention includes: at least one main power supply unit that converts an input power into an output power and supplies the output power to a load; an auxiliary power supply unit that supplies an output power to the load, from a power storage unit capable of functioning as a power supply source; a power measurement unit, that is connected between output sides of the main power supply unit and the auxiliary power supply unit and the load, that measures an output power output by the main power supply unit and the auxiliary power supply unit; and a power supply control unit that calculates an optimal output power of the main power supply unit that maximizes a power conversion efficiency of the main power supply unit in a given output adjustment range for the main power supply unit in accordance with the output power measured by the power measurement unit, calculates an optimal output power or charge power of the auxiliary power supply unit based on the given output adjustment range, controls the main power supply unit based on the calculated optimal output power of the main power supply unit, and controls the auxiliary power supply unit based on the calculated optimal output power or charge power of the auxiliary power supply unit A control method for a power supply system according to one aspect of the present invention includes the following configuration. Specifically, the control method for a power supply system according to one aspect of the present invention includes: measuring an output power output from at least one main power supply unit that converts an input power into an output power and supplies the output power to a load, and an output power output from an auxiliary power supply unit including a power storage unit capable of functioning as a power supply source; calculating an optimal output power of the main power supply unit maximizing a power conversion efficiency in the main power supply unit in a given output adjustment range for the main power supply unit in accordance with the measured output power; calculating an optimal output power or charge power of the auxiliary power supply unit based on the given output adjustment range; controlling the main power supply unit based on the calculated optimal output power of the main power supply unit; and controlling the auxiliary power supply unit based on the calculated optimal output power or charge power of the auxiliary power supply unit.

A non-transitory computer-readable recording medium according to one aspect of the present invention includes the following configuration. Specifically, A non-transitory computer-readable recording medium according to one aspect of the present invention is recorded with a control program for a power supply system and causes a computer to execute: a processing that measures an output power output from at least one main power supply unit that converts an input power into an output power and supplies the output power to a load, and an output power output from an auxiliary power supply unit including a power storage unit capable of functioning as a power supply source; a processing that calculates an optimal output power of the main power supply unit maximizing a power conversion efficiency in the main power supply unit in a given output adjustment range for the main power supply unit in accordance with the measured output power; a processing that calculates an optimal output power or charge power of the auxiliary power supply unit based on the given output adjustment range; a processing that controls the main power supply unit based on the calculated optimal output power of the main power supply unit; and a processing that controls the auxiliary power supply unit based on the calculated optimal output power or charge power of the auxiliary power supply unit.

Effects of Invention

According to the present invention, output powers of a main power supply unit and an auxiliary power supply unit and a charge power for the auxiliary power supply unit are adjusted so as to optimize power conversion efficiency over an operating time as the entire power supply system in response to power consumption of a load.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, a detailed explanation will be given for a first exemplary embodiment with reference to the drawings.

First Exemplary Embodiment

Figure 1:
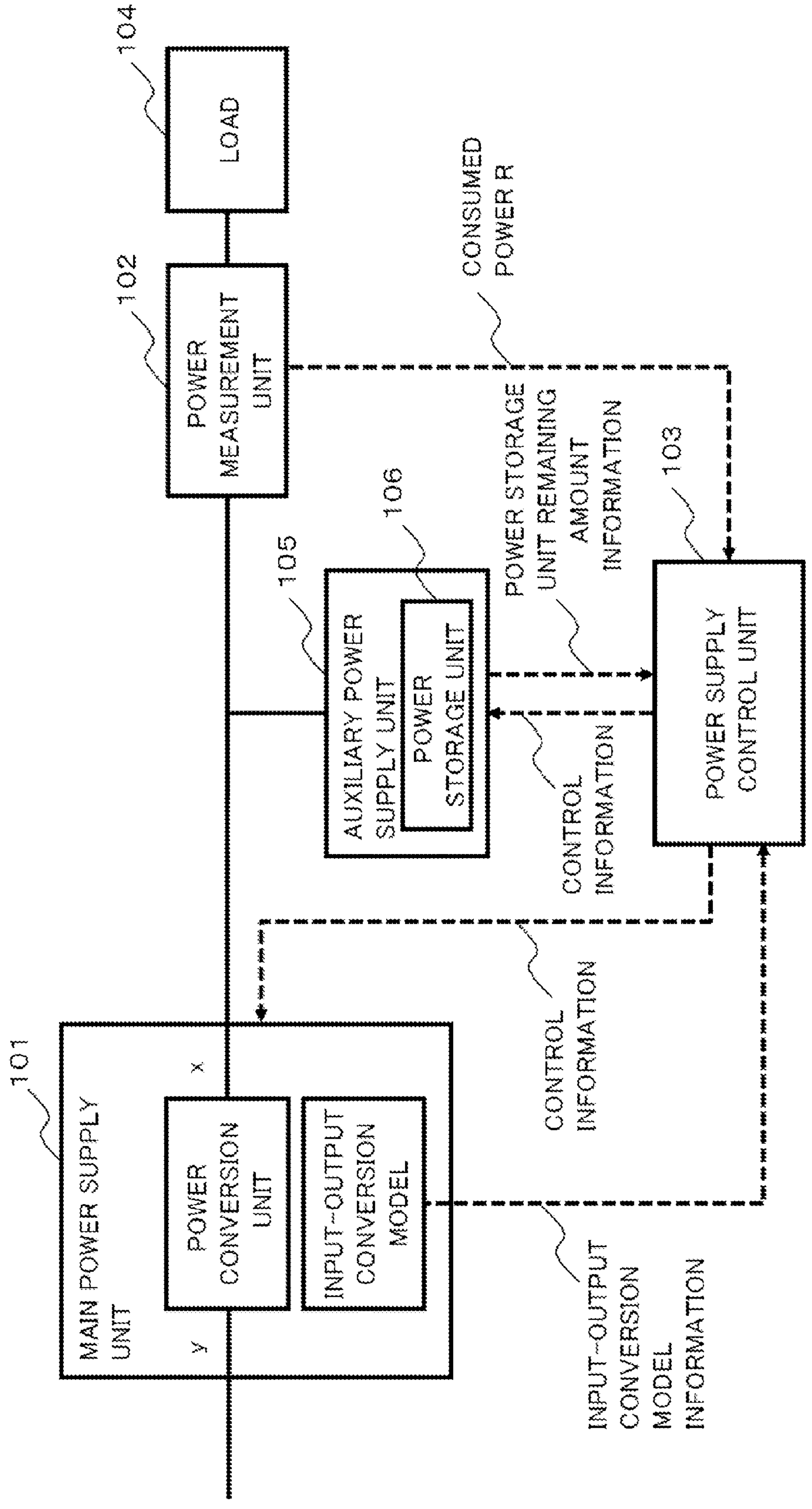
FIG. 1 is a block diagram illustrating a configuration of a power supply system in a first exemplary embodiment of the present invention.

A power supply system in a first exemplary embodiment of the present invention will be described with reference to FIG. 1. FIG. 1 is a block diagram illustrating a configuration of the power supply system in the first exemplary embodiment of the present invention. As illustrated in FIG. 1, the power supply system in the first exemplary embodiment of the present invention includes a main power supply unit 101, a power measurement unit 102, an auxiliary power supply unit 105 including a power storage unit (, such as secondary battery,) 106, and a power supply control unit 103. Outputs of the main power supply unit 101 and the auxiliary power supply unit 105 are integrated and are supplied to a load 104.

The main power supply unit 101 converts an input power, which is input from the outside of the power supply system, into a form suitable for the load 104 and supplies the converted input power as an output power to the load 104.

The main power supply unit 101 may be configured as a single power conversion circuit, or as a power conversion apparatus conforming to a control protocol such as Power Management Bus (PMBus) and the like.

As the input power, an arbitrary power supply source such as commercial AC power, or an Uninterruptible Power Supply (UPS), and the like may be employed. As the power conversion circuit in the main power supply unit, for example, a double forward circuit or a full bridge circuit may be employed.

In the main power supply unit 101, an input-output conversion model modeling a conversion relationship between input power and output power, is set. A setting region for setting the input-output conversion model may be arbitrarily configured according to specifications and a configuration of the power supply unit 101. For example, a non-volatile memory such as a flash memory and the like may be mounted to the power supply unit 101, and in a production stage prior to shipment, a maintenance stage after shipment, or the like, the input-output conversion model may be stored within the memory region, of the non-volatile memory, by using an appropriate tools. The input-output conversion model will be described in detail later.

The power measurement unit 102 is connected to the output sides of the main power supply unit 101 and the auxiliary power supply unit 105 to measure a total output power. As a measurement method for power, the same or similar method as for a common power meter is employable. Therefore, description about the measurement method for power is omitted in the present embodiment.

The power supply control unit 103 adjusts output powers of the main power supply unit 101 and the auxiliary power supply unit 105 and a charge power for the auxiliary power supply unit 105 so as to maximize a power conversion efficiency of the entire power supply system according to the present embodiment, based on the output power measured in the power measurement unit 102.

The power supply control unit 103 may be implemented by dedicated control hardware. The power supply control unit 103 may also be implemented by hardware including general-purpose Central Processing Unit (CPU) and memory and the like (each not illustrated), and a variety of software programs (computer programs) executed by the CPU.

The power supply control unit 103 and the main power supply unit 101 are communicatably connected so as to transmit and receive input-output conversion model (or input-output conversion model information) of the main power supply unit 101, an output voltage, and a variety of control signals.

In the same manner, the power supply control unit 103 and the auxiliary power supply unit 105 are also communicatably connected so as to transmit and receive remaining amount information (residual capacity) of the power storage unit 106 included in the auxiliary power supply unit 105 and a charge-discharge control signal to the auxiliary power supply unit 105.

The power supply control unit 103 and the power measurement unit 102 are communicatably connected so as to transmit and receive measurement data in the power measurement unit 102 and a variety of control signals. For the communication paths for these connections, an arbitrary communication path such as Inter-Integrated Circuit (I2C), System Management Bus (SMBus), and the like is usable. As a communication protocol, an arbitrary protocol such as a PMBus protocol and the like is applicable. Such a communication path and a protocol are appropriately selectable according to the configuration of the power supply system.

The auxiliary power supply unit 105 includes the power storage unit 106 as a power supply source and converts power stored in the power storage unit 106 into a form suitable for the load 104, to supply the converted power as an output power. The auxiliary power supply unit 105 may include a charge-discharge circuit for the power storage unit 106. When including such a charge-discharge circuit, the auxiliary power supply unit 105 charges and discharges the power storage unit 106 in accordance with a control signal from the power supply control unit 103.

When DC power is supplied from the power supply unit 106, the auxiliary power supply unit 105 may include a direct current/alternate current conversion circuit (a DC/AC conversion circuit) or a direct current/direct current conversion circuit (a DC/DC conversion circuit) to supply the output power suitable for the load 104.

The power storage unit 106 is a secondary battery capable of storing a predetermined amount of power. For the power storage unit 106, a secondary battery having an appropriate capacity and performance may be employed by taking power consumption at a load into account.

In the power supply system in the present embodiment, as the power storage unit 106, a secondary battery capable of supplying a rated maximum output of the main power supply unit 101 for a predetermined period of time or more is employed.

The main power supply unit 101, the auxiliary power supply unit 105, the power measurement unit 102, and the power supply control unit 103 may be configured as hardware independent of each other. These units may be configured as combinations of hardware and a software program where a part of the functions are executed by the hardware.

Figure 2:
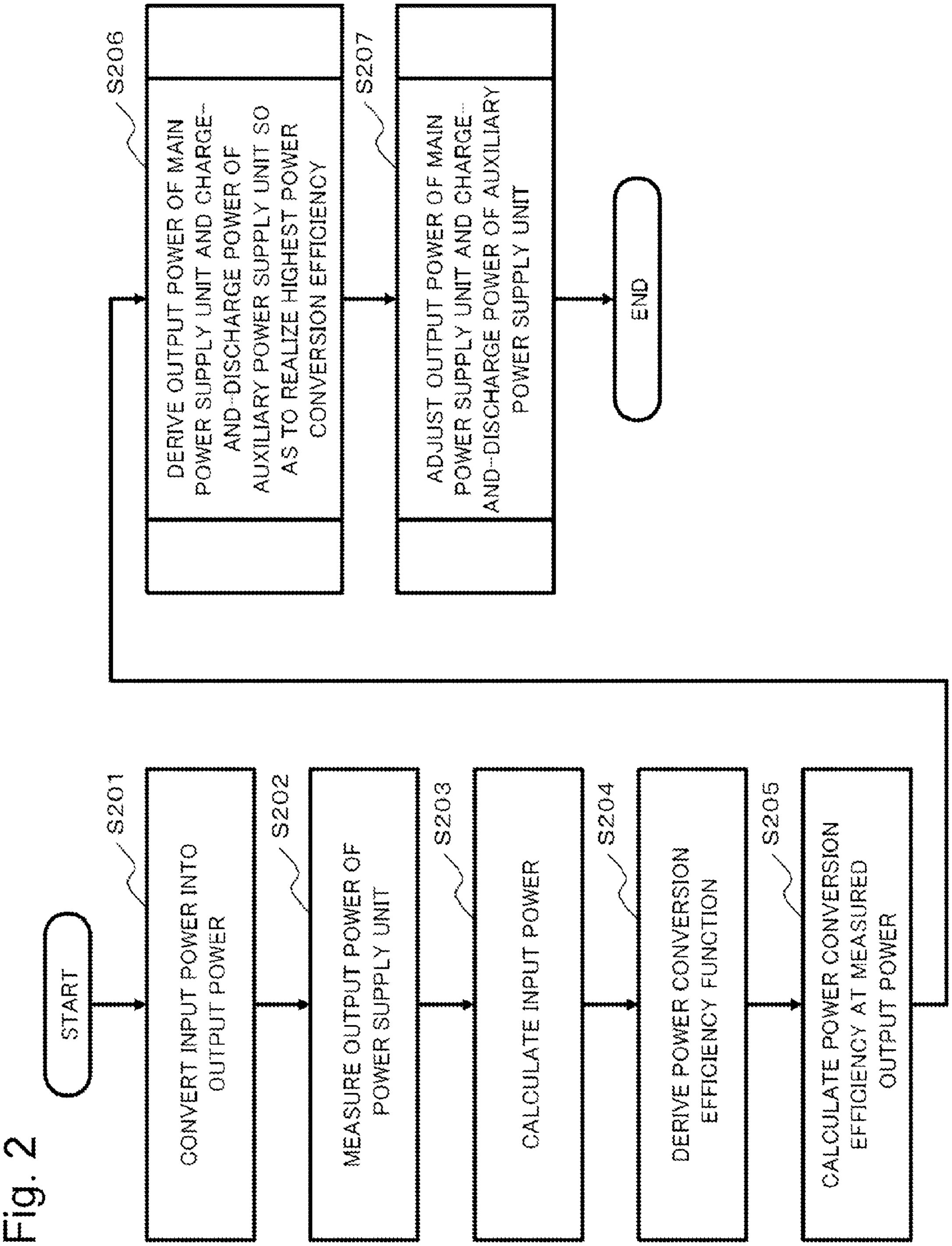
FIG. 2 is a flowchart illustrating an operation of the power supply system in the first exemplary embodiment of the present invention.

Next, an operation of the power supply system according to the present embodiment will be described by referring to FIG. 2 and FIG. 3. FIG. 2 is a flowchart illustrating an operation of the power supply system in the first exemplary embodiment of the present invention.

Initially, the main power supply unit 101 converts an input power γ, input from the outside of the power supply system, into a form suitable for the load 104 to output the output power x (step S201). The main power supply unit 101 may execute arbitrary conversion processing such as voltage conversion, AC/DC conversion, and the like according to the load 104. In the present embodiment, in the main power supply unit 101, an input-output conversion model, modeling conversion between input power and output power, is set.

When the input power is represented as y and the output power is represented as x, regarding the main power supply unit 101, a conversion model of input power and output power in the present embodiment is represented as the following Eq. (1).

$$y=f(x) \tag{1}$$

As represented in Eq. (1), the input-output conversion model in the present embodiment may derive an input power from an output power. As the input-output conversion model, an appropriate model may be selectable (applicable) according to specifications of the power supply unit. For example, as the input-output conversion model f, a function defining a conversion relationship between the input power y and the output power x of the power supply unit may be selectable. Also, as the input-output conversion model f, a conversion table regarding the output power x and the input power y may be also selectable.

Then, the power measurement unit 102 measures power consumption R resulting from the load 104 (step S202). In the present embodiment, all the output power of the main power supply unit 101 is supplied to the load 104. Therefore, the power consumption R in the load 104 is represented by the following Eq. (2).

$$R=X \tag{2}$$

Using the input-output conversion model, the power supply control unit 103 calculates the input power to the main power supply unit 101 from the power consumption at the load measured by the power measurement unit 102 by using Eq. (1) (step S203).

The power supply control unit 103 derives a calculation function of a power conversion efficiency E from the input-output conversion model (step S204). The power conversion efficiency is represented as E=x/y using the input power y and the output power x. Therefore, the calculation function of power conversion efficiency is represented by the following Eq. (3).

$$E=\frac{x}{y}=\frac{x}{f(x)} \tag{3}$$

In view of controlling charge-and-discharge in the auxiliary power supply unit 105, the calculation function of power conversion efficiency may be derived as represented in the following Eq. (4). In the present embodiment, Eq. (4) is employed as the calculation function of power conversion efficiency.

$$\begin{cases} E=\frac{x}{y}=\frac{x}{f(x)} & (\text{where } x>0 \text{ and } E>0) \\ x=0,\ E=1 & (\text{where } x\leq 0 \text{ or } E\leq 0) \end{cases} \tag{4}$$

The power supply control unit 103 calculates a power conversion efficiency E(X=R) from Eq. (4) using the power consumption R at the load measured in the power measurement unit 102 and the input power to the main power supply unit 101 calculated in step S203 (step S205).

$$E(X=R)=\frac{R}{y}=\frac{R}{f(R)} \quad (5)$$

The power supply control unit 103 derives the output power of the main power supply unit 101 and the charge-and-discharge power of the auxiliary power supply unit 105 so as to realize the highest power conversion efficiency of the entire power supply system, based on the power conversion efficiency E (X=R) calculated in step S205 and Eq. (3) (step S206). Processing in step S206 will be described in detail later.

Thereafter, the power supply control unit 103 controls the output power of the main power supply unit 101 and a charge-and-discharge power of the auxiliary power supply unit 105 based on the output power of the main power supply unit 101 and the charge-and-discharge power of the auxiliary power supply unit 105 calculated in step S206 (step S207). Processing in step S207 will be described in detail later.

Next, processing in step S206 will be described.

The power supply control unit 103 calculates a power conversion efficiency, when the output power X varies in a region where R−β≤X≤R+α is satisfied, in which a given lower limit is defined as $R_m$=R−β and a given upper limit is defined as $R_M$=R+α, by referring the power consumption R measured by the power measurement unit 102.

In other words, the power supply control unit 103 controls the output power (X) so as to be X=R+ϕ(−β≤ϕ≤α), by using a given adjustment value ϕ (−β≤ϕ≤α) according to the power consumption R measured by the power measurement unit 102. Hereafter, the output power X may be represented as first output power, and the output power X=R+ϕ is represented as second output power, and ϕ may be represented as adjustment value.

With respect to the output power X=R+ϕ, the power supply control unit 103 calculates ϕ which maximizes the power conversion efficiency represented by Eq. (3) within a given output adjustment range (−β≤ϕ≤α). In the present embodiment, as α, an optimal charge power value, for the power storage unit 106 included in the auxiliary power supply unit 105, is employed.

The power supply control unit 103 controls the charge power for charging the auxiliary power supply unit 105 with the charge power α at ϕ=α (constant) regarding a region where 0<ϕ≤α is satisfied. As for the optimal charge power value a for the power storage unit 106, an appropriate value may be used as α, according to a type and performance of the power storage unit 106.

In the present embodiment, a value of the maximum output power of the auxiliary power supply unit 105 is employed as β. The maximum output power β of the auxiliary power supply unit 105 may be arbitrarily set in a range of the rated maximum output power of the power storage unit 106. The power supply control unit 103 controls the auxiliary power supply unit 105 to output the output power γ (−β≤γ<0) in a region of −β≤ϕ<0. A concrete adjustment manner of a value of β will be described later.

The aforementioned operation of the power supply control unit 103 will be described by referring to FIG. 3.

Figure 3:
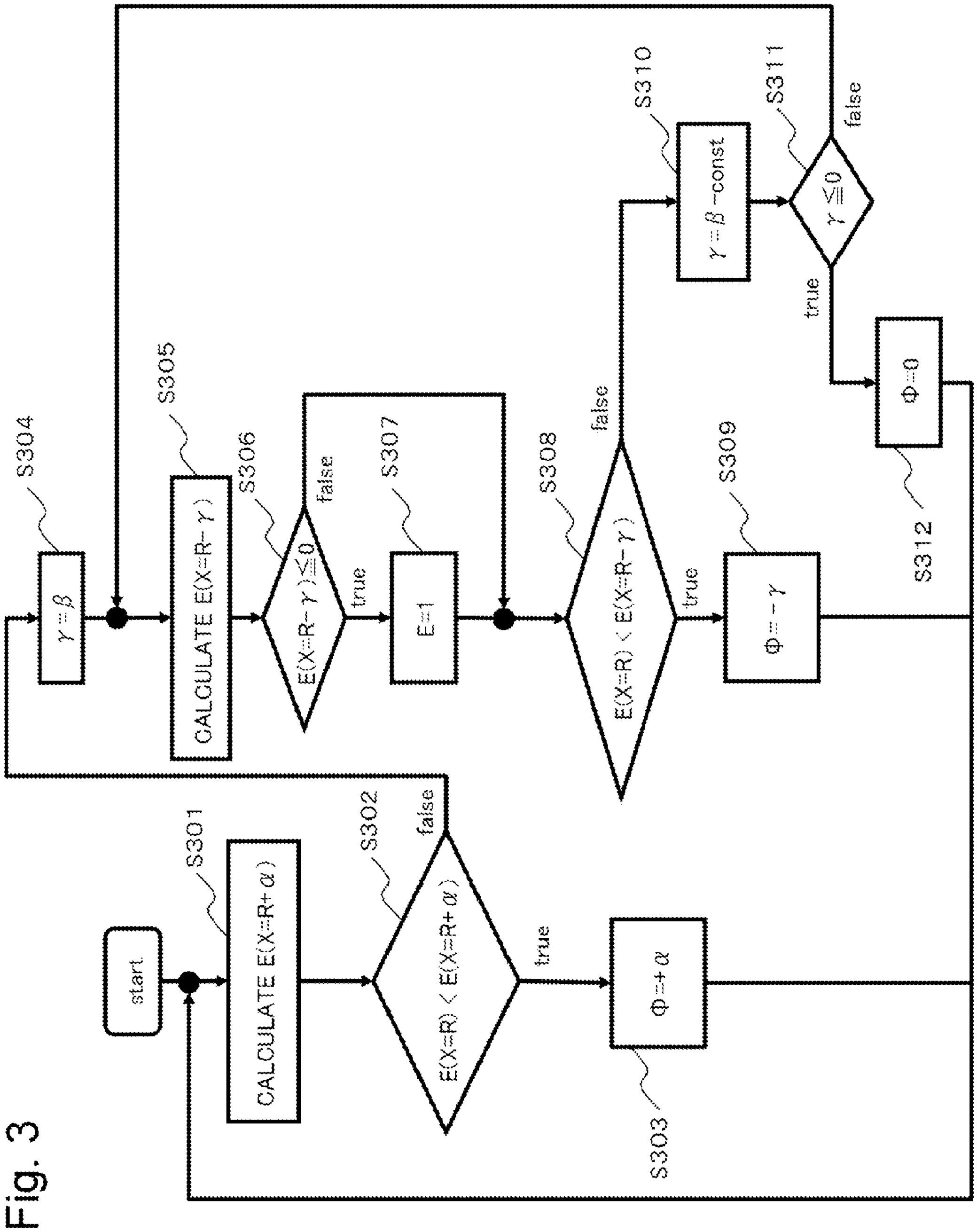
FIG. 3 is a flowchart illustrating a process of deriving an output power in a main power supply unit, and a charge-and-discharge power in an auxiliary power supply unit according to the first exemplary embodiment of the present invention.

FIG. 3 is a flowchart illustrating a process of calculating the output power of the main power supply unit 101 and a charge-and-discharge power of the auxiliary power supply unit 105, in the power supply control unit 103. The power supply control unit 103 calculates a power conversion efficiency E (X=R+α) from Eq. (5) in which the output power of the main power supply unit 101 is defined as X=R+α (step S301) and compares the calculated efficiency with the power conversion efficiency E (X=R) calculated in step S205 in FIG. 2 as described above (step S302). Hereafter, the power conversion efficiency E (X=R) may be represented as a first power conversion efficiency, and the power conversion efficiency E (X=R+α) may be represented as a second power conversion efficiency.

As a result of the comparison, when a condition E (X=R+α)>E (X=R) is true, the power supply control unit 103 controls an adjustment value ϕ to be ϕ=α (step S303).

When the comparison result in step S302 is false, the power supply control unit 103 controls γ to be γ=β (step S304) and then calculates a power conversion efficiency E (X=R−γ) from Eq. (5) (step S305).

Then, the power supply control unit 103 confirms whether the calculated power conversion efficiency satisfies E (X=R−γ)≤0 (step S306).

When the result of step S306 is true, the power supply control unit 103 controls the conversion efficiency to be E=1 from Eq. (4) (step S307). In this case, the power supply control unit 103 may control the output power from the main power supply unit 101 to be 0.

The power supply control unit 103 compares the power conversion efficiency E (X=R−γ) with the power conversion efficiency E (X=R) calculated in step S205 in FIG. 2 (step S308) and controls the adjustment value ϕ to be ϕ=−γ when a condition E (X=R−γ)>E (X=R) is true (step S309).

When the comparison result in step S308 is false (the condition is false), the power supply control unit 103 subtracts a given constant "const" (shown in FIG. 3) from a value of γ (step S301) and confirms whether γ≤0 is satisfied (step S311).

When the comparison result of step S311 is true, the power supply control unit 103 controls the adjustment value ϕ to be ϕ=0 (no adjustment for the output power) (step S312).

When the comparison result of step S309 is false, the power supply control unit 103 executes steps from step S305.

In the processing described above, the power supply control unit 103 searches for an optimal value of γ, that increases the power conversion efficiency, by setting initial value β to γ (step S304), and gradually setting smaller value to γ (step S310). Although, the present embodiment is not limited to the processing described above.

For example, the power supply control unit 103 in the present embodiment may search for a value of γ that increases power conversion efficiency by gradually setting larger value to γ within a range of up to β, where an initial value of γ is set to be 0.

The aforementioned operation of the power supply control unit 103 will be further described with reference to FIG. 4.

Figure 4:
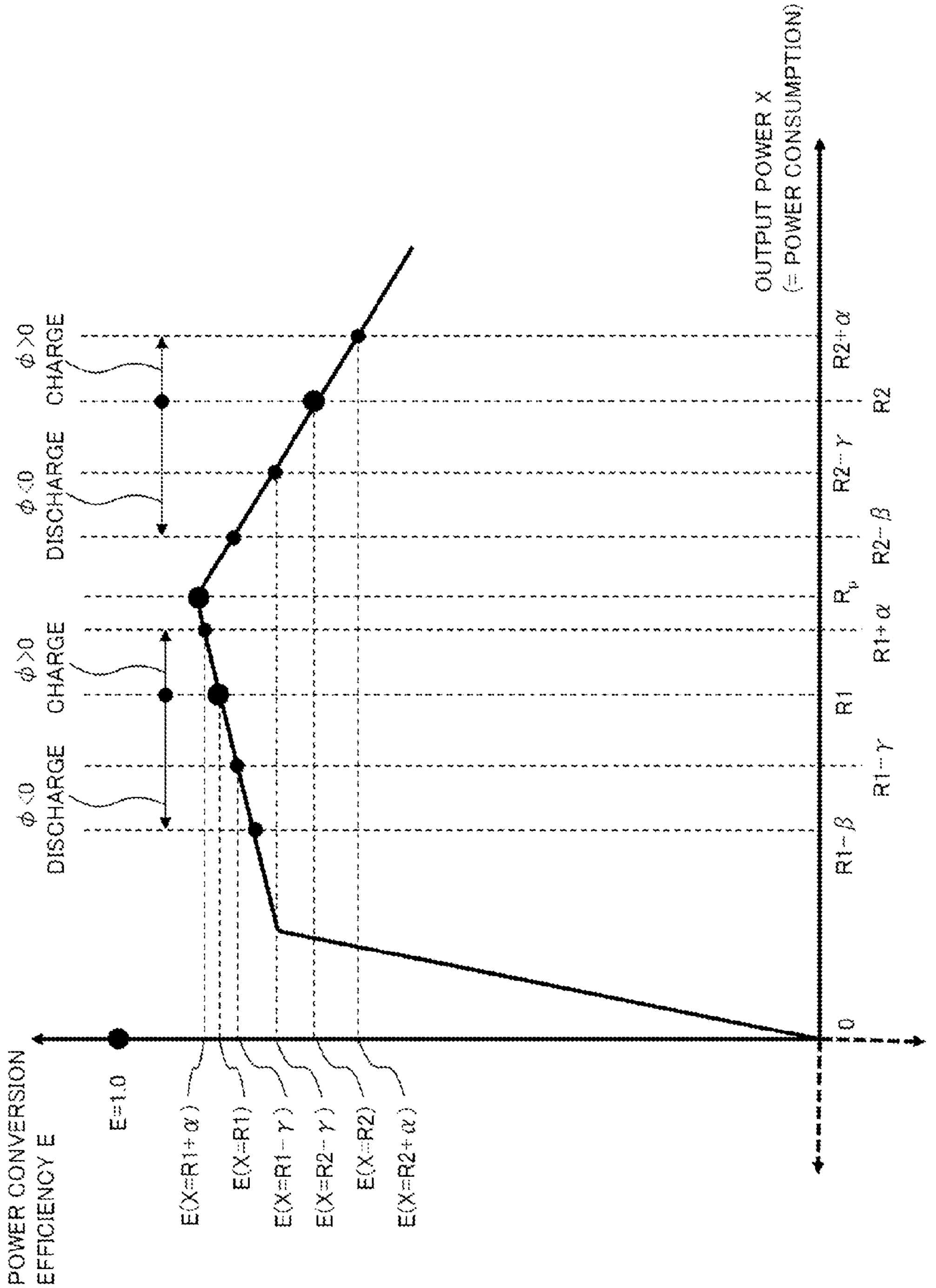
FIG. 4 is a schematic view of an efficiency curve of power conversion illustrating a relationship between output power in the main power supply unit according to the first exemplary embodiment of the present invention and power conversion efficiency.

FIG. 4 is a schematic view of a power conversion efficiency curve illustrating a relationship between the output power X (=power consumption) in the main power supply unit 101 and the power conversion efficiency E in the main power supply unit. The efficiency curve of power conversion illustrated in FIG. 4 corresponds to the calculation function of power conversion efficiency represented in Eq. (4).

As illustrated in FIG. 4, when power consumption at a load measured by the power measurement unit 102 is R1, a relationship: E (X=R1−γ:−β≤γ<0)<E (X=R1)<E (X=R1+α) is established. In other words, when the output power of the main power supply unit 101 is set to be X=R1+α, and α represents a charge power for the auxiliary power supply unit 105, the output power of the main power supply unit 101 is increased by a value of a but the power supply efficiency of the entire system is improved, compared with the case of only supplying a power R1 to the load. In this case, the power storage unit 106 (included in auxiliary power supply unit 105) is charged with charge power α which corresponds to the given adjustment value ϕ in the output power (X=R1+ϕ).

In the same manner, when power consumption at the load measured by the power measurement unit 102 is R2, a relationship: E (X=R2+α)<E (X=R2)<E (X=R2−γ:−β≤γ<0) is established. In other words, when the output power of the main power supply unit 101 is set to be X=R2−γ and γ represents the output power from the auxiliary power supply unit 105, the output power of the main power supply unit 101 is decreased by a value of γ and also the power supply efficiency of the entire system is improved, compared with the case of supplying the power R2 to the load by the main power supply unit 101 only.

Figure 5:
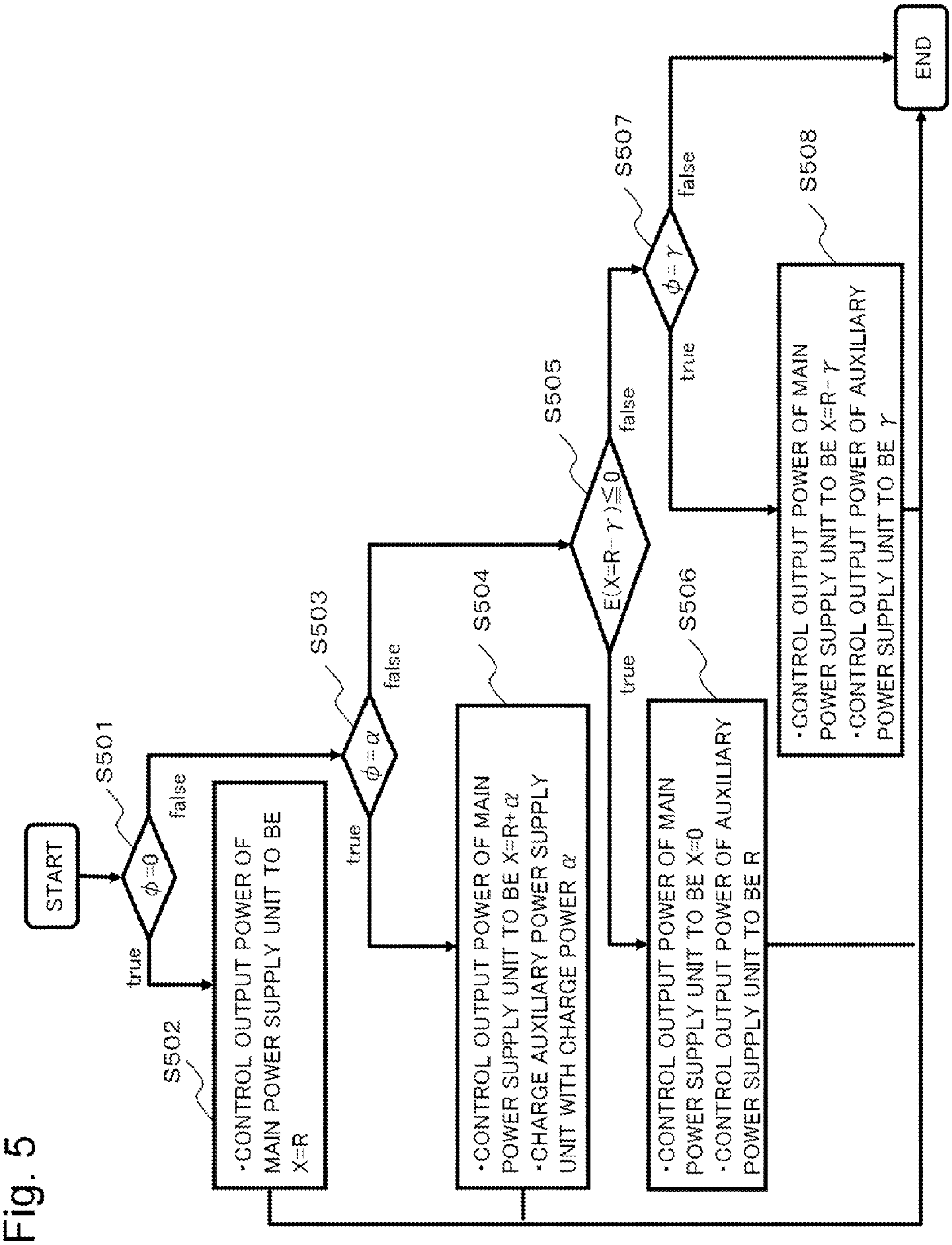
FIG. 5 is a flowchart illustrating a process of controlling an output power of the main power supply unit, and the charge-and-discharge power of the auxiliary power supply unit in a power supply control unit according to the first exemplary embodiment of the present invention.

Next, processing in step S207 will be described with reference to FIG. 5. FIG. 5 is a flowchart illustrating a process of controlling the output power of the main power supply unit 101, and a charge-and-discharge power of the auxiliary power supply unit 105 in the power supply control unit 103.

As described above, the power supply control unit 103 calculates power conversion efficiency when the output power varies in a given range (−β≤ϕ≤α), based on the power consumption R at the load measured in the power measurement unit 102 (step S206 in FIG. 2). Then, the power supply control unit 103 controls the output power of the main power supply unit 101 and a charge-and-discharge power of the auxiliary power supply unit 105 so as to realize the highest (optimal) power conversion efficiency.

Initially, the power supply control unit 103 refers to ϕ calculated in step S206 and, when the ϕ is 0 (true in step S501), controls the output power of the main power supply unit 101 to be X=R (step S502).

When the determination result in step S501 is false, the power supply control unit 103 determines whether ϕ=α is satisfied (step S503). When the determination result in step S503 is true, the power supply control unit 103 controls the main power supply unit 101 to additionally output a power corresponding to an adjustment value a in addition to the power consumption R at the load (step S504).

The power supply control unit 103 performs control for charging the auxiliary power supply unit 105 with the additional output power corresponding to the a as a charge power for the auxiliary power supply unit 105 (step S504).

When the determination result in step S503 false, the power supply control unit 103 determines whether E (X=R−γ)≤0 is satisfied (step S505).

When the determination result in step S505 is true (E(X=R−γ)≤0 is satisfied), the power supply control unit 103 controls the auxiliary power supply unit 105 to output a power corresponding to the power consumption R (step S506). In this case, the power supply control unit 103 may control the main power supply unit 101 to stop to cause the output power from the main power supply unit 101 to be 0.

When the determination result in step S505 is false, the power supply control unit 103 determines whether ϕ=γ is satisfied (step S507).

When the determination result in step S507 is true (ϕ=γ is satisfied), the power supply control unit 103 controls the main power supply unit 101 to output a power X=R−γ that is smaller than the power consumption R at the load by a power corresponding to the adjustment value γ.

The power supply control unit 103 controls the auxiliary power supply unit 105 to output the power corresponding to γ (step S508). The power supply control unit 103 may select an appropriate control method for output powers of the main power supply unit 101 and the auxiliary power supply unit 105 such as output voltage control, output current control, and the like, based on specifications and configurations of the main power supply unit 101 and the auxiliary power supply unit 105. When, for example, the main power supply unit 101 is an AC/DC converter of a switching type, the power supply control unit 103 may control the output voltage. Also as for the auxiliary power supply unit 105, when a DC/DC converter is included therein, the power supply control unit 103 may control the output voltage.

Figure 6:
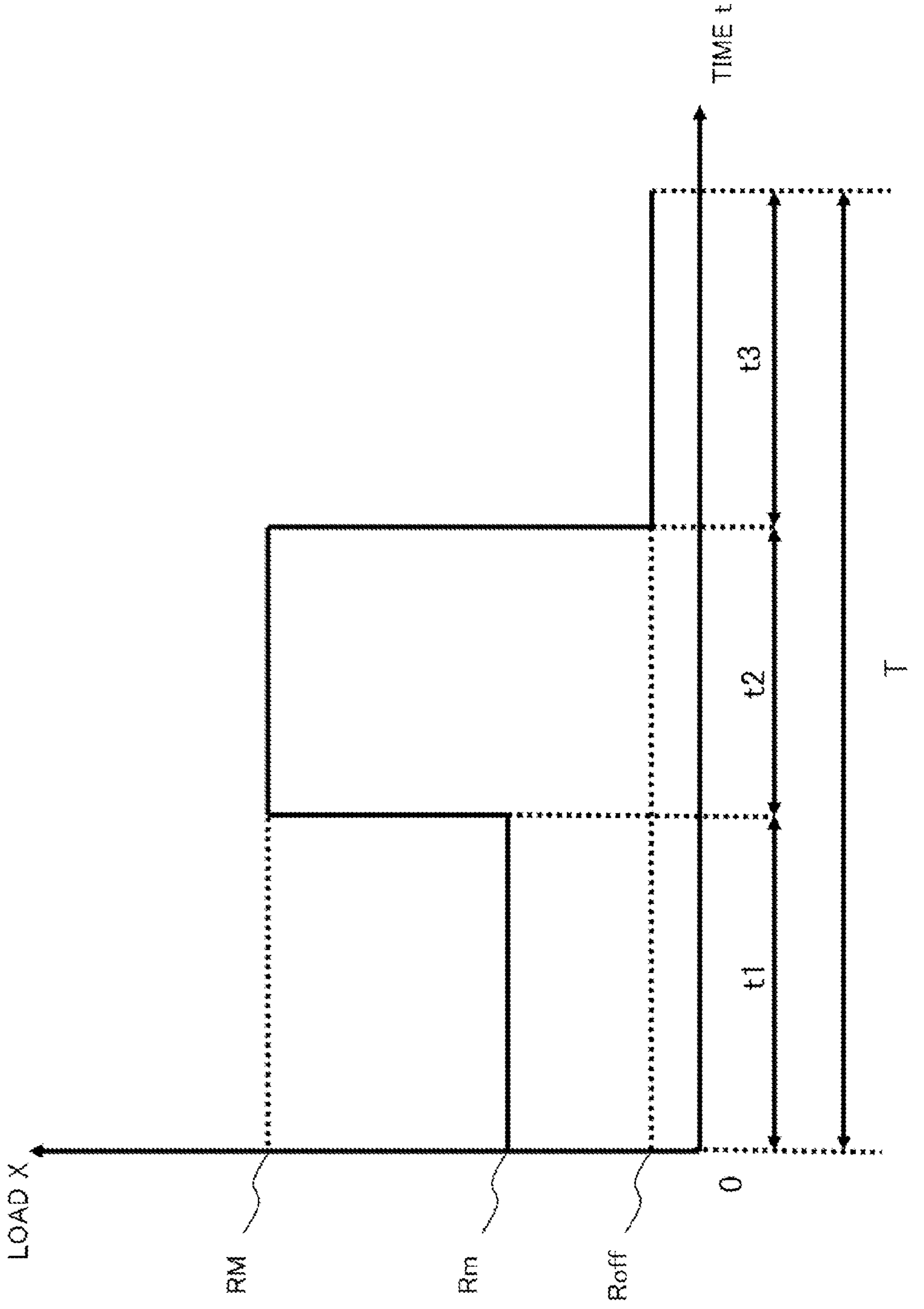
FIG. 6 is a schematic view of a time chart illustrating variations in power consumption at a load with respect to the operating time of the power supply system.
Figure 7:
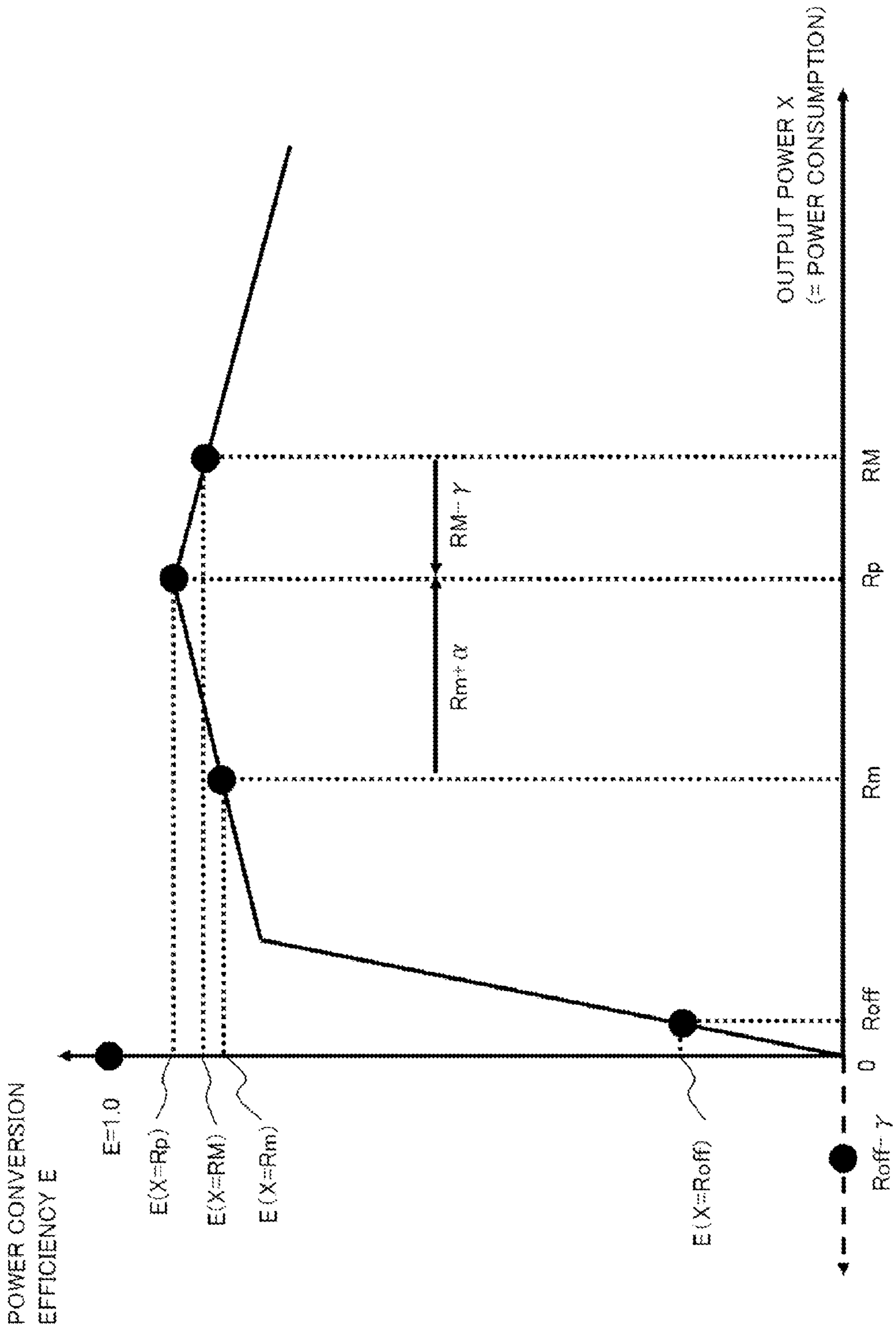
FIG. 7 is a schematic view of an efficiency curve of power conversion illustrating a relationship between output power in a main power supply unit and power conversion efficiency.

Effects of the present embodiment according to the present embodiment described above will be described with reference to FIG. 6 and FIG. 7. FIG. 6 is a schematic view of a time chart illustrating variations in power consumption at the load 104 with respect to an operating time (t) of a power supply system. FIG. 7 is a schematic view of an efficiency curve of power conversion illustrating a relationship between the output power X of the main power supply unit 101 (=consumed power) and the power supply efficiency E in the same manner as in FIG. 4.

As illustrated in the time chart of FIG. 6, it is assumed that, for example, power consumption at the load is Rm in a time range of 0≤t≤t1, power consumption at the load is RM in a time range of t1<t≤t1+t2, and power consumption at the load is Roff in a time range of t1+t2<t≤t2+t3.

As illustrated in FIG. 7, it is assumed that a peak value Rp realizing the highest power conversion efficiency exists between Rm and RM, and it is also assumed that Roff−y<0 is satisfied. Roff corresponds to a standby power when an operation of the load has stopped. To describe the effects of the present embodiment according to the present embodiment, it is assumed that RM+α=Rp and RM−γ=Rp are satisfied.

Referring to FIG. 6, when in a certain period of time of 0≤t≤t1+t2+t3, no charge-discharge control in the auxiliary power supply unit 105 is performed and power consumption is supplied to the load 104 by the main power supply unit 101 only, power consumption P1 is represented by Eq. (6).

$$P1 = \frac{Rm * t1}{E(X = Rm)} + \frac{RM * t2}{E(X = RM)} + \frac{Roff * t3}{E(X = Roff)}, \qquad (6)$$

where "*" means multiplication hereinafter.

Then, as described in the present embodiment, when the output power in the main power supply unit 101 and a charge-and-discharge power in the auxiliary power supply unit 105 are controlled, power consumption P2 is represented by Eq. (7).

$$P2 = \frac{Rp * (t1 + t2)}{E(X = Rp)} \qquad (7)$$

In the present embodiment, the power supply control unit 103 controls the output power of the main power supply unit 101 and a charge-and-discharge power of the auxiliary power supply unit 105 so as to realize the highest (optimal) power conversion efficiency in the entire power supply system, in accordance with the aforementioned processing in the present embodiment.

In other words, in a time range of $0 \le t \le t1$, the power supply control unit 103 controls the output power of the main power supply unit 101 to be Rp (=Rm+α) and controls the auxiliary power supply unit 105 to be charged with a power α. As a result, the load 104 is supplied with a power Rm.

Then, in a time range of $t1 < t \le t1+t2$, the power supply control unit 103 controls the output power of the main power supply unit 101 to be Rp (=RM−γ) and controls the auxiliary power supply unit 105 to supply the output power γ. As a result, the load 104 is supplied with a power RM.

Then, in a time range of $t1+t2 < t \le t1+t2+t3$, the power supply control unit 103 controls the main power supply unit 101 to stop to supply no output power and controls the auxiliary power supply unit 105 to supply the output power Roff. As a result, the power supply control unit 103 can keep the main power supply unit 101 in a condition of high power conversion efficiency for a majority of the operating time. In a region where the power conversion efficiency of the main power supply unit 101 decreases, by combining charge-and-discharge in the auxiliary power supply unit 105, the power supply control unit 103 is able to keep the entire power supply system in a condition of high power conversion efficiency.

As described above, in the power supply system in the present embodiment, the power supply control unit 103 controls the main power supply unit 101 and the auxiliary power supply unit 105, which includes a control for not only the output power of the main power supply unit 101 but also a charge-and-discharge power in the auxiliary power supply unit 105, so that the entire power supply system can be held in a high power conversion efficiency condition.

Therefore, in the power supply system in the present embodiment, even when power consumption of the entire power supply system increases to charge the auxiliary power supply unit 105, the entire power supply system can be held in a high power conversion efficiency condition.

In addition, in a load region where the power conversion efficiency of the main power supply unit 101 is low, the power supply control unit 103 performs control for supplying an auxiliary power using power charged in the auxiliary power supply unit 105. Therefore, the power supply system in the present embodiment realizes optimization of power conversion efficiency over an operating time of the entire power supply system.

In the power supply system in the present embodiment, a charge power for the auxiliary power supply unit 105 is set to be constant (as a), but the present invention is not limited thereto. In the power supply system in the present embodiment, the charge power may also be controlled as a variable.

Second Exemplary Embodiment

Next, a second exemplary embodiment of the present invention based on the first exemplary embodiment of the present invention described above will be described with reference to FIG. 8. In the following description, characteristic configurations according to the present embodiment will be mainly described. In the description, the same reference number will be assigned to the same configuration as in the first exemplary embodiment for omitting overlapping description.

Figure 8:
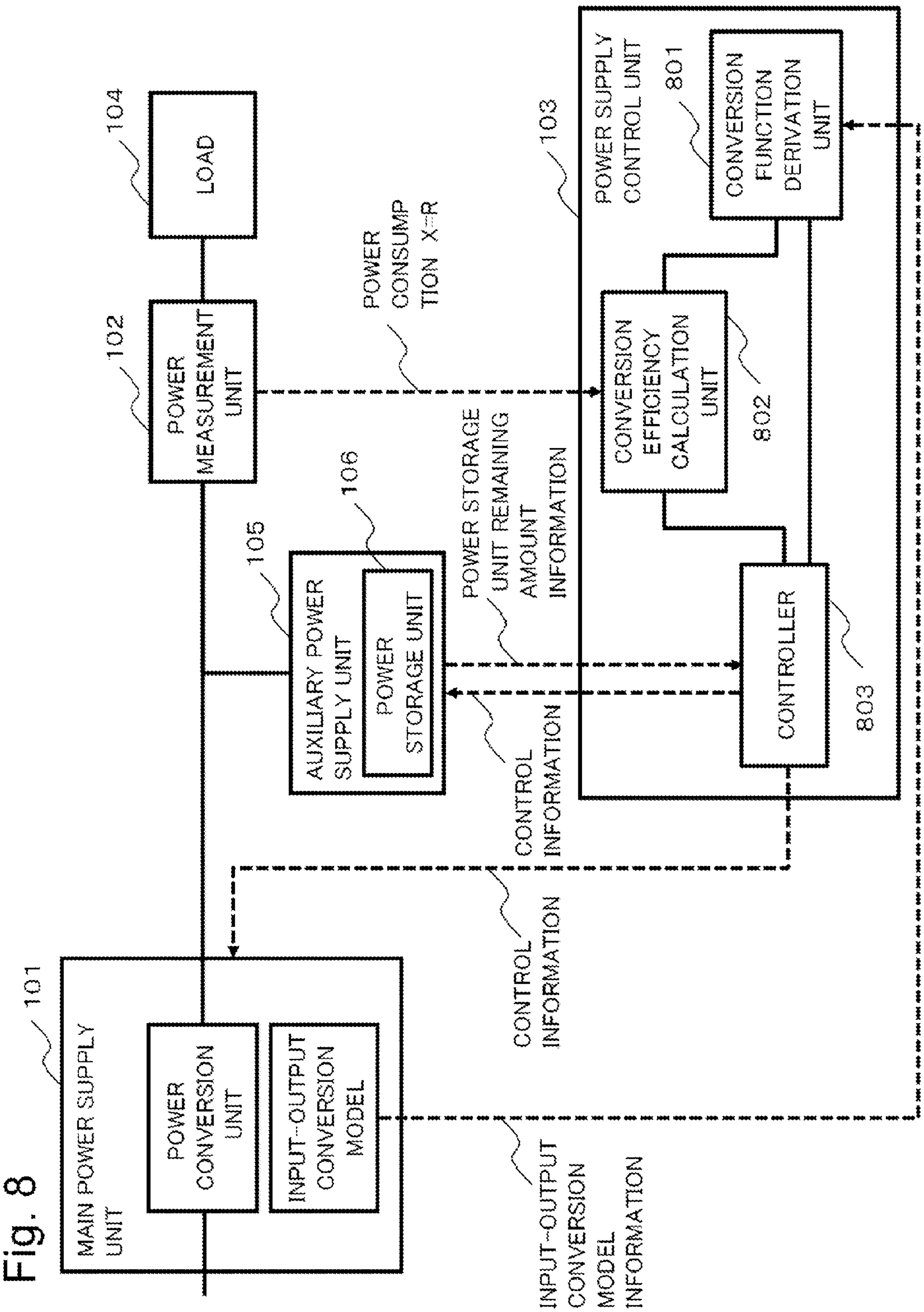
FIG. 8 is a diagram illustrating a configuration of a power supply system in a second exemplary embodiment of the present invention.

FIG. 8 is a diagram illustrating a configuration of a power supply system in the second exemplary embodiment of the present invention. In the same manner as in the first exemplary embodiment described above, the power supply system in the second exemplary embodiment of the present invention includes, as illustrated in FIG. 8, the main power supply unit 101, the power measurement unit 102, the auxiliary power supply unit 105 including the power storage unit 106, and the power supply control unit 103. Outputs of the main power supply unit 101 and the auxiliary power supply unit 105 are integrated to be supplied to the load 104.

In the present embodiment, for the main power supply unit 101, the input-output conversion model represented by Eq. (1) is set. Hereinafter, the input-output conversion model proposed in the present embodiment will be described.

In the input-output conversion model, a process of converting an input power into the output power is modeled. Therefore, the power supply system in the present embodiment employs a model capable of expressing a phenomenon occurring in an actual input-output conversion process as the input-output conversion model.

By considering a relationship between an input power Y and the output power X with respect to the power supply unit, a relationship: Y (input power)=X(output power)+L (loss generated in the power supply unit) is established. The loss generated in the power supply unit generally includes: iron loss generated inside a transformer, copper loss generated in wiring of a variety of power supply circuits and copper wire portions of a transformer or the like, Joule heat generated by an impedance of the power supply circuits, and a drive power of a power supply unit itself of an LED (Light Emitting Diode) or a control circuit, or the like.

In general, when the output voltage of a power supply unit is maintained to be constant, an iron loss and a drive power of the power supply unit itself are substantially constant. In addition, when the output voltage of the power supply unit is maintained to be constant, a loss due to a circuit impedance is proportional to the output power. Also, when the output voltage of the power supply unit is maintained to be constant, a copper loss is proportional to the square of the output power. Therefore, a loss generated in a power supply unit may be approximated, as represented by the following Eq. (8), by using the sum of a component proportional to the square of the output power, a component linearly proportional to the output power, and a constant component. In Eq. (8), L represents a loss, X represents the output power, and A, B, and C represent unique coefficients of a power supply unit.

$$L=AX^2+BX+C \tag{8}$$

Figure 30:
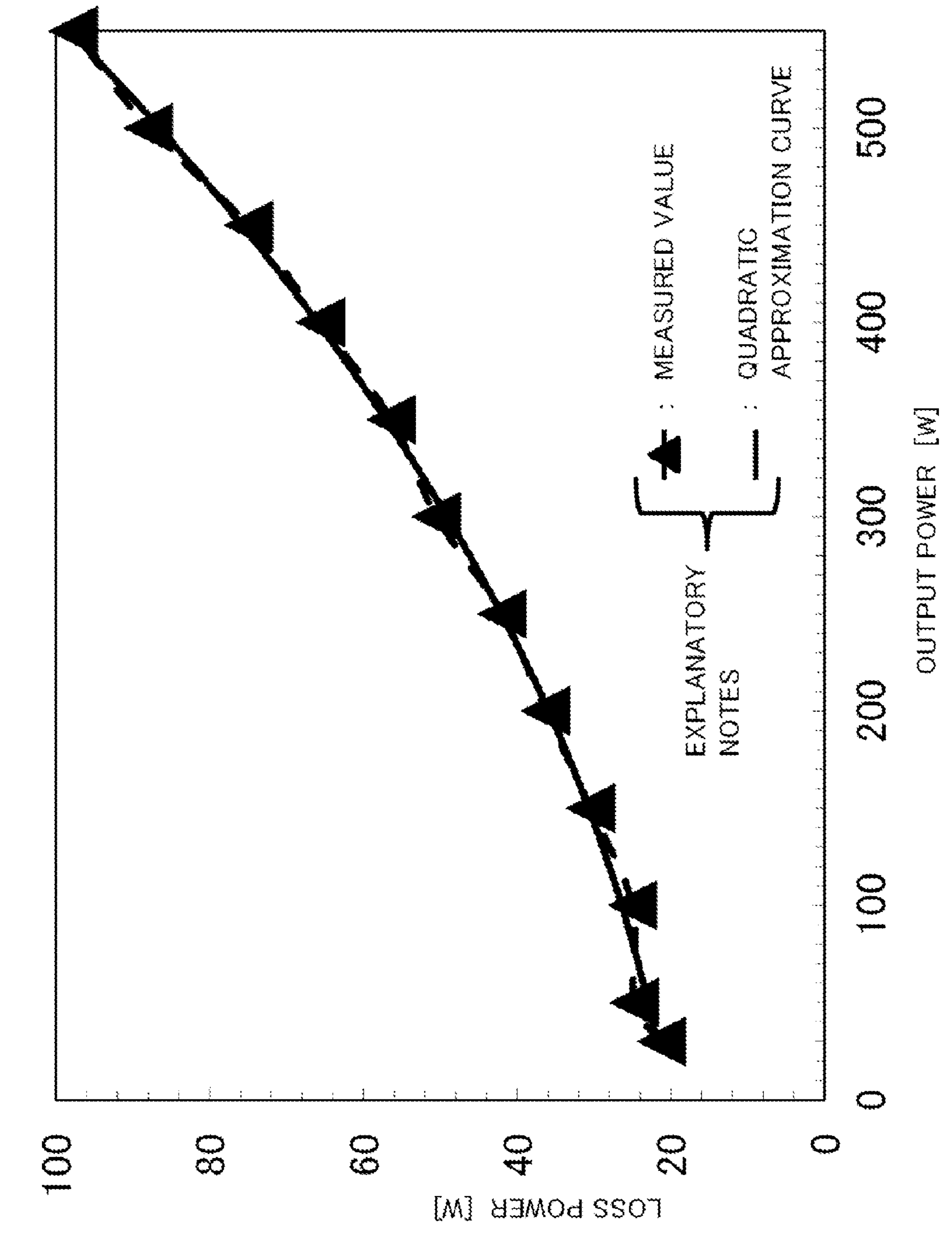
FIG. 30 is a chart exemplarily illustrating an approximation curve using a quadratic function model regarding measured values of output power and loss power.

The coefficients A, B, and C of the quadratic function of Eq. (8) may be calculated (derived), for example, by previously measuring the input power, the output power, and the generated loss for power supply unit and determining a quadratic approximation curve by using a least-squares method with respect to the measured values. FIG. 30 is a chart exemplarily illustrating an approximation curve which is derived by approximating measured values of loss power with respect to output power by applying quadratic approximation using a least-squares method.

Figure 31:
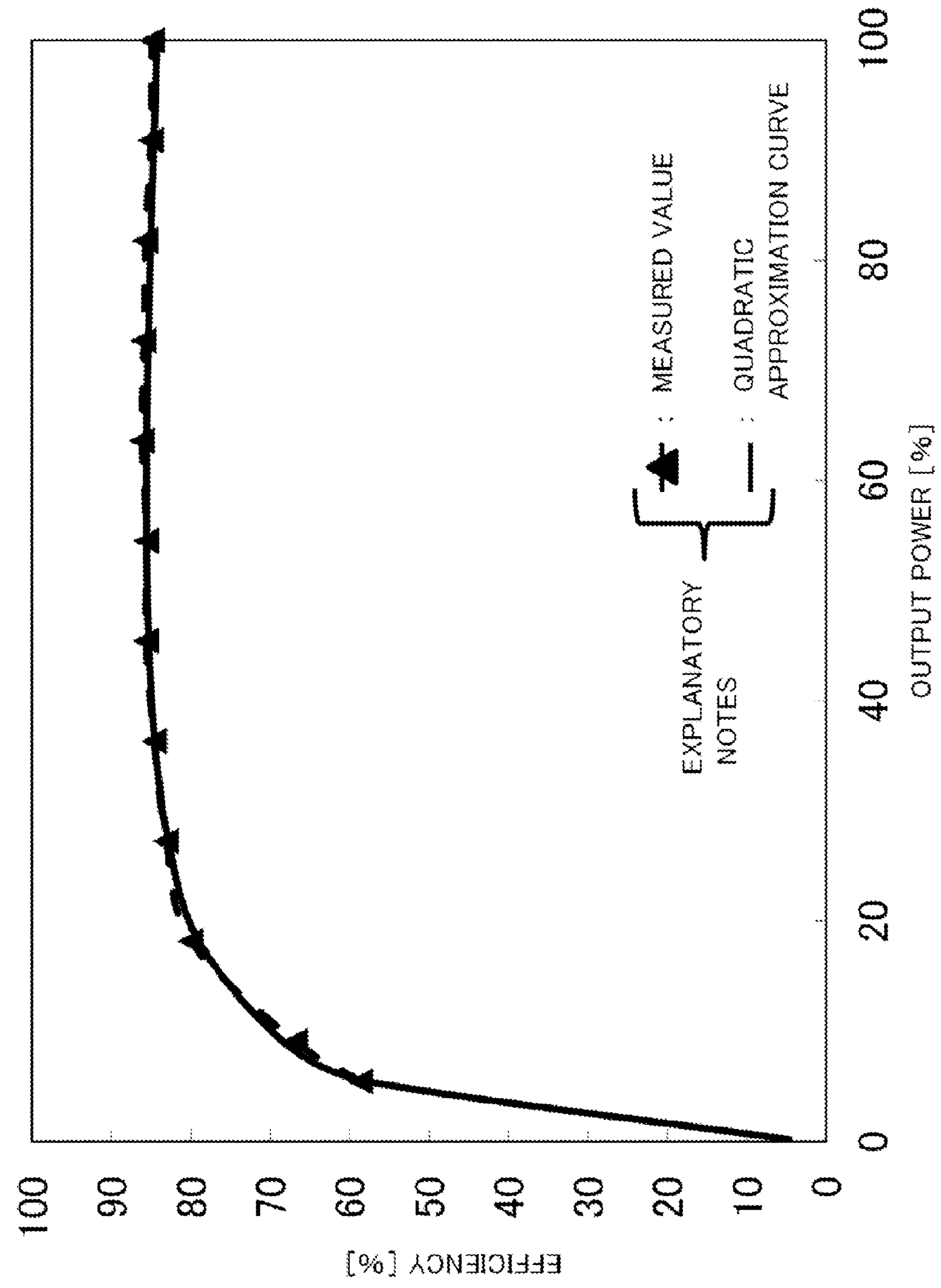
FIG. 31 is a chart exemplarily illustrating an approximation curve using a quadratic function model regarding measured values of output power and power conversion efficiency.

FIG. 31 is a chart exemplarily illustrating an approximation curve which is derived by approximating measured values of input-output power conversion efficiency by applying quadratic approximation using a least-squares method.

As illustrated in FIG. 30 and FIG. 31, input-output characteristics is able to be approximated with sufficient accuracy by using a quadratic function. As described above, a relationship: Y=X (output power)+L (loss) is satisfied. Therefore, the input power Y may be accurately approximated as a quadratic function of the output power X. From the above description, the present embodiment proposes, as the input-output conversion model, a quadratic function of output power represented by the following Eq. (9).

$$Y=aX^2+bX+c \quad (9)$$

Next, an configuration and processing of the power supply control unit 103 in the present embodiment will be described.

The power supply control unit 103 in the present embodiment includes: a conversion function derivation unit 801, a conversion efficiency calculation unit 802, and a controller 803. These elements of the power supply control unit 103 are connected communicatably to each other and transmit and receive data, control commands, and others. As for communication paths and a communication protocol among these elements, the known techniques are applicable. As described in the first exemplary embodiment, when the power supply control unit 103 is configured by using a general-purpose hardware resource and a software program executed by the general-purpose hardware, the respective elements of the power supply control unit 103 may be implemented as a module (software module) of the software program.

The conversion function derivation unit 801 refers to the input-output conversion model set for the main power supply unit 101 and derives the input-output conversion function of the entire power supply system.

The conversion efficiency calculation unit 802 refers to power consumption R measured by the power measurement unit 102 and the input-output conversion function derived by the conversion function derivation unit 801. And the conversion efficiency calculation unit 802 calculates a power conversion efficiency of the entire power supply system with respect to the measured power consumption.

As described in the first exemplary embodiment, the conversion efficiency calculation unit 802 calculates the output power of the main power supply unit 101 and a charge-and-discharge power of the auxiliary power supply unit 105 maximizing a power conversion efficiency of the entire power supply system, based on the power consumption measured in the power measurement unit 102 and a given adjustment value $\phi$.

The controller 803 transmits a control signal to the main power supply unit 101 so as to output the output power calculated in the conversion efficiency calculation unit 802. The controller 803 refers to remaining amount information of the power storage unit 106 included in the auxiliary power supply unit 105 and controls a charge-and-discharge power in the auxiliary power supply unit 105 based on the charge-and-discharge power calculated in the conversion efficiency calculation unit 802 and the remaining amount information of the power storage unit 106.

Next, an operation of the power supply system according to the present embodiment will be described. In the present embodiment, a basic operation of the power supply system is substantially the same as in the first exemplary embodiment illustrated in FIG. 2, FIG. 3, and FIG. 5 and therefore, characteristic portions in the present embodiment will be mainly described.

In the present embodiment, the controller 803 holds (stores) thresholds of charge-discharge in the auxiliary power supply unit 105. A holding method of the thresholds may be arbitrarily determined according to specifications and a configuration of the power supply control unit 103. It is possible that, for example, a non-volatile memory such as a flash memory and the like may be mounted on the power supply control unit 103, and then, in a production stage prior to shipment, or a maintenance stage after shipment, the thresholds are stored within the memory region of the non-volatile memory by using an appropriate tools. When the power supply control unit 103 is configured by using a general-purpose hardware and a software program executed by the general-purpose hardware, the thresholds may be stored within the software program. The thresholds may be stored in the auxiliary power supply unit 105 and, the controller 803 may refer to the thresholds when needed.

The controller 803 holds (stores) $\zeta F$, $\zeta M$, and $\zeta E$ as thresholds of a charge remaining amount (the remaining charge amount) of the power storage unit 106, and controls charge-discharge for the auxiliary power supply unit 105 based on these thresholds.

On the basis of these thresholds, the controller 803 prevents overcharge and over-discharge to the power storage unit 106 and controls charge-discharge of the auxiliary power supply unit 105 so as to always maintain an appropriate charge remaining amount in the power storage unit 106. Charge-discharge control for the auxiliary power supply unit 105 by using the controller 803 will be described with reference to the flowchart of FIG. 9. In the following description, the output power measured by the power measurement unit is represented as R.

Initially, the controller 803 confirms whether $R+\phi>0$ is satisfied and the main power supply unit 101 is stopped, by regarding the output power of the main power supply unit 101 calculated in the conversion efficiency calculation unit 802 (step S901). When the result of step S901 is true, the main power supply unit 101 is started (step S902).

Then, the controller 803 refers to a charge remaining amount of the power storage unit 106 and determines whether the power storage unit is in a full charge condition (step S903). In this case, for example, the controller 803 may determine whether the charge remaining amount of the power storage unit 106 is smaller than predetermined fully charged amount or not.

When the determination result of step S903 is false (that is, the charge remaining amount of the power storage unit 106 is equal to or greater than predetermined fully charged amount), since the power storage unit 106 is in the fully charged condition, the controller 803 stops the main power supply unit 101 and controls the auxiliary power supply unit 105 to output a power R to be consumed at a load (step S904). In step S904, until a charge remaining amount of the power storage unit 106 reaches the given threshold value $\zeta M$, the auxiliary power supply unit 105 supplies power.

When the determination result of step S903 is true, the controller 803 determines whether the charge remaining amount of the power storage unit 106 is smaller than a given upper limit $\zeta F$ (step S905).

When the determination result in step S905 is true, the controller 803 determines whether the charge remaining amount of the power storage unit 106 is larger than a given lower limit $\zeta E$ (step S906).

When the determination result in step S906 is true, the controller 803 determines whether $\phi>0$ is satisfied regarding $\phi$ calculated in the conversion efficiency calculation unit 802 (step S907).

When $\phi>0$ is true, the controller 803 controls the auxiliary power supply unit 105 to charge the power storage unit 106 (step S908).

In step S908, the controller 803 controls a charge power of the power storage unit 106 to be $\alpha$. In steps S905, S906, S907, and S908, when the charge remaining amount of the power storage unit 106 falls within a given range (larger than E and smaller than $\zeta F$), and when $\phi$ calculated by the conversion efficiency calculation unit 802 satisfies $\phi>0$, the controller 803 controls the auxiliary power supply unit 105 to charge the power storage unit 106. These steps correspond to processing executed when, for example, the power consumption at the load in FIG. 7 is Rm.

Then, when the determination result of step S907 is false, the controller 803 determines whether $\phi<0$ is satisfied (step S909).

When the determination result in step S909 is true, the controller 803 determines whether $R+\phi\leq 0$ is satisfied, with regarding to $R+\phi$ calculated by the conversion efficiency calculation unit 802 (step S910).

When the determination result in step S910 is true, the auxiliary power supply unit 105 is controlled to output a power R to be consumed at the load and thereafter the main power supply unit 101 is stopped (step S911).

Steps S910 and S911 correspond to processing executed in a region of low power conversion efficiency of the main power supply unit 101, as in the case of an power consumption at the load in FIG. 7 is Roff, for example.

Then, the controller 803 controls the auxiliary power supply unit 105 so that the output power from the auxiliary power supply unit 105 becomes $\gamma$ (step S912). In the same manner, the controller 803 executes processing from step S909 also when the determination result in step S905 is false.

When the determination result of step S909 is false, the controller 803 controls the auxiliary power supply unit 105 to stop charge-discharge and to be in standby condition (step S913).

By steps S909, S910, S911, and S912, the controller 803 controls the auxiliary power supply unit 105 to supply $\gamma$ as the output power when a charge remaining amount of the power storage unit 106 is at least a given upper limit ζF or at least a given lower limit ζE, and $\phi$ calculated by the conversion efficiency calculation unit 802 satisfies $\phi<0$. These steps correspond to processing executed when, for example, the power consumption at the load in FIG. 7 is RM.

When the determination result in step S906 is false, the controller 803 starts the main power supply unit 101 (step S914) (when the main power supply unit 101 has not been started) and determines whether $\phi>0$ is satisfied with regarding to $\phi$ calculated by the conversion efficiency calculation unit 802 (step S915).

When the determination result in step S915 is true, the controller 803 executes processing from step S908 and charges the power storage unit 106 with a charge power $\alpha$.

When the determination result in step S915 is false, the controller 803 executes processing from step S913 to stop charge-discharge in the auxiliary power supply unit 105 and to cause the auxiliary power supply unit 105 to be in standby condition.

In steps S906, S914, and S915, when a charge remaining amount in the power storage unit 106 is less than the given lower limit ζE, the controller 803 starts the main power supply unit 101, and controls the auxiliary power supply unit 105 to charge the power storage unit 106 when $\phi>0$ is satisfied and controls the auxiliary power supply unit 105 to stop charge-discharge therein when $\phi\leq 0$ is satisfied.

As described above, when a charge remaining amount in the power storage unit 106 is larger than the given upper limit ζF, the controller 803 controls the power storage unit 106 not to be charged to inhibit overcharge for the power storage unit 106 (steps S905, S909, S913). When the charge remaining amount in the power storage unit 106 is less than the given lower limit ζE, the controller 803 controls the power storage unit 106 not to perform discharge to inhibit over-discharge from the power storage unit 106 (steps S906, S914, S915, and S913). In addition, when the power storage unit 106 is fully charged, the controller 803 controls the auxiliary power supply unit 105 to supply power until the charge remaining amount of the power storage unit 106 reaches a given value ζM.

The aforementioned processing causes the controller 803 to control charge-discharge in the auxiliary power supply unit 105 so that the power storage unit 106 is always used in a region where an appropriate charge remaining amount is maintained. The thresholds ζF, ζM, and ζE described above may be respectively set as appropriate values according to the performance and characteristics of the power storage unit 106.

Figure 10:
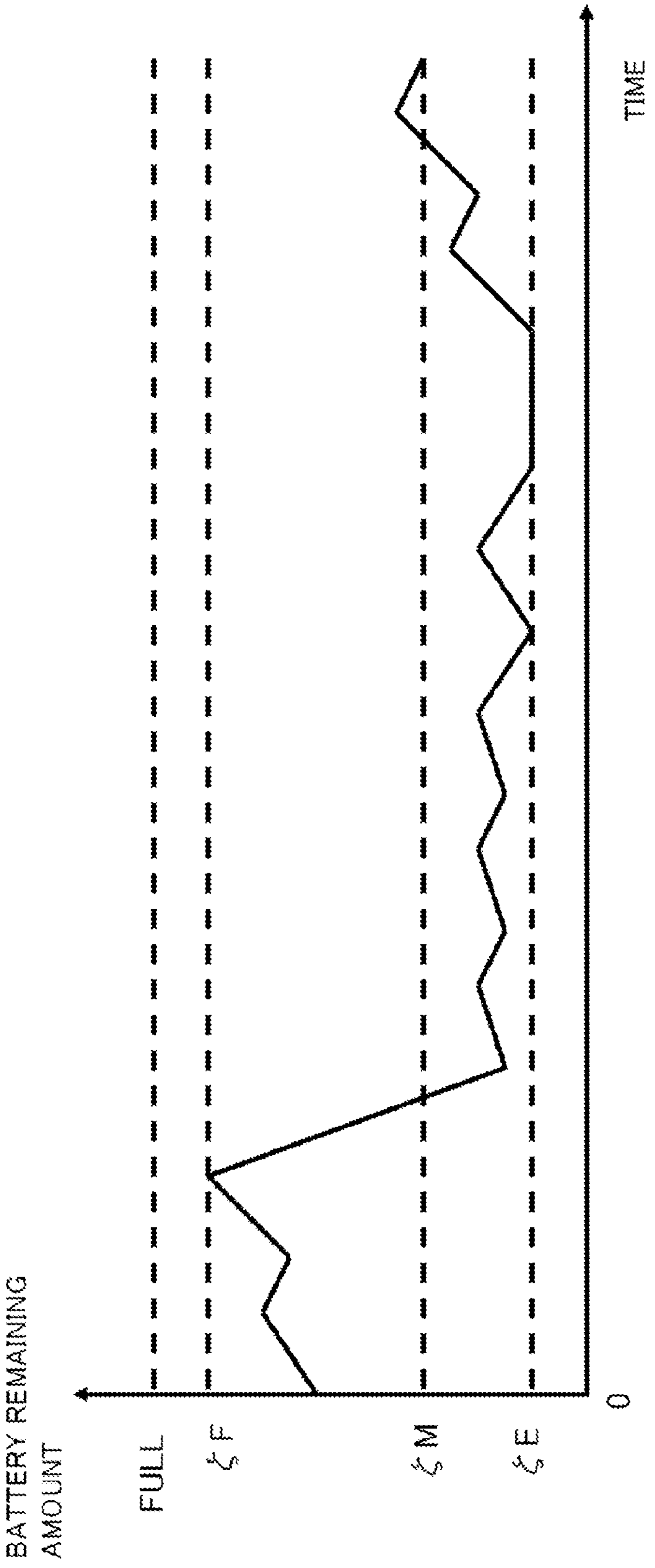
FIG. 10 is a schematic view illustrating charge remaining amount (the remaining charge amount) in a power storage unit 106 according to the second exemplary embodiment of the present invention.

The changes of the charge remaining amount of the power storage unit 106 by charge-discharge control for the auxiliary power supply unit 105 by using the controller 803 is illustrated in FIG. 10. FIG. 10 is a schematic view illustrating changes of the charge remaining amount of the power storage unit 106.

As illustrated in FIG. 10, the controller 803 controls charge-discharge in the auxiliary power supply unit 105 so that the charge remaining amount of the power storage unit 106 falls within a region larger than the given lower limit ζE and smaller than the given upper limit ζF. As a result, overcharge and over-discharge in the power storage unit 106 are inhibited and charge-and-discharge is repeated in a vicinity of an appropriate charge remaining amount ζM.

Next, one example method for controlling output powers of the main power supply unit 101 and the auxiliary power supply unit 105 in the present embodiment will be described.

In the present embodiment, the controller 803 respectively controls the output powers of the main power supply unit 101 and the auxiliary power supply unit 105 by adjusting the output voltage ratio thereof.

Figure 11:
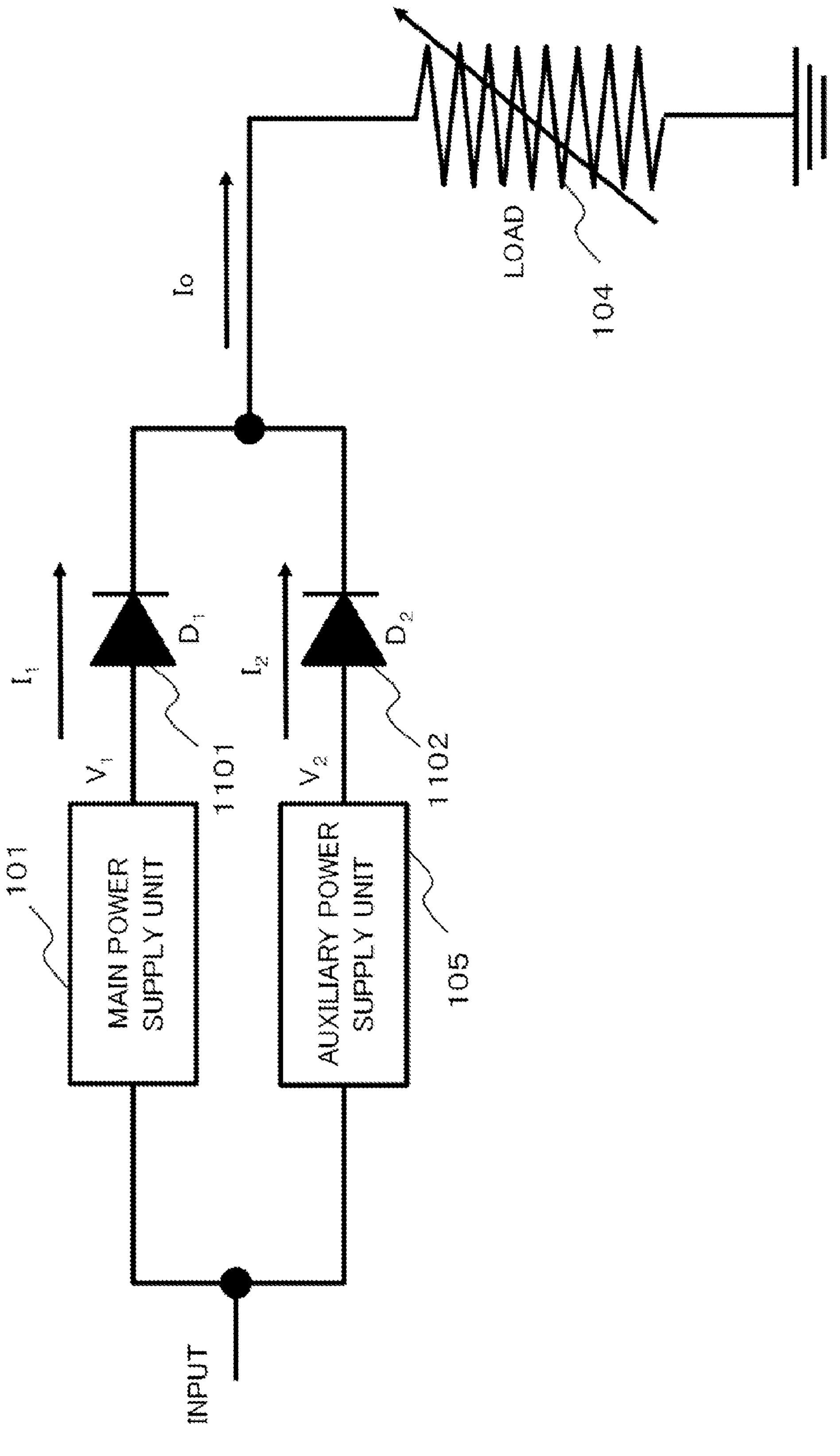
FIG. 11 is a diagram illustrating one example of a circuit configuration for adjusting voltages of the power supply units in the second exemplary embodiment of the present invention.

With reference to FIG. 11, an adjustment method for the output voltage ratio is described. FIG. 11 is a diagram illustrating one example of a circuit configuration for adjusting voltages of power supply units in the second exemplary embodiment of the present invention. In FIG. 11, $V_1$ and $V_2$ represent output voltages of the main power supply unit 101 and the auxiliary power supply unit 105, respectively, and $I_1$ and $I_2$ represent currents flowing in a diode 1101 and a diode 1102, respectively. $I_O$ represents a total output current supplied to a load.

An impedance of the load 104 is represented as Z and each of the forward resistance values of the diode 1101 and the diode 1102 is represented as R. In this case, regarding the circuit of FIG. 11, the following equations are established based on the Kirchhoff's laws.

$$I_1+I_2=I_O,$$

$$V_1-V_2=I_1R-I_2R,$$

$$V_2I_2R+I_OZ$$

From the above equations, $I_1$ and $I_2$ are determined as described in the following equations.

$$I_2=\frac{V_2R-Z(V_1-V_2)}{R(2Z+R)} \quad (10)$$

$$I_1=\frac{V_1-V_2}{R}+\frac{V_2R-Z(V_1-V_2)}{R(2Z+R)}=\frac{(R+Z)V_1-ZV_2}{(2Z+R)} \quad (11)$$

When only the main power supply unit 101 is operated, the controller 803 control $I_2$, to be $I_2=0$. Applying $I_2=0$ to Eq. (10), the following Eq. (12) is obtained.

$$V_1 = \frac{R+Z}{Z} V_2 \tag{12}$$

When only the auxiliary power supply unit 105 is operated, the controller 803 controls $I_1$, to be $I_1=0$. Applying $I_1=0$ in Eq. (11), the following Eq. (13) is obtained.

$$V_1 = \frac{Z}{R+Z} V_2 \tag{13}$$

Regarding that Eqs. (12) and (13) are boundary conditions for switching outputs from the main power supply unit 101 and the auxiliary power supply unit 105, the controller 803 is able to switch the outputs from the main power supply unit 101 and the auxiliary power supply unit 105 by adjusting $V_1$ and $V_2$ to satisfy the following Eqs. (14) to (16).

When $V_1$ and $V_2$ are adjusted so as to satisfy the following Eq. (14), only the main power supply unit 101 is operated and (only) $I_1$ is output.

$$V_1 \geq \frac{R+Z}{Z} V_2 \tag{14}$$

When $V_1$ and $V_2$ are adjusted so as to satisfy the following Eq. (15), both the main power supply unit 101 and the auxiliary power supply unit 105 are operated and $I_1$ and $I_2$ are output.

$$\frac{R+Z}{Z} V_2 > V_1 > \frac{Z}{R+Z} V_2 \tag{15}$$

Then, when $V_1$ and $V_2$ are adjusted so as to satisfy the following Eq. (16), only the auxiliary power supply unit 105 is operated and (only) $I_2$ is output.

$$\frac{Z}{R+Z} V_2 \geq V_1 \tag{16}$$

As described above, the controller 803 can adjust output currents $I_1$ and $I_2$ by adjusting a ratio between $V_1$ and $V_2$. As a result, the controller 803 can adjust output powers of the main power supply unit 101 and the auxiliary power supply unit 105.

To control output voltage of each power supply unit, any appropriate method may be selected (adopted) according to a specific circuit configuration of the power supply unit. For example, a well-known configuration such as a linear regulator of a voltage variable type, a switching regulator of a PWM (Pulse Width Modulation) type, and the like is applicable for controlling the output voltage. Therefore, in the present invention, detailed description about controlling output voltage is omitted. When any one of the main power supply unit 101 and the auxiliary power supply unit 105 is operated, the controller 803 may control the output voltage of a power supply unit, which is not operated, to be 0 and may completely stop the power supply unit.

As described above, the power supply system in the present embodiment controls the output power of the main power supply unit 101 and a charge-and-discharge power of the auxiliary power supply unit 105 so as to realize the highest (optimal) power conversion efficiency as the entire power supply system, while the controller 803 prevents overcharge and over-discharge with respect to the power storage unit 106. In the power supply system in the present embodiment, as a result, the power supply system realizes that a charge remaining amount of the power storage unit 106 is maintained in an appropriate region, and power conversion efficiency is optimized over an operating time of the entire power supply system.

Third Exemplary Embodiment

A third exemplary embodiment of the present invention based on the first and second exemplary embodiments of the present invention described above will be described with reference to FIG. 12. In the following description, characteristic configurations according to the present embodiment will be mainly described. In the description, the same reference number will be assigned to the same configuration as in the first and second exemplary embodiments for omitting overlapping description.

Figure 12:
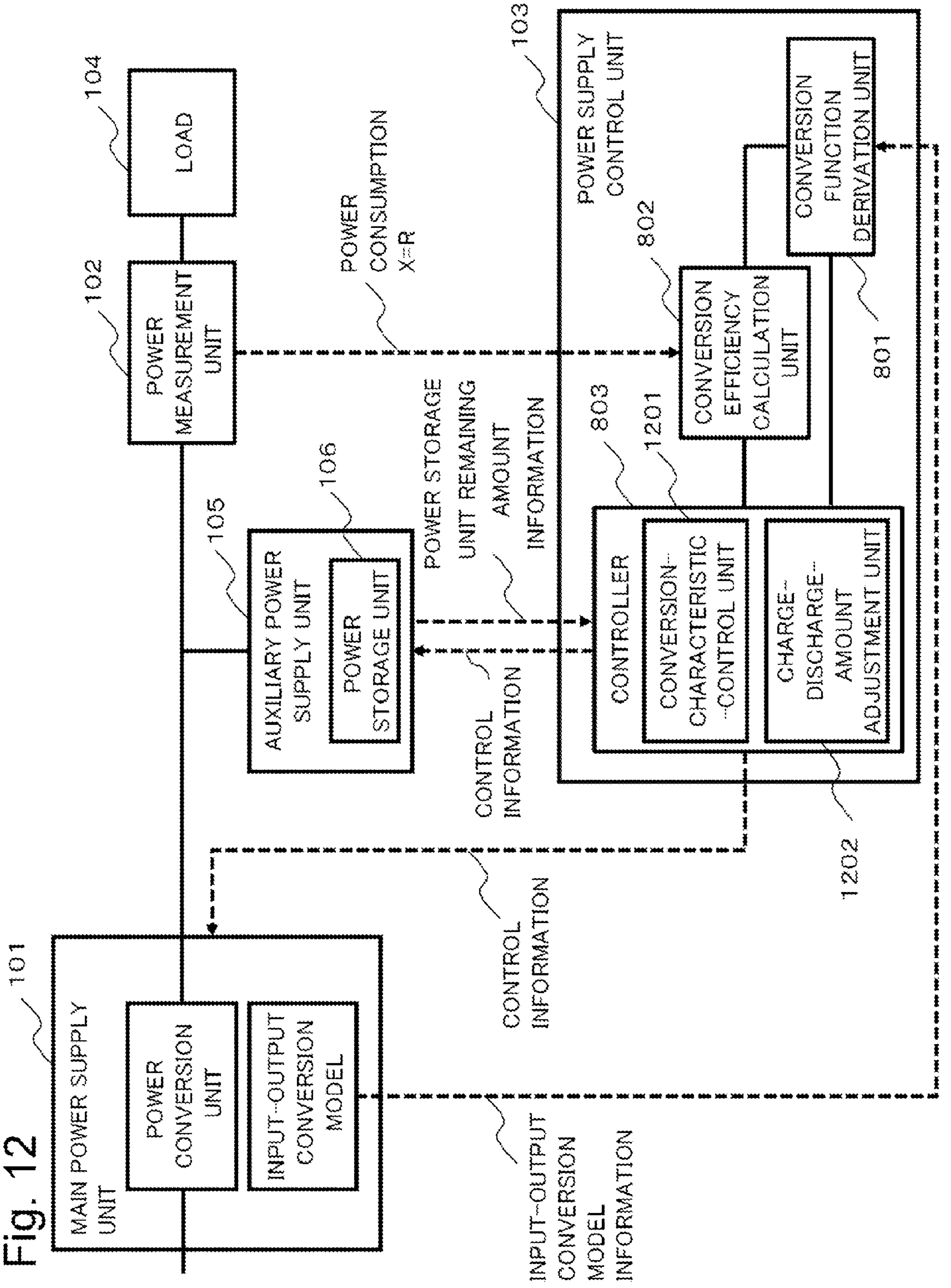
FIG. 12 is a diagram illustrating a configuration of a power supply system in a third exemplary embodiment of the present invention.

FIG. 12 is a diagram illustrating a configuration of a power supply system in the third exemplary embodiment of the present invention. In the same manner as in the first and second exemplary embodiments described above, the power supply system in the third exemplary embodiment of the present invention includes, as illustrated in FIG. 12, the main power supply unit 101, the power measurement unit 102, the auxiliary power supply unit 105 including the power storage unit 106, and the power supply control unit 103. Outputs of the main power supply unit 101 and the auxiliary power supply unit 105 are integrated to be supplied to the load 104.

The power supply system in the present embodiment employs a quadratic function represented by Eq. (9) as the input-output conversion model in the main power supply unit 101 in the same manner as in the second exemplary embodiment. The third exemplary embodiment of the present invention differs from the first and second exemplary embodiments only in a configuration and processing of the power supply control unit 103. Therefore, these different portions will be mainly described below.

In the same manner as in the second exemplary embodiment, the power supply control unit 103 in the present embodiment includes the conversion function derivation unit 801, the conversion efficiency calculation unit 802, and the controller 803. These elements of the power supply control unit 103 are connected communicatably to each other.

In the present embodiment, the controller 803 further includes a conversion-characteristic-control unit 1201.

The conversion-characteristic-control unit 1201 may be configured by using dedicated hardware (a circuit) or the like. When the power supply control unit 103 is configured by using a general-purpose hardware and a software program executed by the general-purpose hardware, the conversion-characteristic-control unit 1201 may be realized as a module of the software program.

In the present embodiment, the conversion-characteristic-control unit 1201 is configured as an element of the controller 803 but may be provided as an independent element of the power supply control unit 103 separately from the controller 803.

Next, an operation of the power supply system according to the present embodiment configured as described above will be described.

As described in the first exemplary embodiment, the power supply control unit 103 calculates power conversion efficiency when the output power varies in a given adjustment range ($-\beta \leq \phi \leq \alpha$), based on power consumption R at a load measured in the power measurement unit 102 (step S206 in FIG. 2). Then, the power supply control unit 103 controls the output power of the main power supply unit 101 and a charge-and-discharge power of the auxiliary power supply unit 105 so that the calculated power conversion efficiency is highest.

For example, as illustrated in FIG. 4, when, power consumption R1 at a load varies in a region where $R1+\alpha<Rp$, the equation $E\ (X=R1+\alpha) \geq E\ (X=R)$ is satisfied. Therefore, control for the auxiliary power supply unit 105 by the controller 803 in this region tends to be biased toward charge for the auxiliary power supply unit 105. As described in the second exemplary embodiment, when a charge remaining amount of the power storage unit 106 exceeds a given upper limit, the controller 803 stops charge processing for the power storage unit 106 to prevent overcharge.

In the same manner, for example, as illustrated in FIG. 4, when power consumption R2 at the load varies in a region where $R2-\beta>Rp$, the equation $(X=R2-\beta) \geq E\ (X=R)$ is satisfied. Therefore, control for the auxiliary power supply unit 105 by the controller 803 in this region may be biased toward discharge for the auxiliary power supply unit 105. As described in the second exemplary embodiment, when a charge remaining amount of the power storage unit 106 is less than a given lower limit, the controller 803 stops discharge processing for the power storage unit 106 to prevent overdischarge.

As described above, when control for the auxiliary power supply unit 105 by the controller 803 is biased toward charge or discharge, the controller 803 finally stops charge-discharge for the auxiliary power supply unit 105.

In this case, complementing the output power of the main power supply unit 101 by charge-and-discharge power in the auxiliary power supply unit 105 becomes difficult, so that it charge-and-discharge results in a possibility of a decrease in power conversion efficiency as the entire power supply system.

Therefore, in the present embodiment, the conversion-characteristic-control unit 1201 adjusts power conversion efficiency characteristics of the main power supply unit 101 so that the output power realizing a highest value (peak) of a power conversion efficiency in the main power supply unit 101 exists within the aforementioned given range ($-\beta \leq \phi \leq \alpha$) based on the power consumption R. The conversion-characteristic-control unit 1201 also adjusts power conversion efficiency characteristics of the main power supply unit 101 so as to balance a charge power and a discharge power in the auxiliary power supply unit 105.

Figure 13:
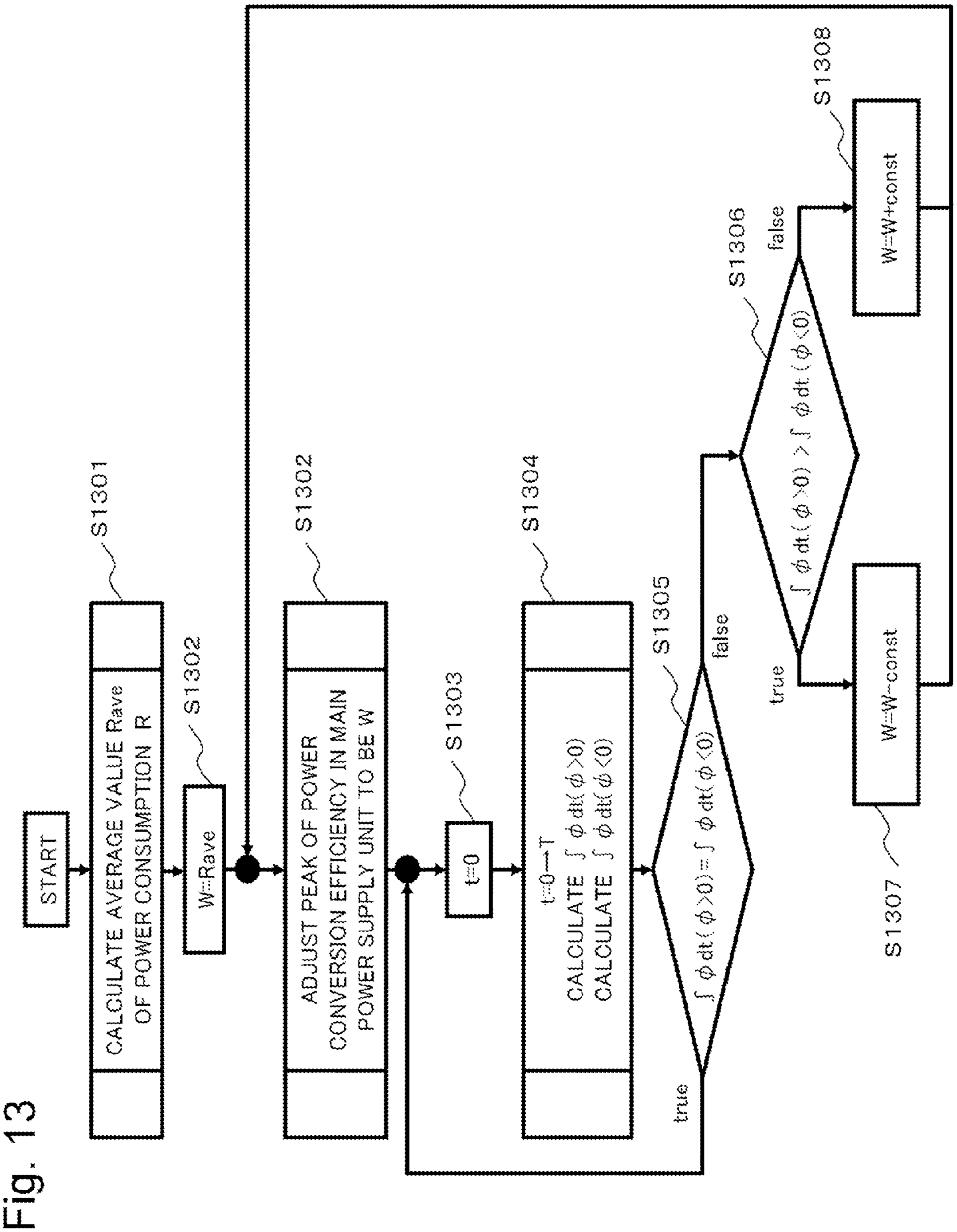
FIG. 13 is a flowchart exemplarily illustrating a process of adjusting power conversion efficiency characteristics of a main power supply unit in the third exemplary embodiment of the present invention.

Operations of the controller 803 and the conversion-characteristic-control unit 1201 in the present embodiment will be described with reference to FIG. 13. FIG. 13 is a flowchart exemplarily illustrating a process of adjusting power conversion efficiency characteristics of the main power supply unit.

The conversion-characteristic-control unit 1201 calculates an average value $R_{ave}$ within a given period of time of power consumption R at the load 104 measured by the power measurement unit 102 (step S1301). For example, as specific calculation method for $R_{ave}$, the conversion-characteristic-control unit 1201 periodically acquires and then totalizes power consumption value R from the power measurement unit 102 over a given period of time and divides the totalized value by a totalized time.

Then, the conversion-characteristic-control unit 1201 sets $R_{ave}$ calculated in step S1301 as a peak efficiency output W that is the output power where a power conversion efficiency of the main power supply unit 101 becomes highest (step S1302).

Then, the conversion-characteristic-control unit 1201 controls the main power supply unit 101 so that the peak of the power conversion efficiency of the main power supply unit 101 is equal or substantially equal to the peak efficiency output W (step S1303).

An adjustment manner of the power conversion efficiency in the main power supply unit 101 will be described later.

Then, the conversion-characteristic-control unit 1201 calculates, by using the following equations (17) and (18), accumulated values of the adjustment value $\phi$ ($-\beta \leq \phi \leq \alpha$), of the output power calculated in the conversion efficiency calculation unit 802, within a given period of time ($0 \leq t \leq T$), in both cases of $\phi>0$ and $\phi<0$ (step S1303 and step S1304):

$$P(\phi > 0) = \int_{t=0}^{T} \phi dt(\phi > 0) \tag{17}$$

$$P(\phi < 0) = \int_{t=0}^{T} \phi dt(\phi < 0) \tag{18}$$

where P ($\phi>0$) represents a total charge power to the auxiliary power supply unit 105 within a given period of time. P ($\phi<0$) represents a total output power from the auxiliary power supply unit 105 within a given period of time.

Then, the conversion-characteristic-control unit 1201 determines whether P ($\phi>0$)=P ($\phi<0$) is satisfied regarding P ($\phi>0$) and P ($\phi<0$) calculated in Eqs. (17) and (18) (step S1305).

When the determination result in step S1305 is true, the conversion-characteristic-control unit 1201 continues processing from step S1303.

When the determination result in step S1305 is false, the conversion-characteristic-control unit 1201 determines whether a charge power P ($\phi>0$) within a given period of time is larger than a discharge power P ($\phi<0$) (step S1306).

When the determination result in step S1306 is true (the charge power P ($\phi>0$) is larger), the conversion-characteristic-control unit 1201 decreases a peak efficiency output W of the main power supply unit 101 by a predetermined constant ("const" illustrated in FIG. 13) (step S1307) and continues processing from step S1302.

When the determination result in step S1306 is false (the discharge power P ($\phi<0$) is larger), the conversion-characteristic-control unit 1201 increases the peak efficiency output W of the main power supply unit 101 by the predetermined constant ("const") (step S1308) and continues processing from step S1302. As the predetermined constant "const", an appropriate value is arbitrarily selectable.

Figure 14:
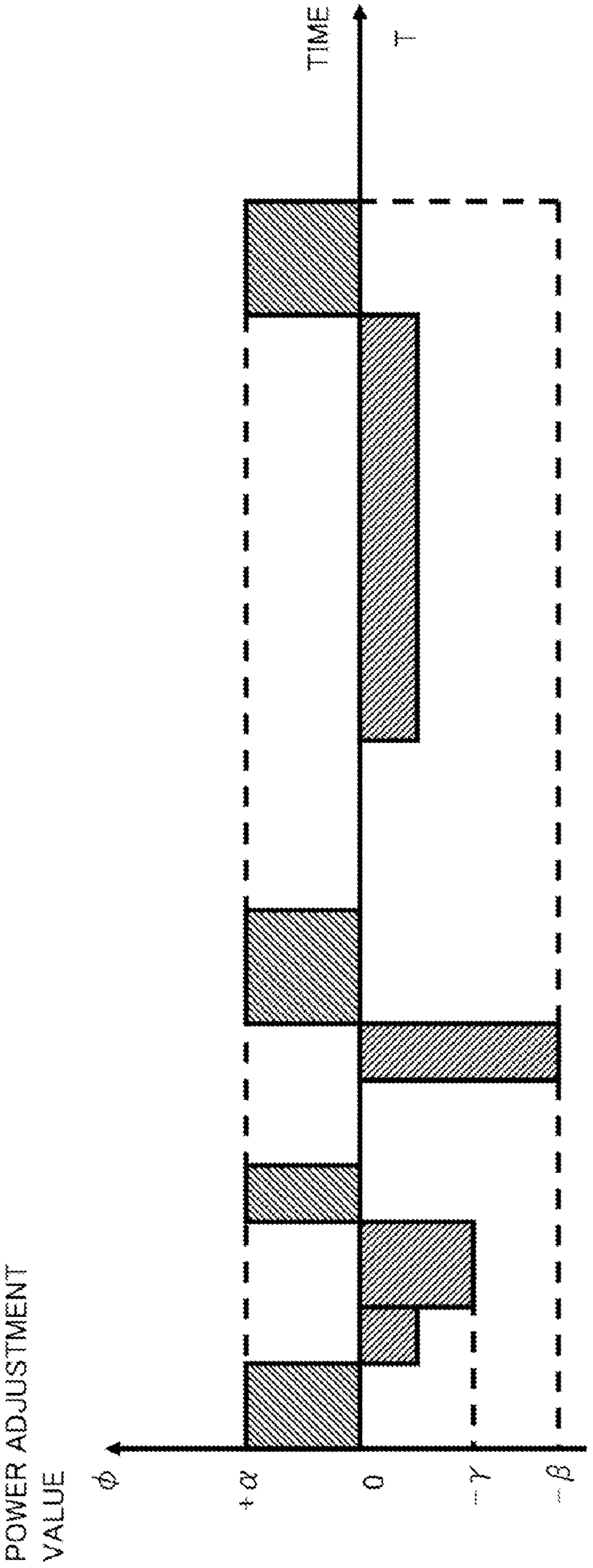
FIG. 14 is a chart illustrating changes of an adjustment value of output power within a given period of time in the third exemplary embodiment of the present invention.
Figure 15:
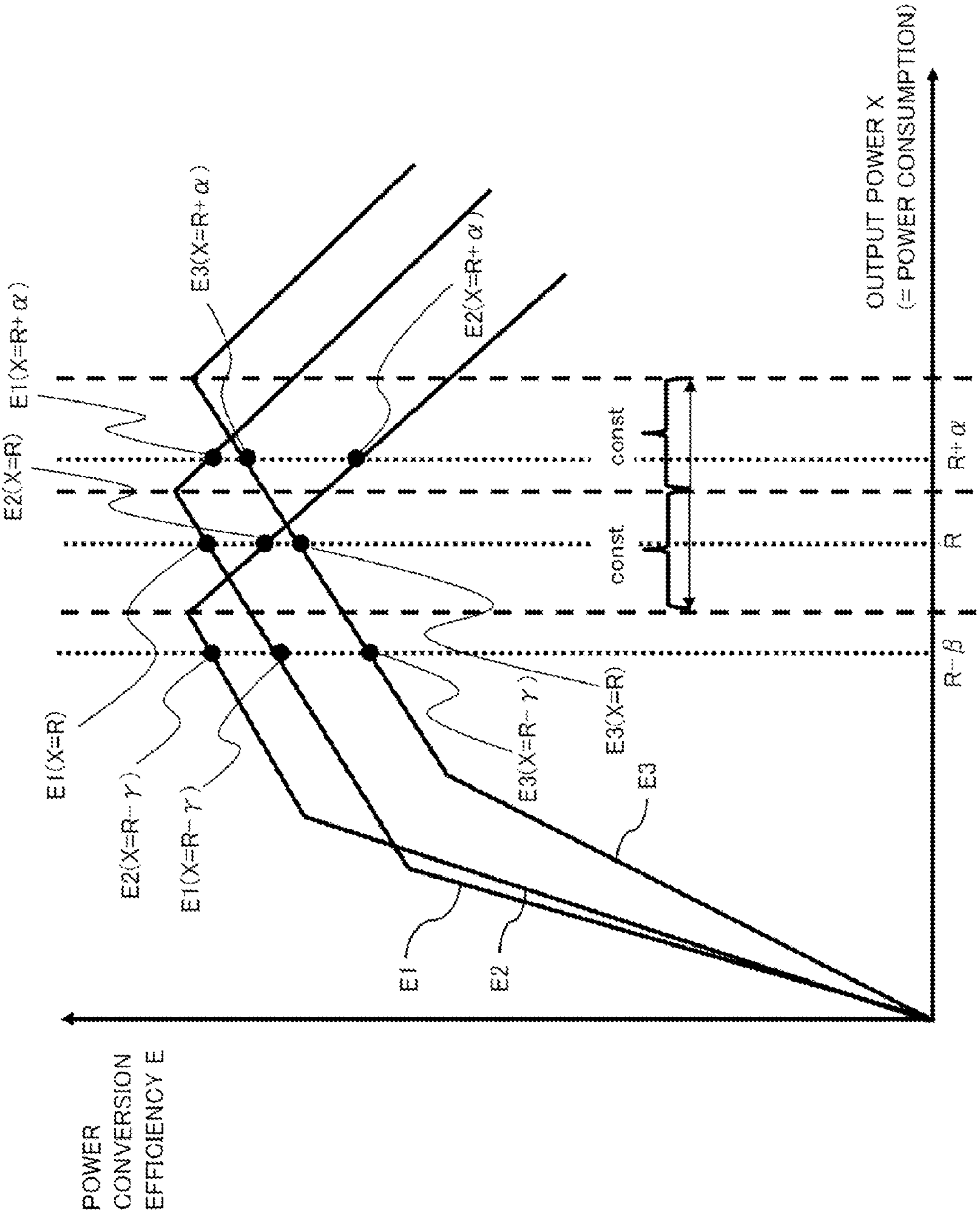
FIG. 15 is a schematic view of an efficiency curve of power conversion upon adjusting power conversion characteristics of the main power supply unit in the third exemplary embodiment of the present invention.

The operation of the conversion-characteristic-control unit 1201 is described below with reference to FIG. 14 and FIG. 15. FIG. 14 is a chart illustrating changes of an adjustment value $\phi$ of output power within a given period of time ($0 \leq t \leq T$) and FIG. 15 is a schematic view of an efficiency curve of power conversion upon adjusting power conversion characteristics of the main power supply unit 101.

As illustrated in FIG. 14, $\phi$ calculated by the conversion efficiency calculation unit 802 varies according to a variation of power consumption R at the load 104, in a range of $-\beta \leq \phi \leq \alpha$, within a given period of time ($0 \leq t \leq T$). A total charge power to the auxiliary power supply unit 105 is expressed as a total area of regions where $0<\phi$ is satisfied in FIG. 14. A total output power from the auxiliary power supply unit 105 is expressed as a total area of regions where $\phi<0$ is satisfied in FIG. 14.

In the present embodiment, the conversion-characteristic-control unit 1201 adjusts power conversion characteristics of the main power supply unit 101 so that a charge power and a discharge power in the auxiliary power supply unit 105 are equal or substantially equal (in other words, the charge power and the discharge power in auxiliary power supply unit 105 are balanced). In other words, the conversion-characteristic-control unit 1201 controls a power conversion efficiency of the main power supply unit 101 so that a total area of a region where $0<\phi$ and a total area of a region where $\phi<0$ are equal or substantially equal.

As a result, charge-discharge control for the auxiliary power supply unit 105 is balanced without being biased toward charge or discharge. Therefore, since the charge-and-discharge power of the auxiliary power supply unit 105 complements the output power of the main power supply unit 101, power conversion efficiency of the entire power supply system is maintained to be high.

Next, with reference to FIG. 15, a relationship between a variation of a power conversion efficiency curve and a charge-and-discharge power in the auxiliary power supply unit 105 upon adjusting a peak efficiency output W of the main power supply unit 101 will be described. In FIG. 15, it is assumed that when the conversion-characteristic-control unit 1201 adjusts the peak efficiency output W of the main power supply unit 101 to be W1, W2, and W3, the efficiency curve of power conversion is changed to E1, E2, and E3, respectively. In addition, it is assumed that W2=W1−“const” and W3=W1+“const” are satisfied.

When the peak efficiency output of the main power supply unit 101 is W1, a power conversion efficiency of the main power supply unit 101 satisfies E $(X=R-\beta)<$E $(X=R+\alpha)<$E $(X=R)$. More specifically, the power conversion efficiency of the main power supply unit 101 satisfies E1 $(X=R-\beta)<$E1 $(X=R+\alpha)<$E1 $(X=R)$, as shown in FIG. 15. Therefore, when no charge or discharge in the auxiliary power supply unit 105 occurs, power conversion efficiency as the entire power supply system is improved.

In contrast, when the conversion-characteristic-control unit 1201 adjusts the peak efficiency output W1 of the main power supply unit 101 to be W2 (corresponding to step S1307 of FIG. 13), a power conversion efficiency of the main power supply unit 101 satisfies E $(X=R+\alpha)<$E $(X=R)$ $<$E $(X=R-\beta)$. More specifically, the power conversion efficiency of the main power supply unit 101 satisfies E2 $(X=R+\alpha)<$E2 $(X=R)<$E2 $(X=R-\beta)$, as shown in FIG. 15. Therefore, when the auxiliary power supply unit 105 outputs a power $\beta$, power conversion efficiency as the entire power supply system is improved. When the conversion-characteristic-control unit 1201 adjusts the peak efficiency output of the main power supply unit 101 from W1 to W2, as a result, the controller 803 controls the auxiliary power supply unit 105 so that a power supply amount output by the auxiliary power supply unit 105 is increased.

In the same manner, when the conversion-characteristic-control unit 1201 adjusts the peak efficiency output W1 of the main power supply unit 101 to be W3 (corresponding to step S1307 of FIG. 13), a power conversion efficiency of the main power supply unit 101 satisfies E $(X=R-\beta)<$E $(X=R)$ $<$E $(X=R+\alpha)$. More specifically, the power conversion efficiency of the main power supply unit 101 satisfies E3 $(X=R-\beta)<$E3 $(X=R)<$E3 $(X=R+\alpha)$, as shown in FIG. 15. Therefore, when the auxiliary power supply unit 105 is charged with a charge power $\alpha$, power conversion efficiency as the entire power supply system is improved. When the conversion-characteristic-control unit 1201 adjusts a peak efficiency output of the main power supply unit 101 from W1 to W3, as a result, the controller 803 controls the auxiliary power supply unit 105 so that a charge power in the auxiliary power supply unit 105 is increased.

Next, an example configuration of the main power supply unit 101 capable of adjusting power conversion efficiency will be described.

Figure 16:
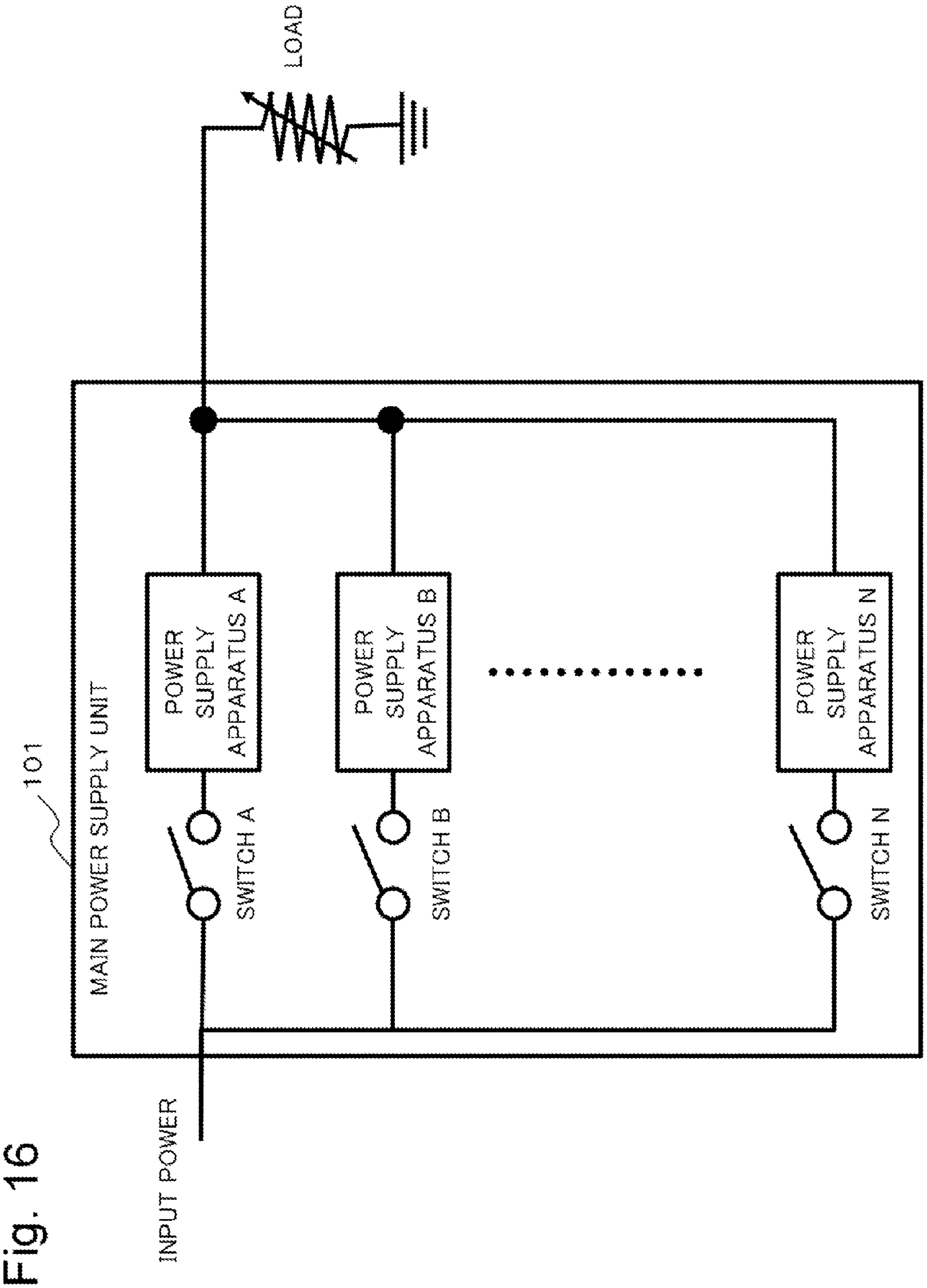
FIG. 16 is a schematic view upon configuring the main power supply unit using a plurality of power supply apparatuses in the third exemplary embodiment of the present invention.

For example, in the present embodiment, as the configuration of the main power supply unit 101 capable of adjusting power conversion efficiency, a configuration using a plurality of a power supply apparatus A to a power supply apparatus N is employable as the main power supply unit 101, as illustrated in FIG. 16. A configuration including a plurality of a transformer A to a transformer $N_A$ inside the main power supply unit 101 as illustrated in FIG. 17 is also employable.

When the configuration, using a plurality of power supply apparatuses, is employed, the conversion-characteristic-control unit 1201 controls the number of power supply apparatuses to be operated via ON or OFF of a switch A to a switch N to adjust power conversion characteristics of the main power supply unit 101. In FIG. 16, the input-output conversion model may be set for each of the power supply apparatus A to the power supply apparatus N, or one input-output conversion model may be set for the entire main power supply unit 101 obtained by integrating these power supply apparatuses.

Figure 17:
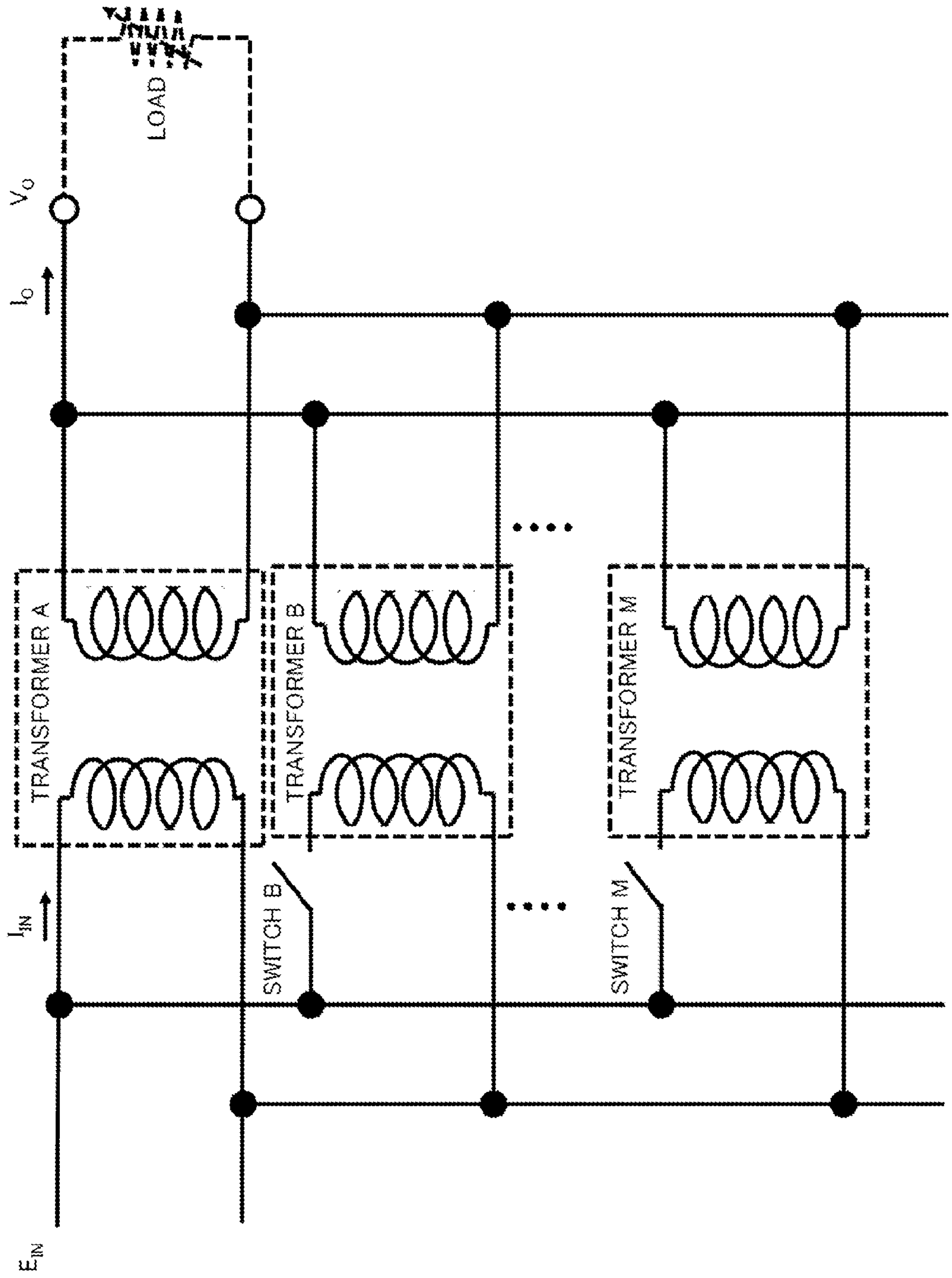
FIG. 17 is a schematic view upon configuring the main power supply unit by including a plurality of transformers in the third exemplary embodiment of the present invention.

When a configuration using a plurality of transformers as illustrated in FIG. 17 is employed, the conversion-characteristic-control unit 1201 controls the number of transformers to be connected via ON or OFF of a switch B to a switch M to adjust power conversion characteristics of the main power supply unit 101. The number of power supply apparatuses as illustrated in FIG. 16 and the number of transformers as illustrated in FIG. 17 are appropriately selectable according to performance necessary for the main power supply unit 101 and a needed adjustment range of power conversion characteristics.

Figure 18:
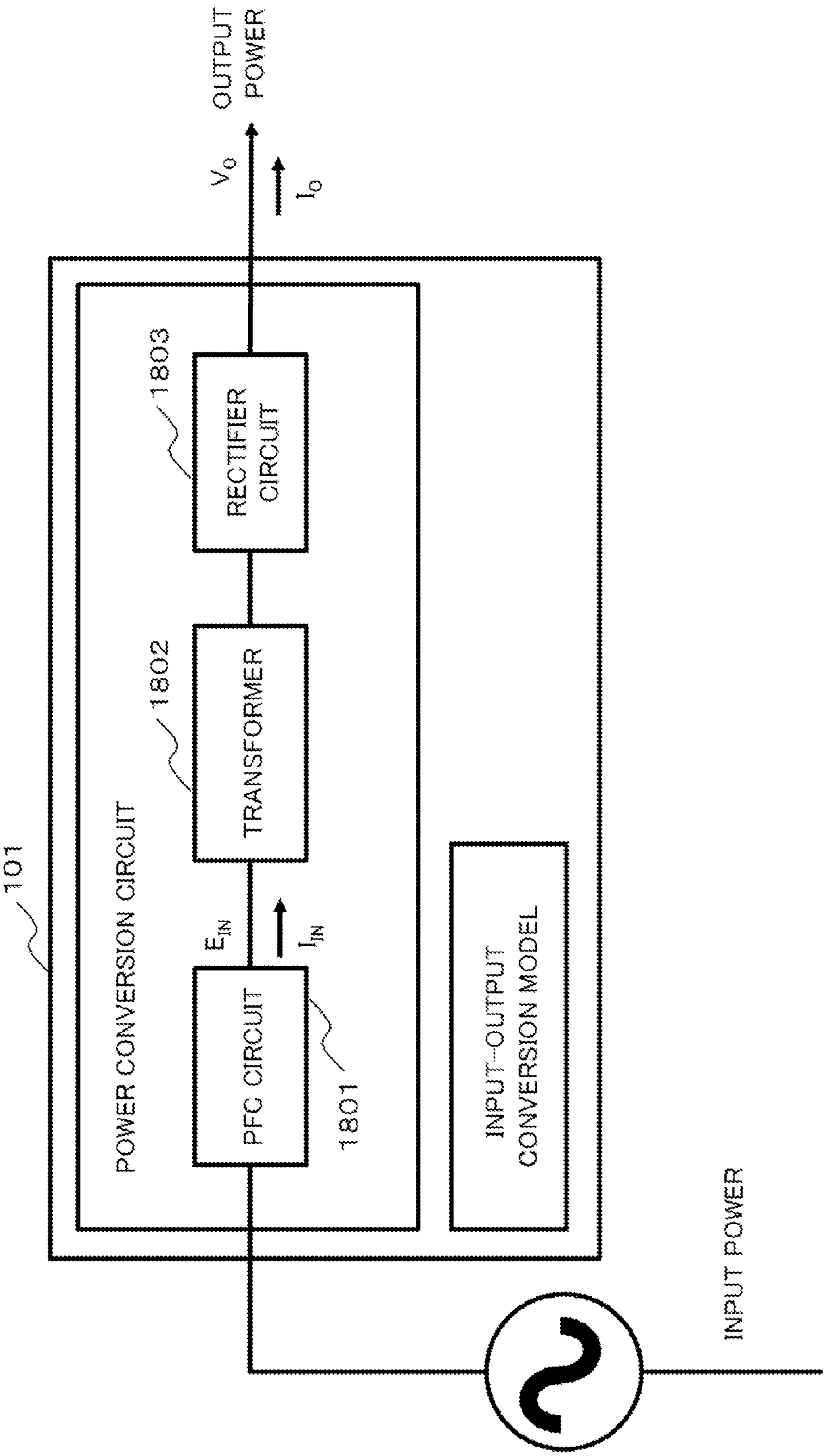
FIG. 18 is a schematic view upon configuring the main power supply unit by including a power conversion circuit in the third exemplary embodiment of the present invention.

When a transformer is included inside the main power supply unit 101, a configuration for adjusting power conversion characteristics of the main power supply unit 101 by adjusting an input power to the transformer may be employable. FIG. 18 is a diagram exemplarily illustrating a configuration of a power conversion circuit of the main power supply unit 101.

The power conversion circuit of the main power supply unit 101 includes a PFC (Power Factor Correction) circuit 1801, a transformer 1802, and a rectifier circuit 1803. An output of the PFC circuit 1801 is an input voltage $E_{IN}$ and input current $I_{IN}$ to the transformer 1802. In general, the PFC circuit 1801 includes an inductor, a diode, a switching element, a smoothing capacitor and the like, and can adjust a voltage output from the PFC circuit 1801 and an operating frequency.

In the transformer 1802, generally, a magnetic flux density generated in a core (iron core) is proportional to the input voltage $E_{IN}$ of the transformer and inversely proportional to the operating frequency. An iron loss generated in the transformer 1802 is generally expressed as a sum of eddy-current loss and hysteresis loss, and when the magnetic flux density decreases, these losses also decrease. Therefore, when the input voltage to the transformer and the operating frequency are controlled, the iron loss generated in the transformer 1802 is increased or decreased.

As described in the second exemplary embodiment of the present invention, the iron loss constitutes a constant component c of the input-output conversion function represented by Eq. (9). Therefore, when the input voltage to the transformer 1802 and the operating frequency are controlled, conversion characteristics of the main power supply unit 101 is controlled.

In general, the following Eq. (19) is established as a power conversion circuit. An output voltage $V_O$ needs to fall within a range of a rated drive voltage of the load 104 and therefore, the input voltage $E_{IN}$ to the transformer 1802 needs to be adjusted in an appropriate range.

$$E_{IN} \times I_{IN} = V_O \times I_O \quad (19)$$

In Eq. (19), when it is assumed that the output voltage $V_O$ and the output current $I_o$ are constant, the input current $I_{IN}$ is increased upon reducing the input voltage $E_{IN}$ to the transformer 1802.

In this case, a copper loss generated in the power conversion circuit in the main power supply unit 101 and a loss resulting from Joule heat generated by an impedance of the power conversion circuit increase. As a result, increase of the copper loss and the loss resulting from Joule heat make effect on terms of $aX^2$ and bX in the input-output conversion function represented by Eq. (9).

Therefore, the controller 803 may reduce the input power $E_{IN}$ to the transformer 1802, when power consumption R at the load 104 is small (the output power from the power conversion circuit is small), and the controller 803 may increase the input power $E_{IN}$ to the transformer 1802, when the power consumption R in the load 104 is large.

By employing the above illustrated configuration a power conversion efficiency of the main power supply unit 101 becomes adjustable. Adjusting the power conversion efficiency of the main power supply unit 101 is not limited to the above illustrated configuration, and other appropriate configuration is arbitrarily employable.

Upon adjusting a power conversion efficiency of the main power supply unit 101, the conversion-characteristic-control unit 1201 changes the input-output conversion model set for the main power supply unit 101. For example, assuming that the quadratic function of Eq. (9) is employed as the input-output conversion model in the main power supply unit 101. In this case, upon adjusting a power conversion efficiency of the main power supply unit 101, the conversion-characteristic-control unit 1201 changes coefficients a, b, and c of the quadratic function of the main power supply unit 101. As illustrated in FIG. 17, when the main power supply unit 101 is configured by using a plurality of power supply apparatuses A to N, the input-output conversion model with respect to each power supply apparatus may be changed, or the input-output conversion model as the entire main power supply unit 101 configured by integrating the respective power supply apparatuses may be changed.

As described above, in the power supply system in the present embodiment, the conversion-characteristic-control unit 1201 controls a power conversion efficiency of the main power supply unit 101 so that the output power realizing a highest value (peak) of the power conversion efficiency in the main power supply unit 101 becomes an average value of the power consumption at the load 104 for a given period of time.

The conversion-characteristic-control unit 1201 controls the power conversion efficiency of the main power supply unit 101 so that the charge power and the discharge power in the auxiliary power supply unit 105 are balanced.

As a result, charge-and-discharge in the auxiliary power supply unit are balanced, and overcharge and over-discharge in the power storage unit 106 are prevented. Therefore, the output power of the main power supply unit 101 is complemented by the charge-and-discharge power of the auxiliary power supply unit 105.

As a result, in the power supply system in the present embodiment realizes optimization of power conversion efficiency over an operating time of the entire power supply system.

Fourth Exemplary Embodiment

A fourth exemplary embodiment of the present invention based on the first to third exemplary embodiments of the present invention will be described with reference to FIG. 12 in the same manner as the third exemplary embodiment. In the following description, characteristic configurations according to the present embodiment will be mainly described. In the description, the same reference number will be assigned to the same configuration as in the first to third exemplary embodiments for omitting overlapping description.

In the same manner as in the first to third exemplary embodiments described above, the power supply system in the fourth exemplary embodiment of the present invention includes, as illustrated in FIG. 12, the main power supply unit 101, the power measurement unit 102, the auxiliary power supply unit 105 including the power storage unit 106, and the power supply control unit 103. Outputs of the main power supply unit 101 and the auxiliary power supply unit 105 are integrated to be supplied to the load 104. The power supply system in the present embodiment employs the quadratic function represented by Eq. (9) as the input-output conversion model in the main power supply unit 101.

The fourth exemplary embodiment of the present invention differs from the first to third exemplary embodiments only in an configuration and processing of the power supply control unit 103 and therefore, these different portions will be mainly described below.

In the same manner as in the third exemplary embodiment, the power supply control unit 103 in the present embodiment includes the conversion function derivation unit 801, the conversion efficiency calculation unit 802, and the controller 803. These elements of the power supply control unit 103 are connected communicatably to each other.

In the present embodiment, the controller 803 further includes a charge-discharge-amount adjustment unit 1202.

The charge-discharge-amount adjustment unit 1202 may be implemented by dedicated hardware (a circuit) or the like. When the power supply control unit 103 is configured by using a general-purpose hardware resource and a software program executed by the general-purpose hardware, the charge-discharge-amount adjustment unit 1202 may be implemented as a module of the software program.

In the present embodiment, the charge-discharge-amount adjustment unit 1202 is configured as an element of the controller 803 but may be provided as an independent element of the power supply control unit 103 separately from the controller 803.

An operation of the power supply system according to the present embodiment configured as described above will be described below.

In the third exemplary embodiment, to keep a balance of a charge power and a discharge power in the auxiliary power supply unit 105, the conversion-characteristic-control unit 1201 in the controller 803 adjusts power conversion characteristics of the main power supply unit 101.

In contrast, in the present embodiment, to keep a balance of the charge power and the discharge power in the auxiliary power supply unit 105, the charge-discharge-amount adjustment unit 1202 adjusts a maximum output power β of the auxiliary power supply unit 105.

In the present embodiment, a minimum power conversion efficiency "e" is introduced for the main power supply unit 101. When a power conversion efficiency in the main power supply unit 101 is lower than the minimum power conversion efficiency "e", the controller 803 in the present embodiment performs control for supplying power from the auxiliary power supply unit 105. The charge-discharge-amount adjustment unit 1202 in the present embodiment adjusts the minimum power conversion efficiency "e" in addition to the maximum output power β described above to keep a balance of the charge power and the discharge power in the auxiliary power supply unit 105.

Figure 19:
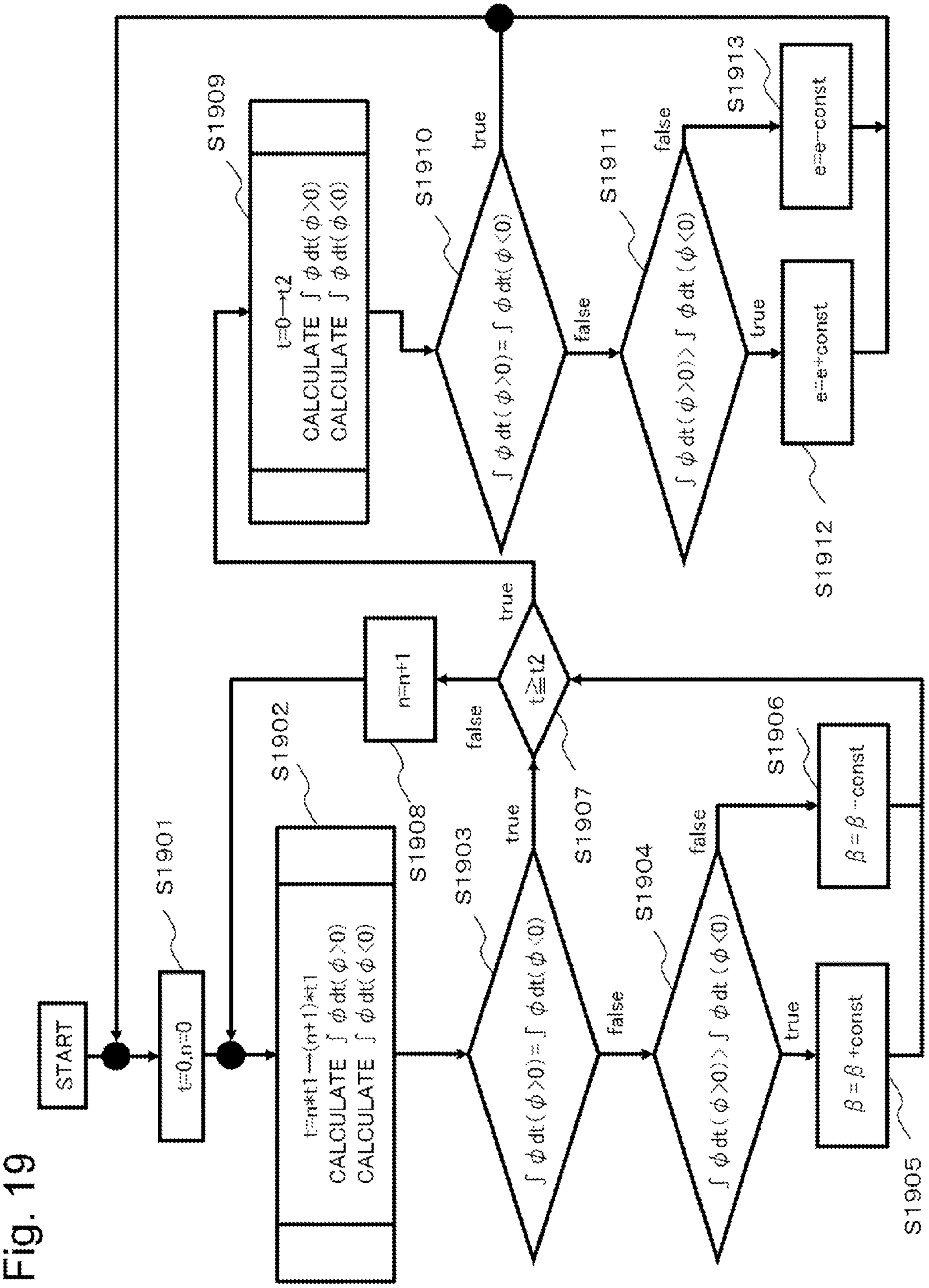
FIG. 19 is a flowchart illustrating a process of adjusting a minimum power conversion efficiency in a main power supply unit and a maximum output power in an auxiliary power supply unit in a fourth exemplary embodiment of the present invention.

An operation of the charge-discharge-amount adjustment unit 1202 will be described with reference to FIG. 19. FIG. 19 is a flowchart exemplarily illustrating a process of adjusting a minimum power conversion efficiency, and a maximum output power of the auxiliary power supply unit.

Initially, the charge-discharge-amount adjustment unit 1202 sets a counter "n" as n=0, and an accumulated time "t" as t=0 (step S1901).

Then, the charge-discharge-amount adjustment unit 1202 calculates accumulated values P by using Eq. (17) and Eq. (18), within a given period of time $((n\times t1)\leq t\leq((n+1)\times t1))$, within adjustment value $\phi(-\beta\leq\phi\leq\alpha)$ of the output power calculated in the conversion efficiency calculation unit 802 (step S1902). In this case, the charge-discharge-amount adjustment unit 1202 calculates the accumulated values P for both cases of $\phi>0$ and $\phi<0$.

Then, the charge-discharge-amount adjustment unit 1202 determines whether P $(\phi>0)$=P $(\phi<0)$ is satisfied (step S1903).

When the determination result in step S1903 is true, the charge-discharge-amount adjustment unit 1202 determines whether the accumulated time is larger than a predetermined time t2 (step S1907). When the determination result in step S1907 is false, the counter "n" is incremented (step S1908), and the charge-discharge-amount adjustment unit 1202 continues processing from step S1902. In this case, a charge amount and a discharge amount in the auxiliary power supply unit 105 are balanced and therefore, no adjustment is necessary.

When the determination result in step S1907 is true, the charge-discharge-amount adjustment unit 1202 continues processing from step S1909. The processing from step S1909 will be described later.

When the determination result in step S1903 is false, the charge-discharge-amount adjustment unit 1202 determines whether the charge power P $(\phi>0)$ is larger than the discharge power P $(\phi<0)$ within a given period of time (step S1904).

When the determination result in step S1904 is true (the charge power P $(\phi>0)$ is larger), the charge-discharge-amount adjustment unit 1202 increases a maximum output power (a discharge amount of the power storage unit 106) β of the auxiliary power supply unit 105 by a predetermined constant ("const") (step S1905) and continues processing from step S1907.

When the determination result in step S1904 is false (the discharge power P $(\phi<0)$ is larger), the charge-discharge-amount adjustment unit 1202 decreases the maximum output power β of the auxiliary power supply unit 105 by the predetermined constant ("const") (step S1906) and continues processing from step S1907.

The aforementioned processing causes the charge-discharge-amount adjustment unit 1202 to adjust the maximum output power β of the auxiliary power supply unit 105. An appropriate value may be arbitrarily selectable for the predetermined constant ("const").

Next, processing from step S1909 will be described.

The charge-discharge-amount adjustment unit 1202 calculates, by using Eq. (17) and Eq. (18), accumulated values P within a given period of time $(0\leq t\leq t2)$ (step S1909). In this case, the charge-discharge-amount adjustment unit 1202 calculates the accumulated values P for both cases of $\phi>0$ and $\phi<0$.

Then, the charge-discharge-amount adjustment unit 1202 determines whether P $(\phi>0)$=P $(\phi<0)$ is satisfied (step S1910). When the determination result in step S1910 is true, the charge-discharge-amount adjustment unit 1202 continues processing from step S1901. In this case, a charge amount and a discharge amount in the auxiliary power supply unit 105 are balanced and therefore, any adjustment is not particularly necessary.

Then, when the determination result in step S1910 is false, the charge-discharge-amount adjustment unit 1202 determines whether the charge power P $(\phi>0)$ is larger than the discharge power P $(\phi<0)$ within a given period of time (step S1911).

When the determination result in step S1911 is true (the charge power P $(\phi>0)$ is larger), the charge-discharge-amount adjustment unit 1202 increases a minimum power conversion efficiency "e" in the main power supply unit 101 by a predetermined constant ("const") (step S1912) and continues processing from step S1901.

When the determination result in step S1911 is false (the discharge power P $(\phi<0)$ is larger), the charge-discharge-amount adjustment unit 1202 decreases the minimum power conversion efficiency "e" in the main power supply unit 101 by the predetermined constant ("const") (step S1913) and continues processing from step S1901.

The charge-discharge-amount adjustment unit 1202 adjusts the minimum power conversion efficiency "e", by above described process. an appropriate value may be arbitrarily selected for the predetermined constant ("const"), . And also, an appropriate value determined through experiments and the like may be arbitrarily selected for an initial value of the minimum power conversion efficiency "e".

Next, the adjustment of a maximum output power β will be described with reference to FIG. 14.

A total output power of the auxiliary power supply unit 105, for a given period of time $(0\leq t\leq T)$, is expressed by a total area of regions, where a power adjustment value $\phi<0$ is satisfied in FIG. 14. Therefore, when the absolute value of β is increased, an area of the regions is increased. As a result, the output power of the auxiliary power supply unit 105 (a discharge power in the power storage unit 106) is increased.

In contrast, when the absolute value of β is decreased, an area of the region is decreased. As a result, the output power of the auxiliary power supply unit 105 (a discharge power in the power storage unit 106) is decreased.

In this manner, the charge-discharge-amount adjustment unit 1202 controls the output power of the auxiliary power supply unit 105 so that a charge power and a discharge power in the auxiliary power supply unit 105 are balanced, by adjusting the maximum output power β.

Figure 20:
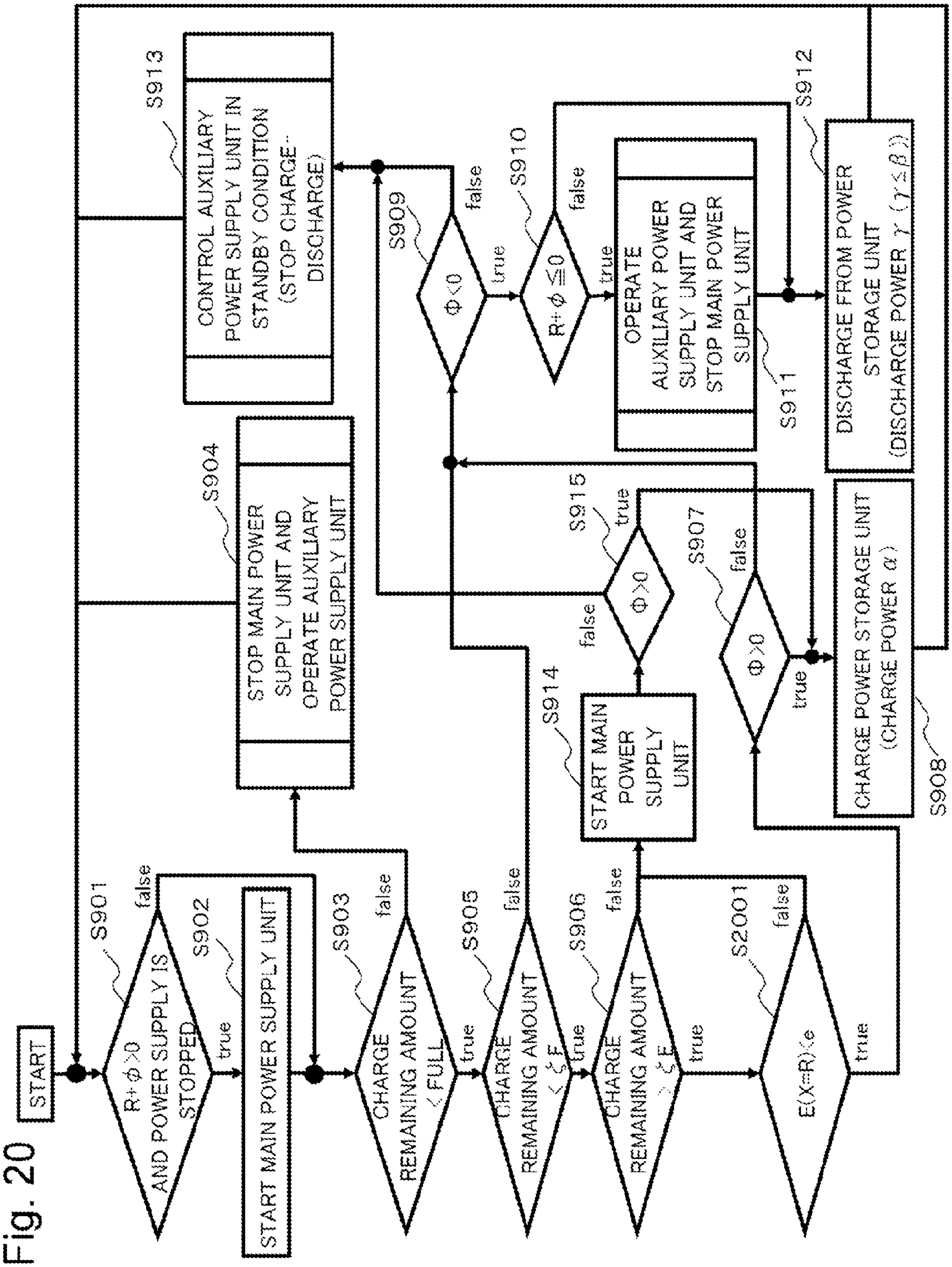
FIG. 20 is a flowchart illustrating a process of controlling power supply from the main power supply unit, and charge-and-discharge with respect to the auxiliary power supply unit in the fourth exemplary embodiment of the present invention.
Figure 21:
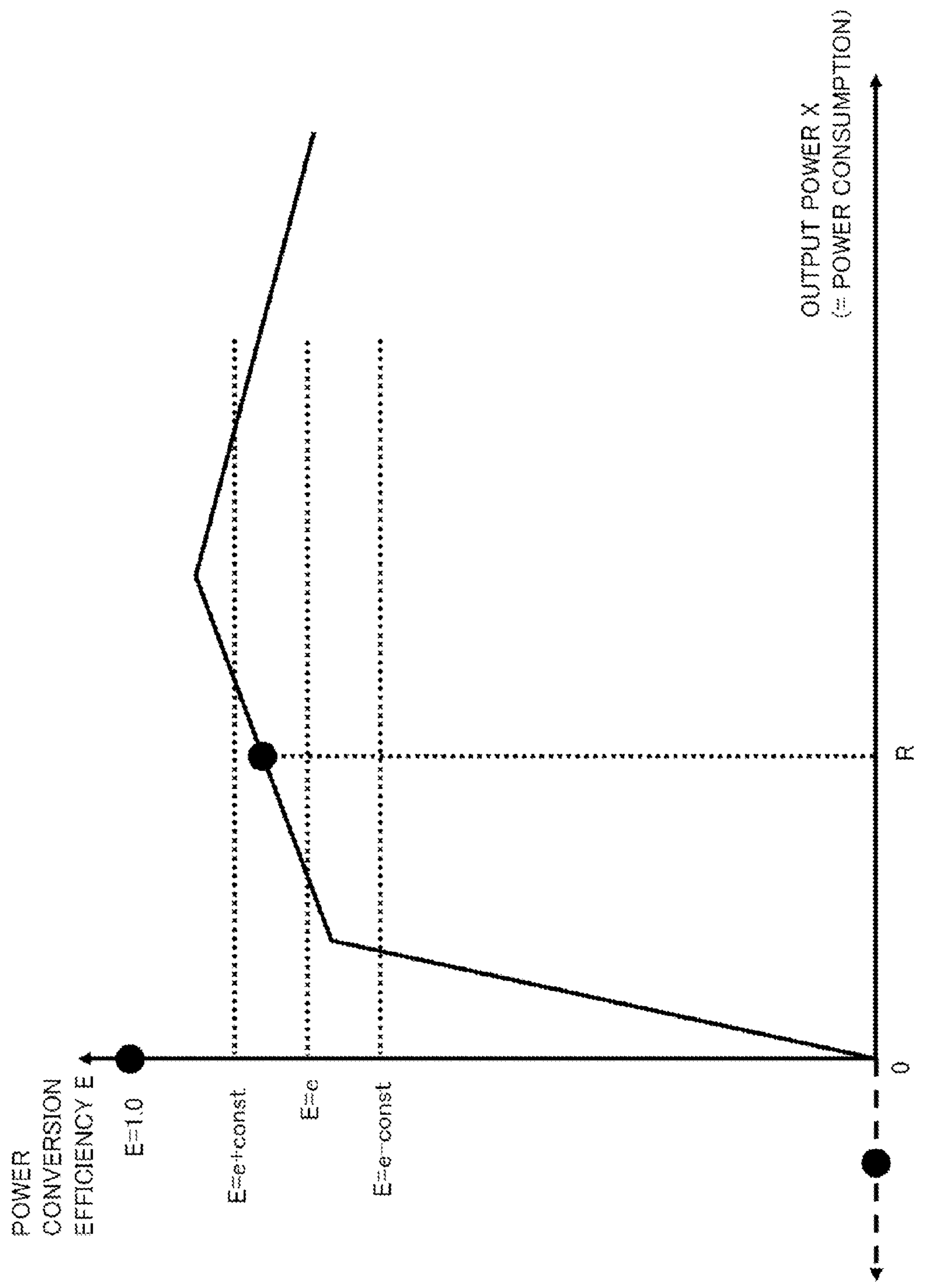
FIG. 21 is a schematic view illustrating a relationship between an efficiency curve of power conversion in the main power supply unit and a minimum power conversion efficiency in the fourth exemplary embodiment of the present invention.

Next, the adjustment of a minimum power conversion efficiency "e" will be described with reference to FIG. 20 and FIG. 21. FIG. 20 is a flowchart illustrating a process of controlling power supply from the main power supply unit and charge-discharge for the auxiliary power supply unit in the present embodiment. FIG. 21 is a schematic view illustrating a relationship between an efficiency curve of power conversion in the main power supply unit 101 and a minimum power conversion efficiency "e".

Figure 9:
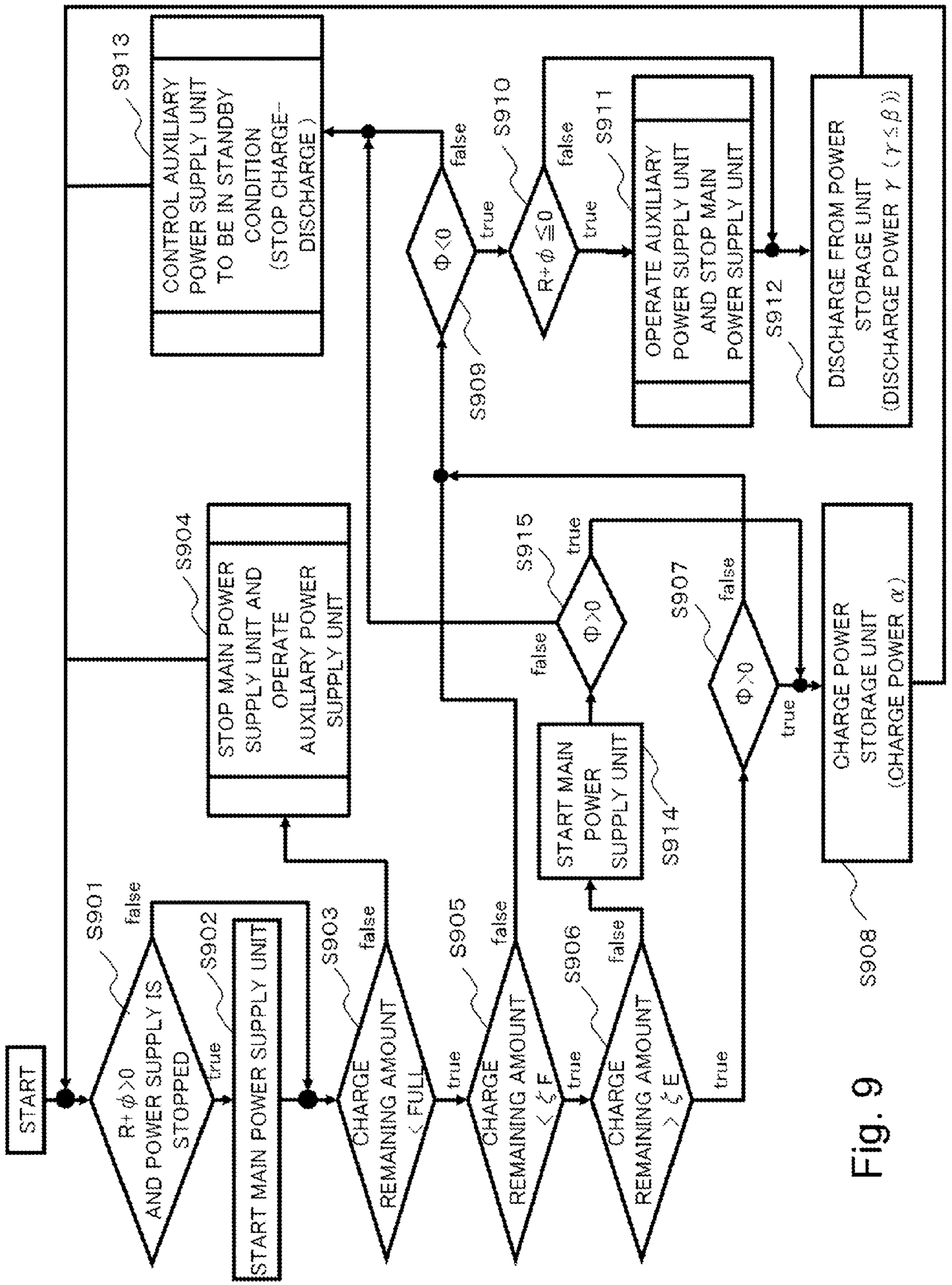
FIG. 9 is a flowchart illustrating a process of controlling power supply from a main power supply unit, and charge-and-discharge with respect to an auxiliary power supply unit in a controller according to the second exemplary embodiment of the present invention.

As for the operation of the controller 803 in the present embodiment illustrated in FIG. 20, determination processing of step S2001 is added to the operation of the controller 803 in the second exemplary embodiment illustrated in FIG. 9, and the others are equal to the operations in the second exemplary embodiment.

The controller 803 in the present embodiment determines whether a power conversion efficiency in the main power supply unit 101 is lower than a given minimum power conversion efficiency "e" (step S2001).

When the determination result in step S2001 is true, the controller 803 executes processing from step S907.

When the determination result in step S907 is false and the determination result in step S909 is true, the controller 803 controls the auxiliary power supply unit 105 to supply the output power γ in step S912.

When the determination result in step S2001 is false, the controller 803 controls the auxiliary power supply unit 105 to supply no output power.

Referring to FIG. 21, in a region where E (which represents power conversion efficiency) is less than "e" (which represents minimum power conversion efficiency), the output power from the auxiliary power supply unit 105 (a discharge power in the power storage unit 106) may be supplied. According to FIG. 21, when the charge-discharge-amount adjustment unit 1202 increases the absolute value of "e" (step S1912 of FIG. 19), a region, where the determination result of step S2001 is true, is increased. Therefore, a region where the output power is supplied from the auxiliary power supply unit 105 is increased.

In contrast, when the charge-discharge-amount adjustment unit 1202 decreases the absolute value of "e" (step S1913 of FIG. 19), a region, where the determination result of step S2001 is false, is increased. Therefore, a region where the output power is supplied from the auxiliary power supply unit 105 is decreased.

In this manner, the charge-discharge-amount adjustment unit 1202 controls a discharge power in the auxiliary power supply unit 105 so that the charge power and the discharge power in the auxiliary power supply unit 105 are balanced, by adjusting the minimum power conversion efficiency "e" in the main power supply unit 101.

As described above, in the power supply system in the present embodiment, the charge-discharge-amount adjustment unit 1202 controls an increase and decrease in the output power amount of the auxiliary power supply unit 105 within a given period of time by adjusting the maximum output power β of the auxiliary power supply unit 105 and the minimum power conversion efficiency "e" in the main power supply unit 101. As a result, charge-and-discharge in the auxiliary power supply unit 105 are balanced, and overcharge and over-discharge in the power storage unit 106 are prevented. Also, the charge-and-discharge power of the auxiliary power supply unit 105 complement the output power of the main power supply unit 101.

According to the description made above, in the same manner as in the first and second exemplary embodiments, in the power supply system in the present embodiment realizes optimization of power conversion efficiency over an operating time of the entire power supply system.

The power supply control unit 103 and the controller 803 of the present invention may be configured by combining the present embodiment and the third exemplary embodiment.

Fifth Exemplary Embodiment

Next, a fifth exemplary embodiment of the present invention based on the first to fourth exemplary embodiments of the present invention described above will be described with reference to FIG. 22. In the following description, characteristic configurations according to the present embodiment will be mainly described. In the description, the same reference number will be assigned to the same configuration as in the first to fourth exemplary embodiments for omitting overlapping description.

Figure 22:
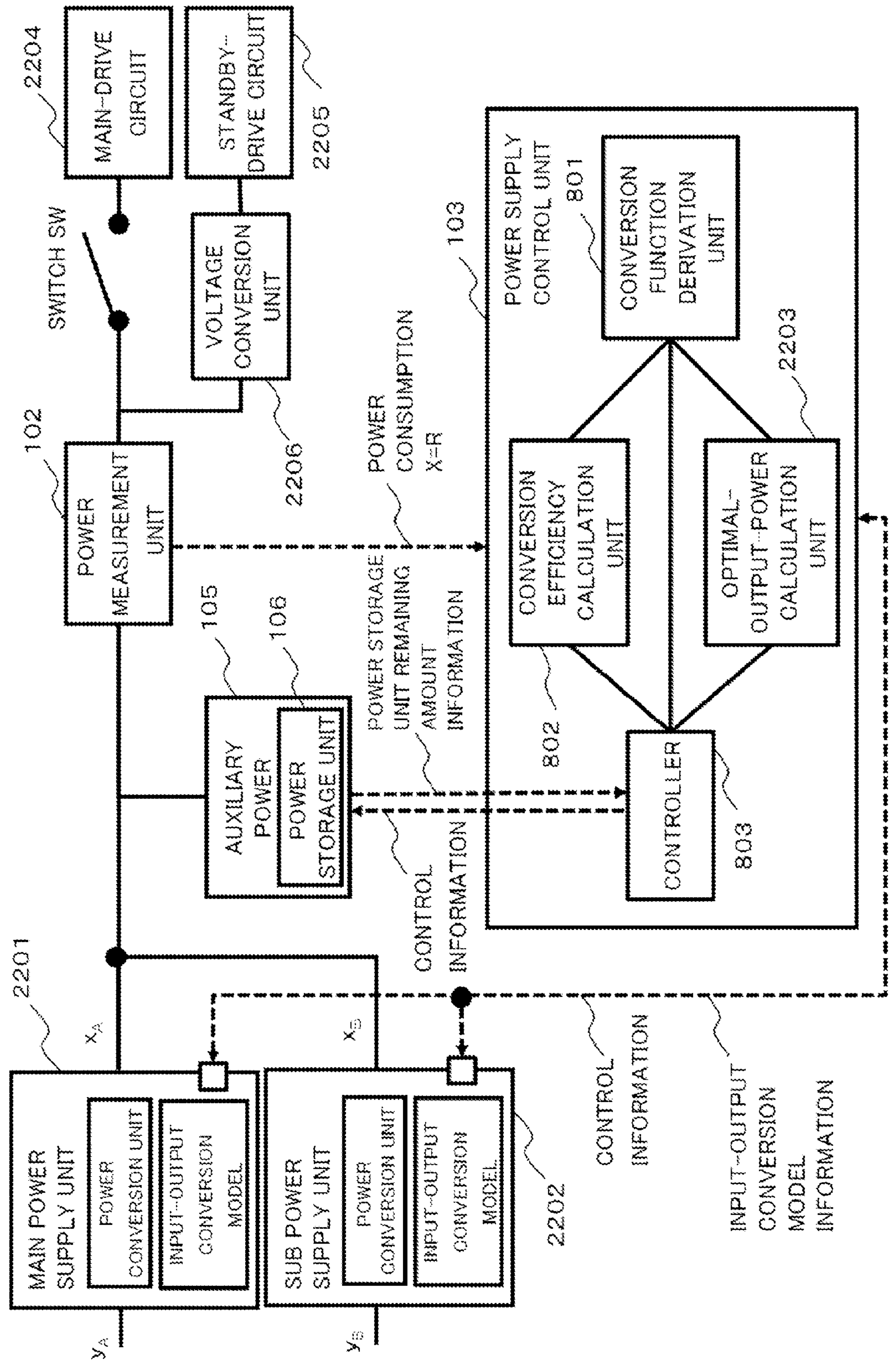
FIG. 22 is a diagram illustrating a configuration of a power supply system in a fifth exemplary embodiment of the present invention.

FIG. 22 is a diagram illustrating a configuration of a power supply system in the fifth exemplary embodiment of the present invention. In the same manner as in the third and fourth exemplary embodiments, the power supply system in the fifth exemplary embodiment of the present invention includes, as illustrated in FIG. 22, a main power supply unit 2201, the power measurement unit 102, the auxiliary power supply unit 105 including the power storage unit 106, and the power supply control unit 103.

The power supply system in the present embodiment includes, in addition thereto, a sub power supply unit 2202, an optimal-output-power calculation unit 2203, a voltage conversion unit 2206, and a main-drive circuit 2204 and a standby-drive circuit 2205 acting as loads. Outputs of the main power supply unit 2201, the sub power supply unit 2202, and the auxiliary power supply unit 105 are integrated to be supplied to the main-drive circuit 2204 and the standby-drive circuit 2205 as loads.

The main power supply unit 2201 is a DC power supply source that performing AC/DC conversion or DC/DC conversion to output a DC power $x_A$ to the output stage. The main power supply unit 2201 includes a circuit having a relatively large output power capacity capable of driving the main-drive circuit 2204 consuming large power. For example, as the circuit configuring the main power supply unit 2204, a double forward circuit or a full-bridge circuit may be employable.

The sub power supply unit 2202 is a DC power supply source for outputting a DC power $x_B$ to the output stage. The sub power supply unit 2202 includes a circuit having a relatively small output power capacity capable of driving the standby-drive circuit 2205 consuming small power. For example, as the circuit configuring the sub power supply unit 2202, a flyback circuit or a series regulator circuit may be employable.

For each of the main power supply unit 2201 and the sub power supply unit 2202 in the present embodiment, a quadratic function as represented in Eq. (9) is set as the input-output conversion model.

Specifically, in the power supply system according to the present embodiment, regarding the main power supply unit 2201 and the sub power supply unit 2202, the quadratic functions of the following Eqs. (20) and (21) are employed as input-output conversion models, respectively.

The term $y_A$ represents an input power of the main power supply unit 2201 and $x_A$ represents the output power of the main power supply unit 2201. The term $y_B$ represents an input power of the sub power supply unit 2202 and $x_B$ represents the output power of the sub power supply unit 2202. Coefficients a, b, c, d, e, and f of the following equations are calculated from measured values of input-output characteristics, of the main power supply unit 2201 and the sub power supply unit 2202, measured separately by using a least-squares method or the like. For example, these values (of coefficients) may be previously set, in a setting region configured by using a non-volatile memory or the like implemented in each power supply unit.

$$y_A = ax_A^2 + bx_A + c \qquad (20)$$

$$y_B = dx_B^2 + ex_B + f \qquad (21)$$

The power measurement unit 102 is connected to the output sides of the main power supply unit 2201, the sub power supply unit 2202, and the auxiliary power supply unit 105 and measures a total output power of the respective power supply units. Any known method is employable as the measurement method of the power measurement unit 102, and therefore, description thereof is omitted. In the present embodiment, the output power of each power supply unit is supplied to the main-drive circuit 2204 and the standby-drive circuit 2205 functioning as loads. Therefore, the output power measured by the power measurement unit 102 is considered as power consumption R in the drive circuits.

The power supply control unit 103 adjusts output powers of the main power supply unit 2201 and the sub power supply unit 2202 so as to maximize a power conversion efficiency of the entire power supply system according to the power consumption R measured by the power measurement unit 102. Thereby, the power supply control unit 103 controls the charge-and-discharge power of the auxiliary power supply unit 105.

The power supply control unit 103, the main power supply unit 2201, the sub power supply unit 2202, the auxiliary power supply unit 105, and the power measurement unit 102 are connected communicatably to each other so as to transmit and receive the output voltage and the input-output conversion model of each power supply unit, a variety of data such as a measured output power value and the like, a control signal, as in the first exemplary embodiment. For communication paths and a communication protocol for these connections, known techniques are employable in the same manner as in the power supply control unit 103 of the first exemplary embodiment.

The power supply control unit 103 includes, the conversion function derivation unit 801, the conversion efficiency calculation unit 802, the controller 803, and the optimal-output-power calculation unit 2203.

These elements of the power supply control unit 103 are connected communicatably to each other to transmit and receive data, a control command, and the like. The known techniques are also applicable for communication paths among these element and a communication protocol.

As described in the first exemplary embodiment, when the power supply control unit 103 is configured by using a general-purpose hardware resource and a software program executed by the general-purpose hardware, the respective elements of the power supply control unit 103 may be realized as a module of the software program.

The conversion function derivation unit 801, the conversion efficiency calculation unit 802, and the controller 803 are the same as in the second to fourth exemplary embodiments and therefore, description thereof will be omitted.

The optimal-output-power calculation unit 2203 refers to power consumption measured by the power measurement unit 102 and the input-output conversion model derived by the conversion function derivation unit 801. Then, the optimal-output-power calculation unit 2203 calculates output powers of the main power supply unit 2201 and the sub power supply unit 2202 so as to minimize an input power of the entire power supply system with respect to the measured power consumption.

In addition to the operations described in the second to fourth exemplary embodiments, the controller 803 transmits control signals to the main power supply unit 2201 and the sub power supply unit 2202 and controls the output power of each power supply unit so as to output the output powers calculated in the optimal-output-power calculation unit 2203.

The main-drive circuit 2204 is a main load of the power supply system and is driven when a power supply switch SW is ON.

The standby-drive circuit 2205 is a load driven for standby driving when the power supply switch SW is OFF. The standby-drive circuit 2205 may also be driven when the power supply switch SW is ON. Power consumption of the standby-drive circuit is smaller than power consumption of the main-drive circuit.

The auxiliary power supply unit 105 is the same as in the first to fourth exemplary embodiments and therefore, description thereof will be omitted. The power supply system in the present embodiment employs a secondary battery, as the power storage unit 106, capable of supplying rated maximum outputs of the power supply units 2201 and 2202 for at least a predetermined period of time.

The voltage conversion unit 2206 is a voltage conversion circuit for the standby-drive circuit 2205 and, for example, an arbitrary DC/DC converter or the like is applicable.

When a drive voltage of the standby-drive circuit 2204 differs from the output voltage of each power supply unit, the voltage conversion unit 2206 applies voltage-conversion to the output power of each power supply unit to be supplied to the standby-drive circuit 2205. Whether or not to connect the voltage conversion unit 2206 is arbitrarily selectable, according to a drive voltage of the standby-drive circuit 2205.

Next, an operation of the power supply system in the present embodiment configured as described above will be described. In the present embodiment, in addition to the processing in the first exemplary embodiment illustrated in FIG. 2, the power supply control unit 103 controls output powers of the main power supply unit 2201 and the sub power supply unit 2202 so as to minimize the input power of the entire power supply system.

Figure 23:
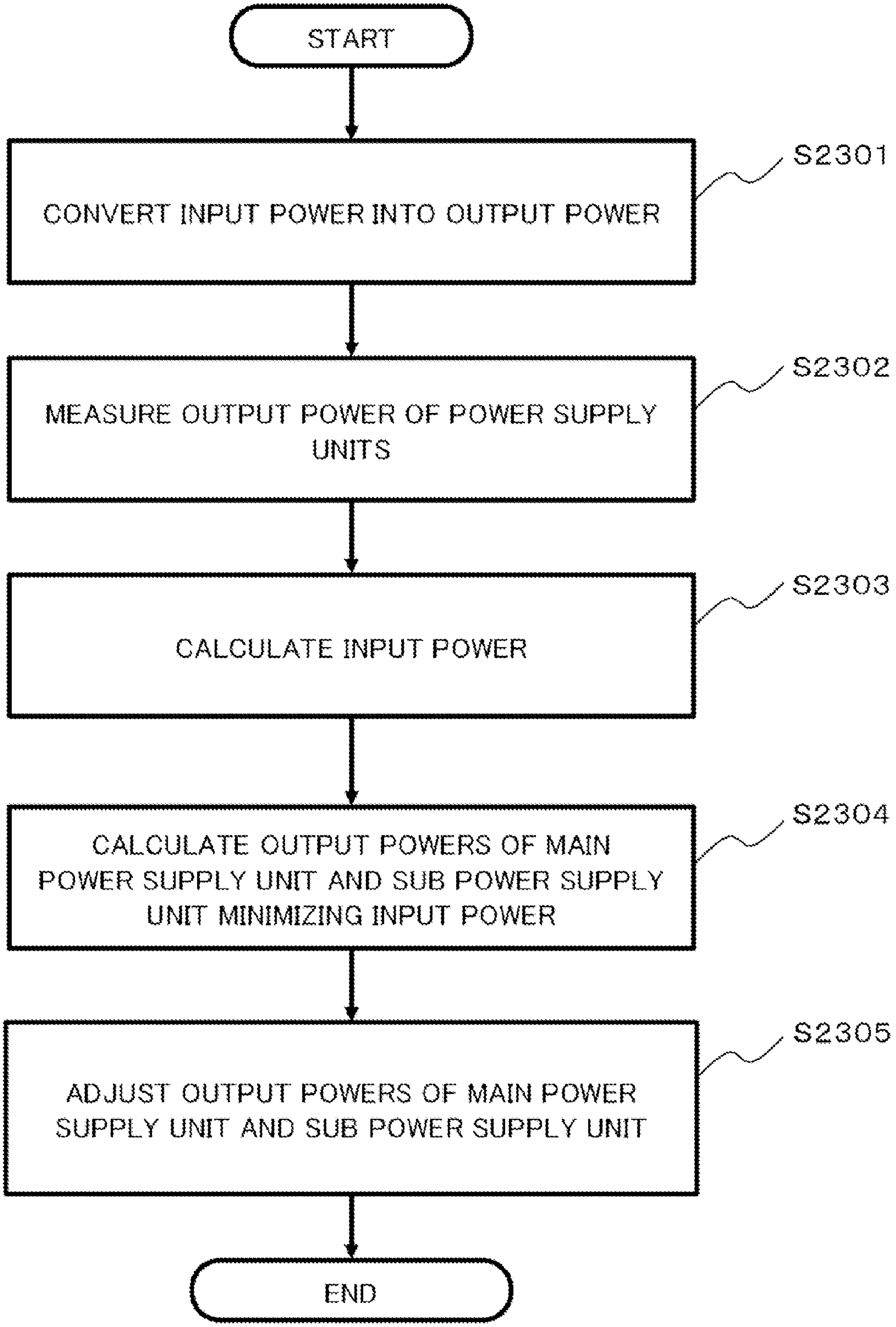
FIG. 23 is a flowchart illustrating a process of controlling output powers of a main power supply unit and a sub power supply unit in the fifth exemplary embodiment of the present invention.

With reference to FIG. 23, output power control of the main power supply unit 2201 and the sub power supply unit 2202 performed by the power supply control unit 103 is described below.

Step S2301 to step S2302 in FIG. 23 are substantially the same as step S201 to step S202 in FIG. 2, and therefore, description thereof will be omitted.

Then, the power supply control unit calculates a total input power Y to the power supply system based on power consumption R at loads measured in the power measurement unit 102 and the input-output conversion model set for each power supply unit (step S2303).

Processing in step S2303 is described as below. The conversion function derivation unit 801 is connected communicatably to the main power supply unit 2201 and the sub power supply unit 2202 and refers to the input-output conversion model of each power supply unit.

The conversion function derivation unit 801 may acquire, for example, information (values) of coefficients of a quadratic function set for each power supply unit as data via the aforementioned communication path.

When the input-output conversion models of the main power supply unit 2201 and the sub power supply unit 2202 are expressed as $f_A$ and $f_B$, respectively, the following Eq. (22) is established with respect to a total input power Y of the entire system.

$$Y = \sum_{i=A}^{B} y_i = y_A + y_B = f_A(x_A) + f_B(x_B) \tag{22}$$

When the Eqs. (20) and (21) are applied to Eq. (22), the following Eq. (23) is obtained as an input-output conversion function.

$$\begin{aligned} Y &= \sum_{i=A}^{B} y_i \\ &= \sum_{i=A}^{B} f_i(x_i) \\ &= f_A(x_A) + f_B(x_B) \\ &= ax_A^2 + bx_A + c + dx_B^2 + ex_B + f \end{aligned} \tag{23}$$

The conversion function derivation unit 801 notifies the optimal-output-power calculation unit 2203 to be described later of the input-output conversion function of Eq. (23). The optimal-output-power calculation unit 2203 may be notified of coefficients of the quadratic function of Eq. (23) as data. Any appropriate method is selectable, for a specific notification method, according to a connection method between the conversion function derivation unit 801 and the optimal-output-power calculation unit 2203. As the notification method, for example, a command for I2C is adoptable, but the method is not limited thereto.

Then, the power supply control unit 103 calculates output powers of the main power supply unit 2201 and the sub power supply unit 2202 so as to minimize the calculated total input power Y (step S2304).

Processing in step S2304 is described below. The optimal-output-power calculation unit 2203 refers to the power consumption at loads measured by the power measurement unit 102 and the input-output conversion function derived in the conversion function derivation unit 801. Then, the optimal-output-power calculation unit 2203 calculates $x_A$ and $x_B$ minimizing the input power Y represented by Eq. (23) by using the referred values.

More specifically, the optimal-output-power calculation unit 2203 calculates the output power $x_A$ of the main power supply unit 2201 and the output power $x_B$ of the sub power supply unit 2202 so as to minimize the input power Y in each of three cases of (i) to (iii) as described below.

(i) The case in which both of the main power supply unit 2201 and the sub power supply unit 2202 are operated, (ii) The case in which only the main power supply unit 2201 is operated, (iii) The case in which only the sub power supply unit 2202 is operated.

In the case (i) where both the main power supply unit 2201 and the sub power supply unit 2202 are operated, the optimal-output-power calculation unit 2203 calculates the input power Y and output powers $x_A$ and $x_B$ as described below.

First of all, power consumption at loads measured by the power measurement unit 102 is represented as R. Output powers from the main power supply unit 2201 and the sub power supply unit 2202 are integrated at a connection point of the output side and supplied to the loads (the main-drive circuit 2204 and the standby-drive circuit 2205). Thereby, the following Eq. (24) is established.

$$R = x_A + x_B \tag{24}$$

From Eq. (24), $x_B = R - x_A$ is obtained. When this is applied to Eq. (23) that is the input-output conversion function notified from the conversion function derivation unit 801, the following Eq. (25) is obtained.

$$Y = ax_A^2 + bx_A + c + dx_B^2 + ex_B + f = ax_A^2 + bx_A + c + d(R - x_A)^2 + e(R - x_A) + f \tag{25}$$

When the output power Y is minimized, a differential component Y' of Y satisfies Y'=0 and therefore, the following Eq. (26) is satisfied.

$$Y' = 2(a+d)x_A + b - 2dR - e = 0 \tag{26}$$

Thereby, the optimal-output-power calculation unit 2203 calculates optimal output powers $x_A$ and $x_B$ for the main power supply unit 2201 and the sub power supply unit 2202, respectively, as described below.

$$x_A = \frac{e + 2dR - b}{2(a+d)} \tag{27}$$

$$x_B = R - x_A = \frac{b + 2aR - e}{2(a+d)} \tag{28}$$

As described above, the optimal-output-power calculation unit 2203 refers to the power consumption R at loads measured by the power measurement unit 102 and specific coefficients (a to f) of the quadratic function model derived by the conversion function derivation unit 801, and substitutes these values into calculation equations (27) and (28) to calculate the output powers $x_A$ and $x_B$. By substituting $x_A$ and $x_B$ calculated in Eqs. (27) and (28) into the above Eq. (23), the optimal-output-power calculation unit 2203 is able to calculated the input power Y.

In the present embodiment, the optimal-output-power calculation unit 2203 may hold (store) Eq. (23), Eq. (27), and Eq. (28). As a specific holding (storing) method of these calculation equations in the optimal-output-power calculation unit 2203, any appropriate method is applicable according to a configuration of the power supply control unit 103. For example, when the power supply control unit 103 is configured as a single hardware device, a logic equivalent to each calculation equation may be realized by using a circuit. When the power supply control unit includes hardware such as a general-purpose CPU and memory and the like, and a software program, each calculation equation may be stored (implemented) in the software program.

In the aforementioned case (ii) where only the main power supply unit 2201 is operated, the optimal-output-power calculation unit 2203 calculates the input power Y and output powers $x_A$ and $x_B$ as described below.

Initially, the sub power supply unit 2202 is stopped to satisfy the output power $x_B=0$. When the power consumption at loads measured by the power measurement unit 102 is represented as R, the following Eq. (29) is established.

$$R=x_A \tag{29}$$

The following Eq. (30) is obtained from Eq. (22).

$$Y=\sum_{i=A}^{B} y_i=\sum_{i=A}^{B} f_i(x_i)=aR^2+bR+c+f \tag{30}$$

The coefficient f of Eq. (30) corresponds to a standby power of the sub power supply unit 2202. In the present embodiment, the sub power supply unit 2202 may be completely stopped to satisfy the input power $y_B=0$. The total input power in this case is represented by the following Eq. (31).

$$Y=\sum_{i=A}^{B} y_i=y_A=aR^2+bR+c \tag{31}$$

As described above, the optimal-output-power calculation unit 2203 refers to power consumption R at loads measured by the power measurement unit 102 and specific coefficients of the quadratic function model derived by the conversion function derivation unit 801, and substitutes these values into the above corresponding calculation equations to calculate the input power Y and the output power $x_A$. In the present embodiment, the optimal-output-power calculation unit 2203 may hold (store) Eq. (30) or (31). As a specific holding method of these calculation equation, an appropriate method is selectable according to a configuration of the power supply control unit 103. The power supply system in the present embodiment may select appropriately Eq. (30) or (31) as the calculation equation of the input power according to specific configurations of each power supply unit and the power supply control unit 103. For example, when the power supply control unit 103 controls the sub power supply unit 2202 to be in standby condition, Eq. (30) may be selected. For example, when, the power supply control unit 103 controls the sub power supply unit 2202 to stop completely, Eq. (31) may be selected.

In the aforementioned case (iii) where only the sub power supply unit 2202 is operated, the optimal-output-power calculation unit 2203 calculates the input power Y and output powers $x_A$ and $x_B$ as described below.

Initially, when the main power supply unit 2201 is stopped to allow the output power to satisfy $x_A=0$ and the power consumption at loads measured by the power measurement unit 102 is represented as R, the following Eq. (32) is established.

$$R=x_B \tag{32}$$

From the above Eq. (22), the following Eq. (33) is obtained.

$$Y=\sum_{i=A}^{B} y_i=\sum_{i=A}^{B} f_i(x_i)=dR^2+eR+c+f \tag{33}$$

The coefficient c of Eq. (33) corresponds to a standby power of the main power supply unit 2201. In the present embodiment, the main power supply unit 2201 may be completely stopped to allow the input power to satisfy $y_A=0$. The total input power in this case is represented by the following Eq. (34).

$$Y=\sum_{i=A}^{B} y_i=y_B=dR^2+eR+f \tag{34}$$

As described above, the optimal-output-power calculation unit 2203 refers to power consumption R at loads measured by the power measurement unit 102 and specific coefficients of the quadratic function model derived by the conversion function derivation unit 801 to calculate the input power Y and the output power $x_B$ by substituting these values into the above calculation equation. In the present embodiment, the optimal-output-power calculation unit 2203 may hold (store) Eq. (33) or (34). As a specific holding method of these calculation equation, any appropriate method is selectable according to a configuration of the power supply control unit. The power supply system in the present embodiment may select appropriately Eq. (33) or (34) as the calculation equation of the input power according to specific configurations of each power supply unit and the power supply control unit 103 in the same manner as in the case (ii) as described above.

The optimal-output-power calculation unit 2203 compares output powers Y calculated regarding the respective cases (i) to (iii) as described above, selects $x_A$ and $x_B$ where the output power Y is minimized as optimal output powers of the main power supply unit 2201 and the sub power supply unit 2202, respectively, and notifies the connected controller 803 of the selected output powers. As a specific notification method, an appropriate method is selectable according to a connection method between the optimal-output-power calculation unit 2203 and the controller 803. For example, as the notification method, a command for I2C communication described above is adoptable, but the method is not limited thereto.

Then, the power supply control unit 103 controls the main power supply unit 2201 and the sub power supply unit 2202 to output the optimal output powers calculated in step S2304 (step S2305).

Processing in step S2305 is described below. The controller 803 controls the main power supply unit 2201 and the sub power supply unit 2202 so as to output powers notified from the optimal-output-power calculation unit 2203.

The controller 803 in the present embodiment can adjust an output voltage ratio of the main power supply unit 2201 and the sub power supply unit 2202 in the same manner as in the adjustment of output powers of the main power supply unit 101 and the auxiliary power supply unit 105 in the second exemplary embodiment. A specific adjustment method is substantially the same as in the second exemplary embodiment and therefore, description thereof will be omitted.

The power supply control unit 103 controls output powers of the main power supply unit 2201 and the sub power supply unit 2202 so that the input power Y to the entire power supply system is minimized, according to powers consumed in the main-drive circuit 2204 and the standby-drive circuit 2205. As a result, the conversion efficiency in the entire power supply system is optimized.

In the present embodiment, a power supply circuit with high power conversion efficiency in a high load region, where an output power is relatively large, is employed as the main power supply unit 2201, and a power supply circuit with high power conversion efficiency in a low load region, where an output power is relatively small, is employed as the sub power supply unit 2202. In this case, output powers of the respective power supply units are controlled as described below.

Specifically, when the switch SW is OFF, the standby-drive circuit 2205, which consumes relatively small power, is driven. The power consumption of the standby-drive circuit 2205 is relatively small and therefore, the power supply control unit 103 may calculate that an input power is minimized when only the sub power supply unit 2202 is operated. In this case, the power supply control unit 103 controls output voltages of the respective power supply units so as to operate only the sub power supply unit 2202. The power supply control unit 103 may completely stop the main power supply unit 2201.

Then, when the switch SW is ON to operate the main-drive circuit 2204, in response to power consumption of the main-drive circuit 2204, the power supply control unit 103 controls output voltages of the main power supply unit 2201 and the sub power supply unit 2202 so that the input power is minimized. In this case, the power supply control unit 103 controls the output voltages of the main power supply unit 2201 and the sub power supply unit 2202 so as to operate both the main power supply unit 2201 and the sub power supply unit 2202, or only the main power supply unit 2201. When only the main power supply unit 2201 is operated, the power supply control unit 103 may completely stop the sub power supply unit 2202.

By adjusting output voltages of the respective power supply units so as to maximize power conversion efficiency with a variation of power consumption of each drive circuit in this manner, the power supply control unit 103 switches the operation of the respective power supply units.

Next, a combination of the switching operation of output powers in the respective power supply units in the present embodiment and charge-discharge control of the auxiliary power supply unit 105 in the first to fourth exemplary embodiments will be described.

With respect to the auxiliary power supply unit 105 and the controller 803 in the present embodiment, charge-discharge control in the auxiliary power supply unit described in the first to fourth exemplary embodiments and output power control of the respective power supply units described in the present embodiment may be performed in a combination thereof.

In the present embodiment, the controller 803 controls output powers of the main power supply unit 2201 and the sub power supply unit 2202 so as to minimize the input power of the entire power supply system with respect to power consumption at the load.

As described above, depending on a value of power consumption at the load, there may be a situation in which only any one of the main power supply unit 2201 and the sub power supply unit 2202 is operated. For example, when a sudden increase in power consumption at the load occurs and operation of both of the main power supply unit 2201 and the sub power supply unit 2202 are required, but if any one of the power supply units is stopped, there is a possibility that the output power supplied to the load may be temporarily decreased.

In the same manner, there is a possibility that a sufficient power may not be supplied to the load temporarily, when power supply units are switched, depending on power consumption of the load at the switching timing.

Therefore, the controller 803 in the present embodiment supplies a power from the auxiliary power supply unit 105 when the output power supplied to the load decreases. The controller 803 also controls to start the respective power supply units, when there is a stopped power supply unit.

Figure 25:
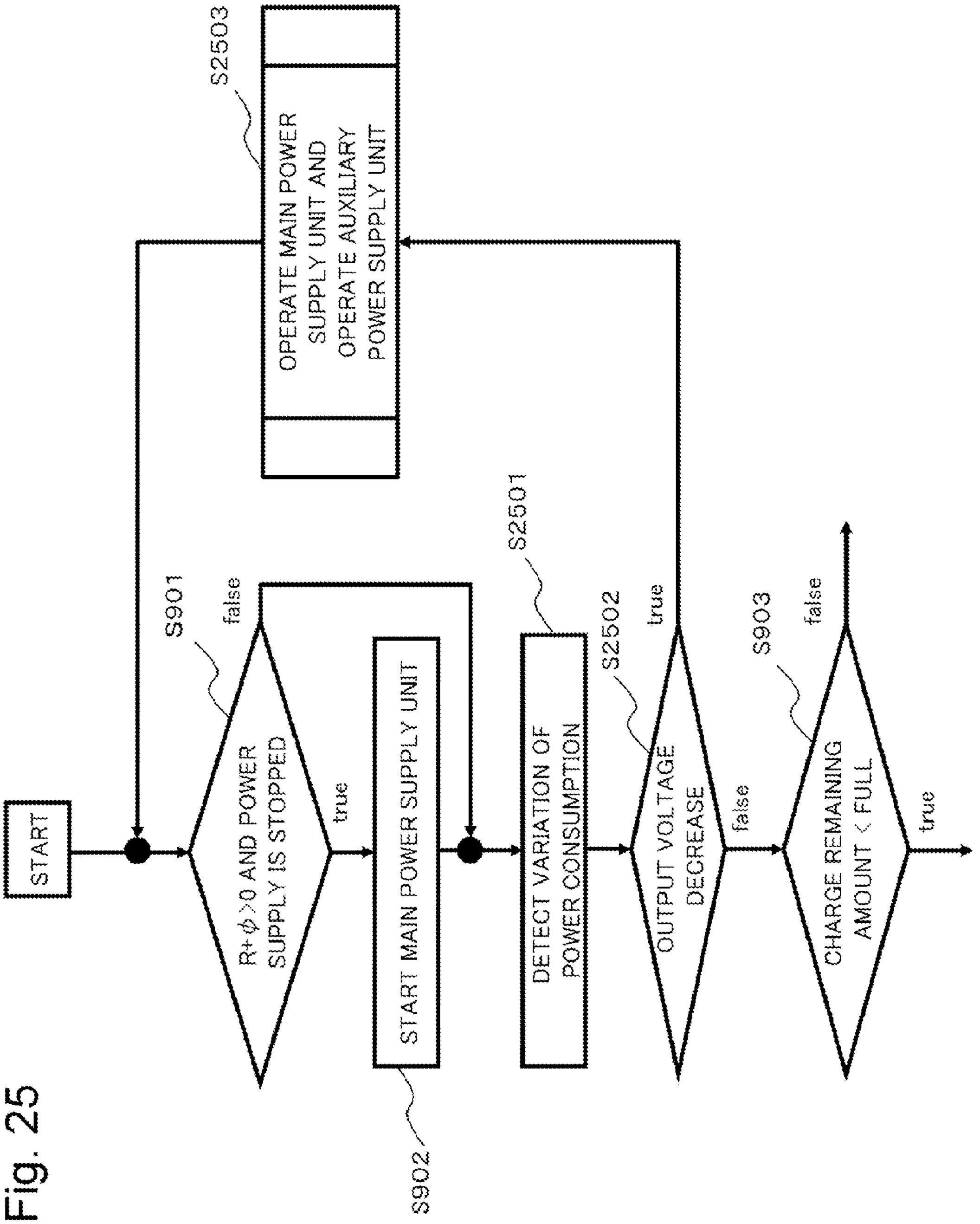
FIG. 25 is a part of a flowchart illustrating a process of controlling power supply from the main power supply unit, and charge-and-discharge with respect to the auxiliary power supply unit in the fifth exemplary embodiment of the present invention.

With reference to FIG. 25, control of the respective power supply units by the controller 803 will be described. As for the operation of the controller 803 in the present embodiment, processing of steps S2501, S2502, and S2503 are added to the operation of the controller 803 in the second exemplary embodiment illustrated in FIG. 9, and the others are same thereto. Therefore, in FIG. 25, description of processing from step S904 in FIG. 9 is omitted.

Initially, the controller 803 refers to a measurement result in the power measurement unit 102 and detects a variation of power consumption (step S2501).

Then, the controller 803 determines whether the output power of the power supply units decreases (step S2502). When the determination result in step S2502 is true, the controller 803 starts the main power supply unit 2201, if the main power supply unit 2201 stopped, and controls the auxiliary power supply unit 105 to supply an output power (step S2503).

In step S2501, the controller 803 may detect a variation of the output power by comparing a given threshold and a variation width of the output power.

In step S2502, the controller 803 may determine a decrease of an output voltage, for example, by referring to output voltages of the respective power supply units.

The control operation of the controller 803 described above makes it possible that when the main power supply unit 2201 and the sub power supply unit 2202 are switched, the auxiliary power supply unit 105 complements the output power to avoid stop of the system (power system failure) caused by the output power decrease.

In the present embodiment, the controller 803 controls output powers of the main power supply unit 2201 and the sub power supply unit 2202 so as to minimize the input power of the entire power supply system with respect to power consumption at a load. Therefore, depending on a value of power consumption at the load, the output powers of the main power supply unit 2201 and the sub power supply unit 2202 respectively varies. And in some cases, only any one of the main power supply unit 2201 and the sub power supply unit 2202 is operated. With such an output variation, the power conversion efficiency of the entire system may vary.

Figure 24:
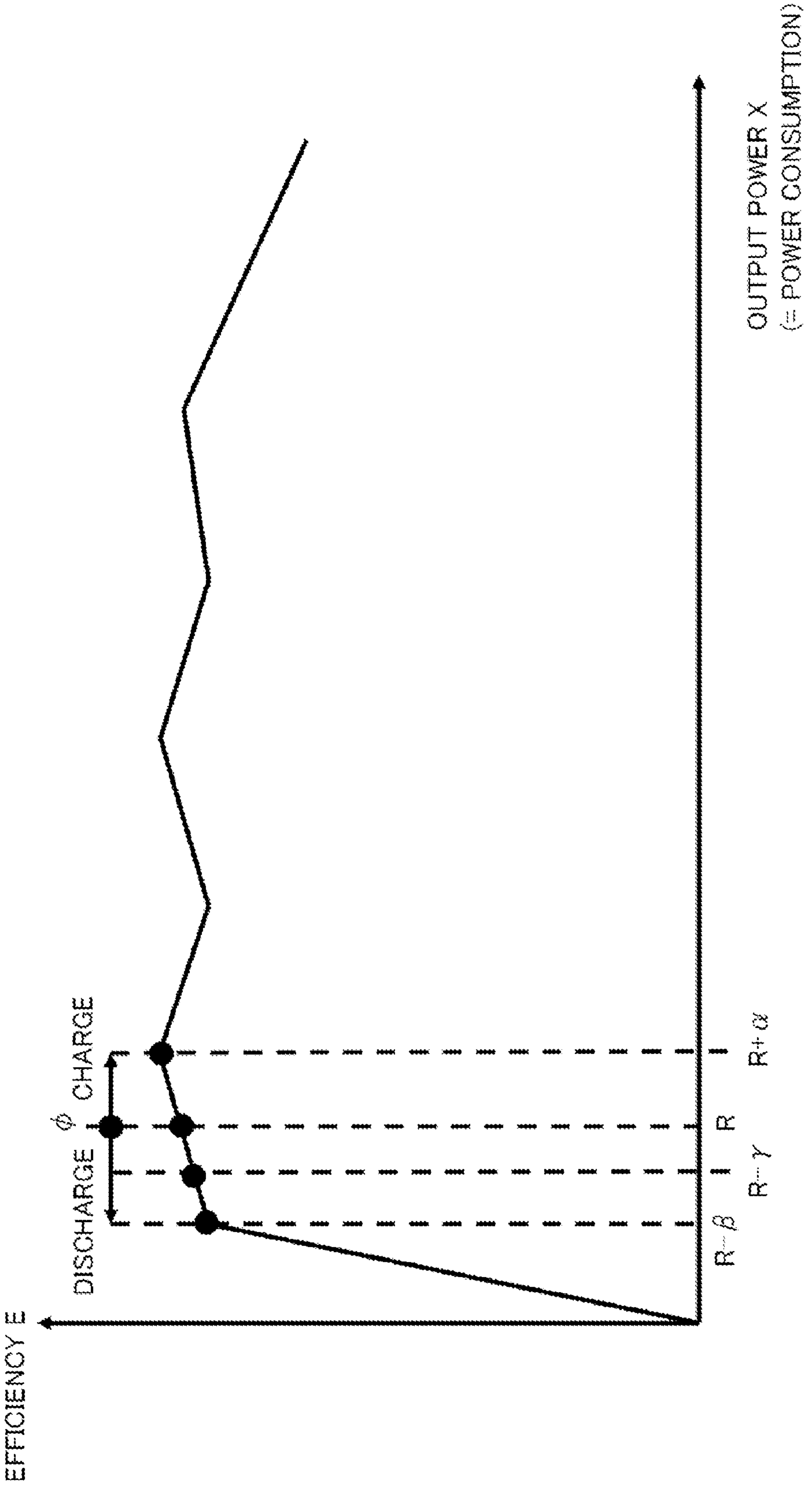
FIG. 24 is a schematic view illustrating variations of a power conversion efficiency of the entire system with output variations of the respective power supply units in the fifth exemplary embodiment of the present invention.

FIG. 24 is a schematic view illustrating variation of a power conversion efficiency of the entire system with output variations of the respective power supply units. As illustrated in FIG. 24, output powers of the respective power supply units dynamically change in response to the load. Also, an efficiency curve regarding power conversion of the entire system varies because of stop of one of the power supply unit, in some cases.

The power supply control unit 103 controls output powers of the respective power supply units so as to minimize the input power with respect to power consumption, (i.e., to maximize power conversion efficiency) and therefore, power conversion efficiency is kept high.

The power supply system in the present embodiment performs charge-discharge control in the auxiliary power supply unit 105 as described in the first to fourth exemplary embodiments, which enables to prevent an output variation upon switching the power supply units. The power supply system in the present embodiment further performs charge-discharge control in the auxiliary power supply unit 105, which enables to optimize power conversion efficiency over the entire operating time of the power supply system.

According to the power supply system in the present embodiment described above, the input power is modeled as the quadratic function of the output power in the power supply system including the main power supply unit 2201 and the sub power supply unit 2202. Then, from the input-output conversion model and power consumption R measured in the power measurement unit 102, the power supply control unit 103 calculates the input power and controls output powers of the respective power supply units so as to minimize the calculated input power.

As a result, the power supply system according to the present embodiment, in which the main power supply unit 2201 and the sub power supply unit 2202 are switched in response to power consumption R in respective drive circuits, is able to minimize the input power with respect to the power consumption R.

In addition, the power supply system according to the present embodiment is able to prevent stop of the system (power system failure) due to an output decrease upon switching the power supply units, by a combination with charge-discharge control using the auxiliary power supply unit 105. As described above, according to the power supply system according to the present embodiment, the power conversion efficiency is optimized over the entire operating time of the power supply system.

Sixth Exemplary Embodiment

Next, a sixth exemplary embodiment of the present invention based on the first to fifth exemplary embodiments of the present invention described above will be described with reference to FIG. 26. In the following description, characteristic configurations according to the present embodiment will be mainly described. In the description, the same reference number will be assigned to the same configuration as in the first to fifth exemplary embodiments for omitting overlapping description.

Figure 26:
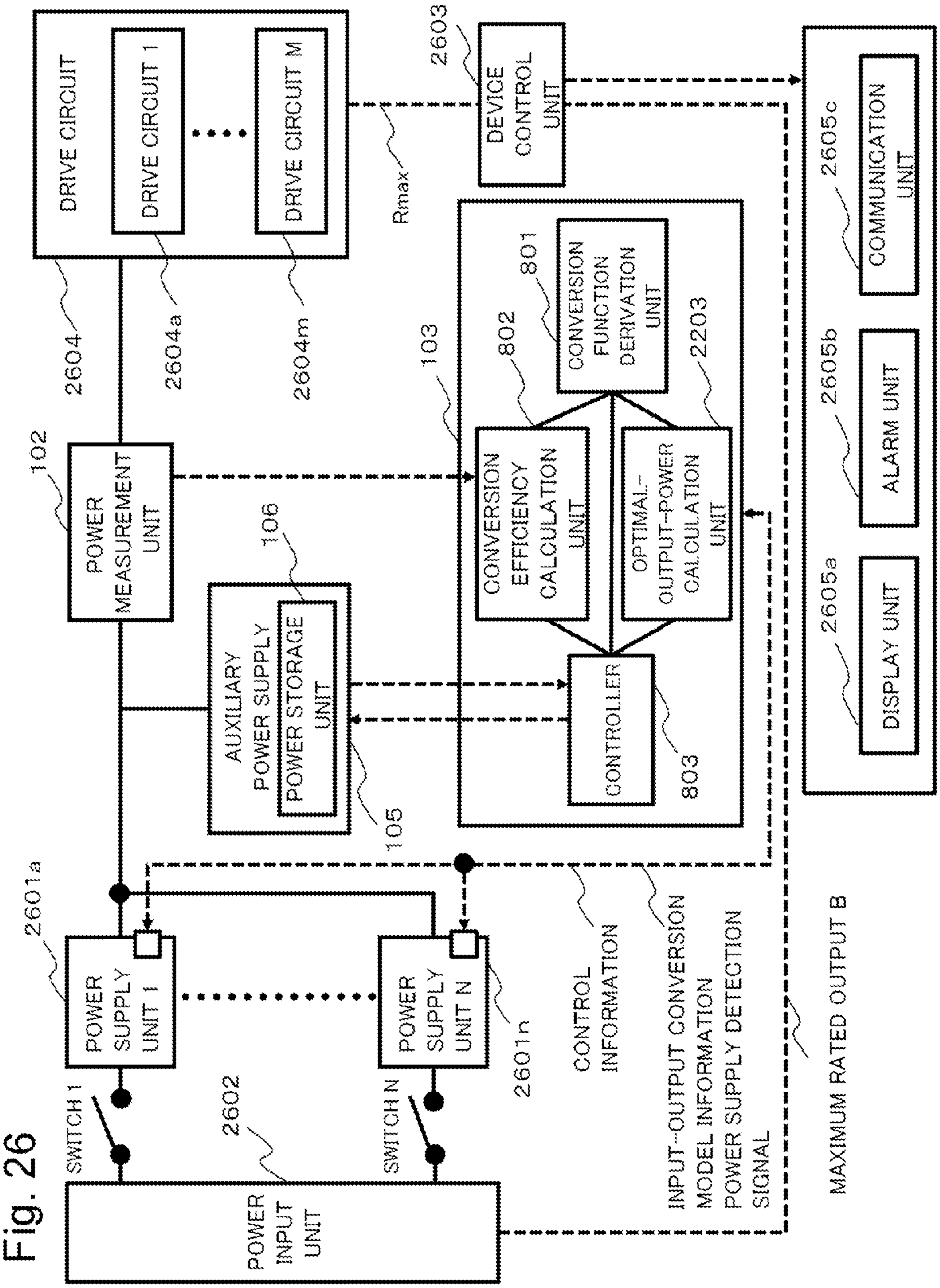
FIG. 26 is a diagram illustrating a configuration of a power supply system in a sixth exemplary embodiment of the present invention.

FIG. 26 is a diagram illustrating a configuration of a power supply system in the sixth exemplary embodiment of the present invention. The power supply system in the sixth exemplary embodiment of the present invention is based on the fifth exemplary embodiment described above, and includes a power supply unit 2601*a* to a power supply unit 2601*n*, a power input unit 2602, a device control unit 2603, and a drive circuit 2604. Outputs of the respective power supply units 2601*a* to 2601*n* and the auxiliary power supply unit 105 are integrated to be supplied to the drive circuit 2604 as a load. The respective elements will be described below.

The power supply units 2601*a* to 2601*n* are DC power supply sources each outputting DC power to an output stage by performing AC/DC conversion, DC/DC conversion, or the like in the same manner as in the fifth exemplary embodiment. Regarding each of the power supply units 2601*a* to 2601*n*, a quadratic function as represented in Eq. (9) is set as an input-output conversion model.

The power supply system according to the present embodiment includes N (N is an integer of at least 2) units of the power supply units 2601*a* to 2601*n*. As for the respective power supply units 2601*a* to 2601*n*, power supply units based on same specifications are employable. Also, power supply units based on different specifications for each other are employable as the respective power supply units 2601*a* to 2601*n*, In the same manner as in the fifth exemplary embodiment, the power supply control unit 103 adjusts output powers of the respective power supply units 2601*a* to 2601*n* and the auxiliary power supply unit 105 and the charge power to the auxiliary power supply unit 105 so as to maximize the power conversion efficiency of the entire power supply system, based on the output power measured in the power measurement unit 102. The power supply control unit 103, the power supply units 2601*a* to 2601*n*, the auxiliary power supply unit 105, and the power measurement unit 102 are connected communicatably to each other so as to transmit and receive an output voltage and an input-output conversion model of each power supply unit, a variety of data items such as a measured output power value, a control signal, and the like, in the same manner as in the fifth exemplary embodiment.

The power supply control unit 103 may determine the number of power supply units included in the entire power supply system by referring to power supply detection signals output by the respective power supply units 2601*a* to 2601*n*. A detecting method for detecting the number of power supply units is not limited thereto. For example, the power supply unit 2601*a* to 2601*n* are connected to each other and a certain power supply unit may be assigned as a master power supply unit. Then, this master power supply unit may detect presence signals of power supply units included in the power supply system and notify the power supply control unit 103 of the detection result.

Besides, for example, number-of-power-supply detection unit (that is not illustrated in FIG. 26) may be provided separately. The number-of-power-supply detection unit may be configured to detect power supply detection signals output by the respective power supply units 2601*a* to 2601*n* and notify the power supply control unit 103 of the detected number of power supply units.

For communication paths and protocols for connections between the power supply units 2601*a* to 2601*n* and between the respective power supply units and the number-of-power-supply detection unit, any existing techniques may be employable.

The input sides of the respective power supply units are connected to the power input unit 2602 for supplying power to the power supply units. As the power input unit 2602, a power supply source such as a commercial power supply system, a generator, an uninterruptible power supply apparatus and the like is applicable. For the power input unit 2602 of the present embodiment, a rated maximum output power B is set (stored) in the power input unit 2602. The rated maximum output power B may be stored, for example, on a non-volatile memory implemented in the power input unit 2602 by using an appropriate tools. Also, for other example, the rated maximum output power B may be set in the device control unit 2603.

The output sides of the power supply units (2601*a* to 2601*n*) are connected to the drive circuit 2604 as a load. For the drive circuit 2604, a rated maximum power consumption $R_{max}$ is set (stored). The rated maximum power consumption $R_{max}$ may be stored, for example, on a non-volatile memory implemented in the drive circuit 2604 by using an appropriate tools. Also, for other example, the rated maximum power consumption $R_{max}$ may be set (stored) in the device control unit 2603. As illustrated in FIG. 26, the drive circuit 2604 may be configured using a plurality of drive circuits 2604*a* to 2604*m*. In this case, being configured in above described manner, a rated maximum power consumption $R_{i\_max}$ (the symbol i represents an i-th drive circuit) is set (stored) for each of the drive circuits 2604*a* to 2604*m*.

The device control unit 2603 is connected communicatably to the power input unit 2602 and the drive circuit 2604 described above. The device control unit 2603 refers to the rated maximum output power B set for the power input unit 2602 and the rated maximum power consumption $R_{max}$ set for the drive circuit 2604 and determines whether the system to be driven within predetermined rates. The device control unit 2603 is also connected communicatably to the conversion function derivation unit 801 and refers to an input-output conversion model. To connect these elements, an existing technique is applicable in the same manner as for the power supply control unit 103 in the first exemplary embodiment. The device control unit 2603 may be configured as dedicated control hardware. Alternatively, the device control unit 2603 may be configured as hardware including general-purpose CPU, memory, and others (each not illustrated) and a variety of software programs executed by the CPU.

For other example, as the rated maximum output power B and the rated maximum power consumption $R_{max}$, specific values may be previously set for the device control unit 2603. For example, the device control unit 2603 may include a non-volatile memory such as a flash memory and stores these values in the memory. Specifically, these values may be stored within the memory region, in a production stage prior to shipment, a maintenance stage after shipment, or the like, by using an appropriate tools. When the device control unit 2603 includes hardware including general-purpose CPU and memory and a software program as described above, these values may be stored (implemented) in the software program. Other configurations in the present embodiment are substantially the same as in the fifth exemplary embodiment.

Next, an operation of the power supply system according to the present embodiment will be described. A basic operation of the power supply system according to the present embodiment is substantially the same as in the fifth exemplary embodiment. Therefore, operations different from the fifth exemplary embodiment are mainly described below, especially for operations of the conversion function derivation unit 801, the optimal-output-power calculation unit 2203, and the device control unit 2603.

First, an operation of the conversion function derivation unit 801 is described below.

The conversion function derivation unit 801 refers to input-output conversion models set for the power supply units 2601*a* to 2601*n* and determines the number N of power supply units based on power supply detection signals transmitted from the respective power supply units, and derives the following Eq. (35) as an input-output conversion function. In Eq. (35), $x_i$, $y_i$, and $f_i$ represent the output power, the input power, and the input-output conversion model of the i-th power supply unit, respectively.

$$Y = \sum_{i=a}^{N} f_i(x_i) = f_1(x_1) + f_2(x_2) + f_3(x_3) + \ldots + f_N(x_N) \tag{35}$$

Assuming that the input-output conversion model of the ith power supply unit is set as $y_i=a_ix_i^2+b_ix_i+c_i$, the following Eq. (36) is obtained from Eq. (35). In the same manner as in the fifth exemplary embodiment, $a_i$, $b_i$, and $c_i$ of Eq. (36) are calculated using a least-squares method from measured values of input-output characteristics measured separately with respect to the ith power supply unit 2601*i*. Then, these values are previously set for each power supply unit.

$$Y=(a_1x_1^2+b_1x_1+c_1)+(a_2x_2^2+b_2x_2+c_2)+ \ldots +(a_Nx_N^2+b_Nx_N+C_N) \tag{36}$$

The conversion function derivation unit 801 notifies the optimal-output-power calculation unit 2203 of the input-output conversion function of Eq. (36) by using a predetermined notification method. A notification method for the optimal-output-power calculation unit 2203 may be substantially the same as in the fifth exemplary embodiment and therefore, description thereof will be omitted.

Next, an operation of the optimal-output-power calculation unit 2203 will be described. In the same manner as in the second exemplary embodiment, the optimal-output-power calculation unit 2203 refers to power consumption in the drive circuit 2604 measured by the power measurement unit 102 and the input-output conversion function derived in the conversion function derivation unit 801. Then, the optimal-output-power calculation unit 2203 calculates output powers in the respective power supply units 2601*a* to 2601*n* minimizing the input power Y represented by the above Eq. (36), by using the values referred to. When the power consumption in the drive circuit 2604 measured by the power measurement unit 102 is represented as R, Eq. (37) is established.

$$R = X = \sum_{i=1}^{N} x_i = x_1 + x_x + \ldots x_N \tag{37}$$

The optimal-output-power calculation unit 2203 may calculate mathematical optimal solution for Y and each $x_i$ based on Eqs. (36) and (37), but, in this case, relatively complex calculation procedures are needed.

Figure 27:
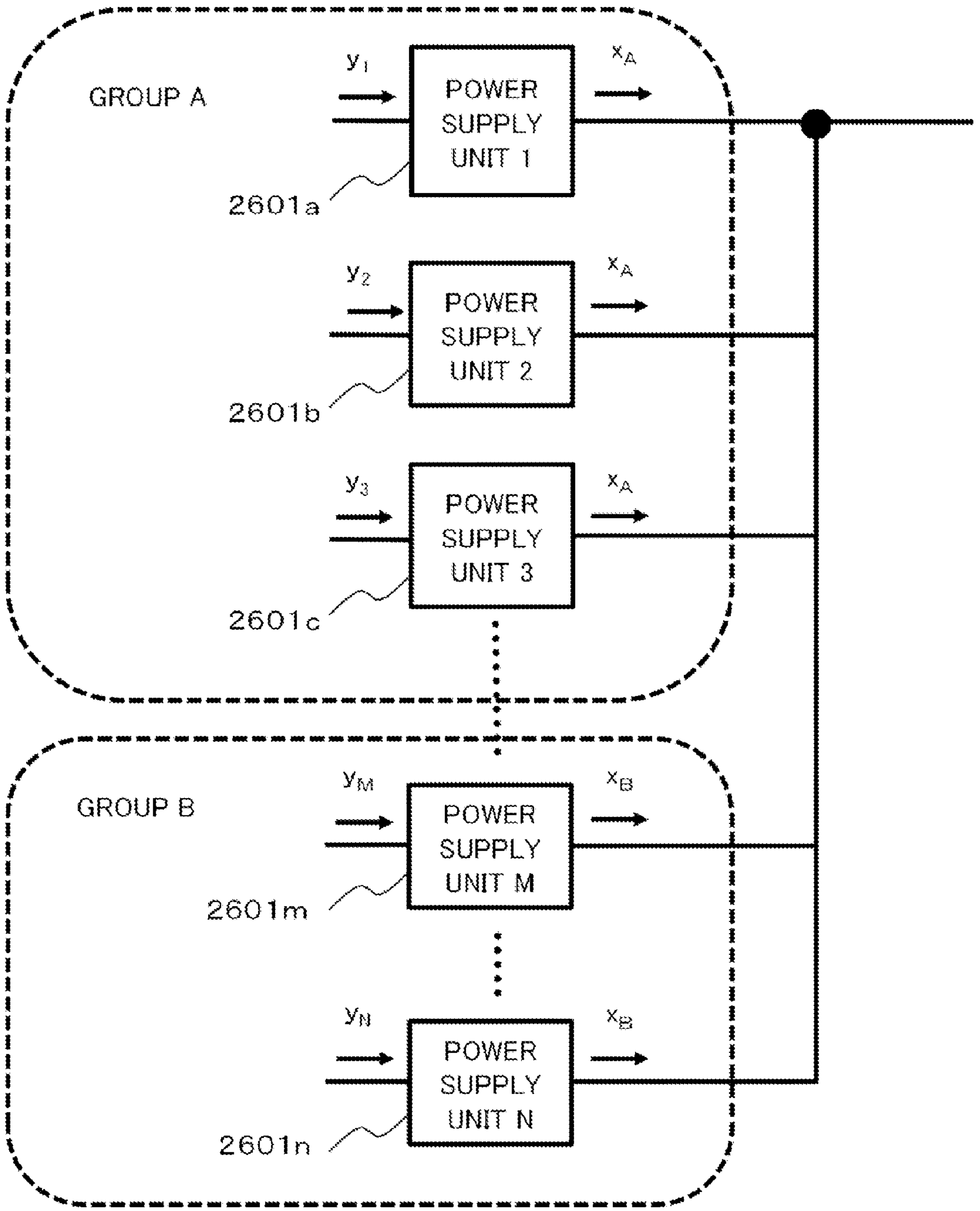
FIG. 27 is a schematic view upon grouping respective power supply units in the sixth exemplary embodiment of the present invention.

In the present embodiment, to simplify a calculation procedure for Y and each $x_i$ in the optimal-output-power calculation unit 2203, the power supply units are divided into two groups (hereinafter, represented as group A and group B for convenience) as illustrated in FIG. 27. And output powers of power supply units included in each group are controlled so as to be equal to each other.

In such a simplified case, the following Eqs. (38) and (39) are derived from the above Eqs. (36) and (37). $N_A$ and $N_B$ in the following Eq. (39) represent the numbers of power supply units included in group A and group B, respectively, and $N_A+N_B=N$ is satisfied. A case where one group includes all the power supply units (e.g., a case of $N_A=0$ and $N_B=N$) is also allowed. In addition, $x_A$ represents output powers of respective power supply units included in the group A, and $x_B$ represents output powers of respective power supply units included in the group B.

$$\begin{aligned} Y = {} & (a_1x_A^2 + b_1x_A + c_1) + (a_2x_A^2 + b_2x_A + c_2) + \\ & \ldots (a_Mx_B^2 + b_Mx_B + c_M) + \ldots + (a_Nx_B^2 + b_Nx_B + c_N) \end{aligned} \tag{38}$$

$$\begin{aligned} R &= X \\ &= \sum_{i=1}^{N} x_i \\ &= x_1 + x_2 + x_3 + \ldots + x_N \\ &= N_Ax_A + N_Bx_B \\ &= N_Ax_A + (N - N_A)x_B \end{aligned} \tag{39}$$

Figure 28A:
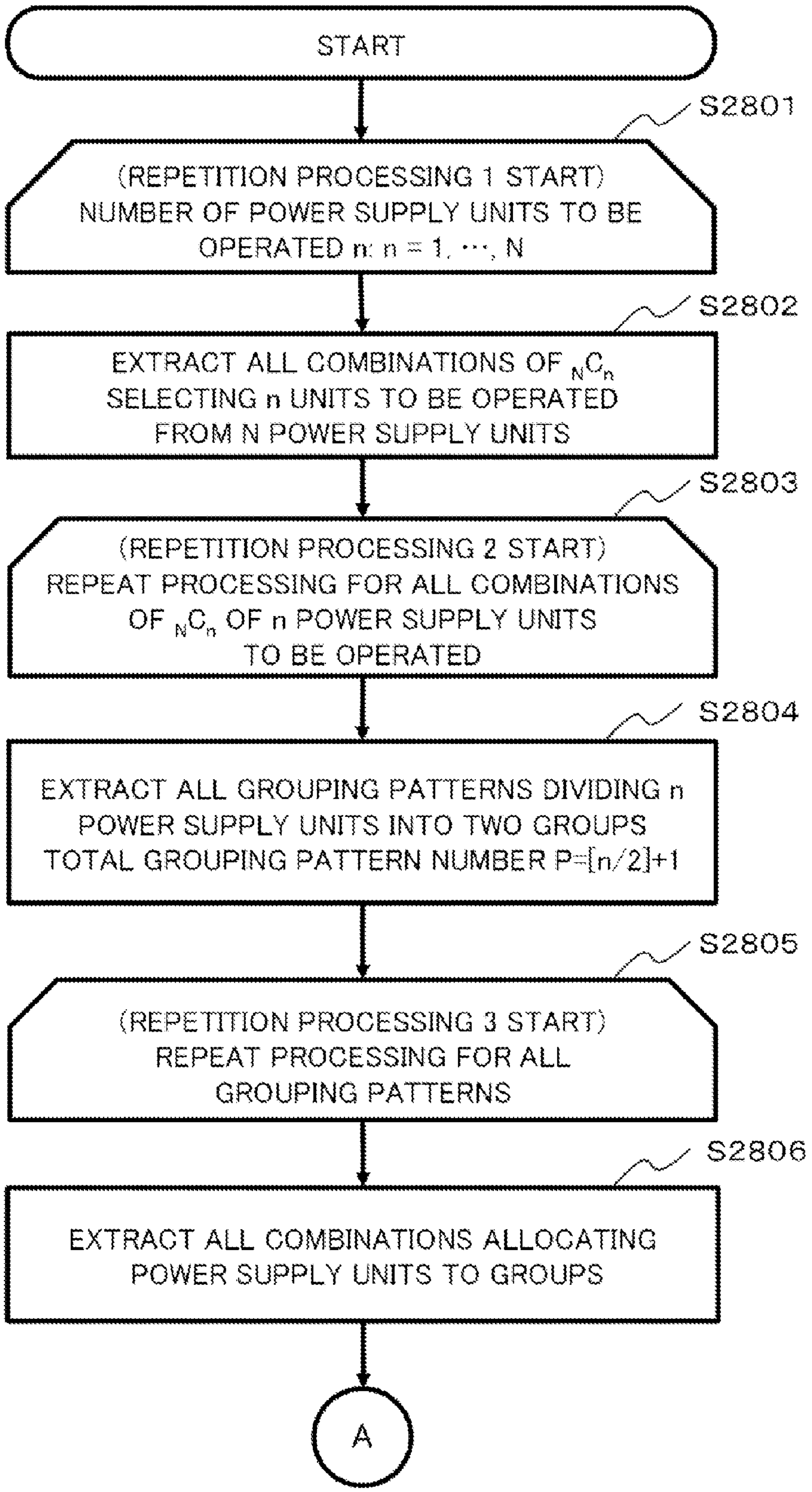
FIG. 28A is a flowchart (1/2) illustrating a process of calculating optimal output powers of the respective power supply units in the sixth exemplary embodiment of the present invention.
Figure 28B:
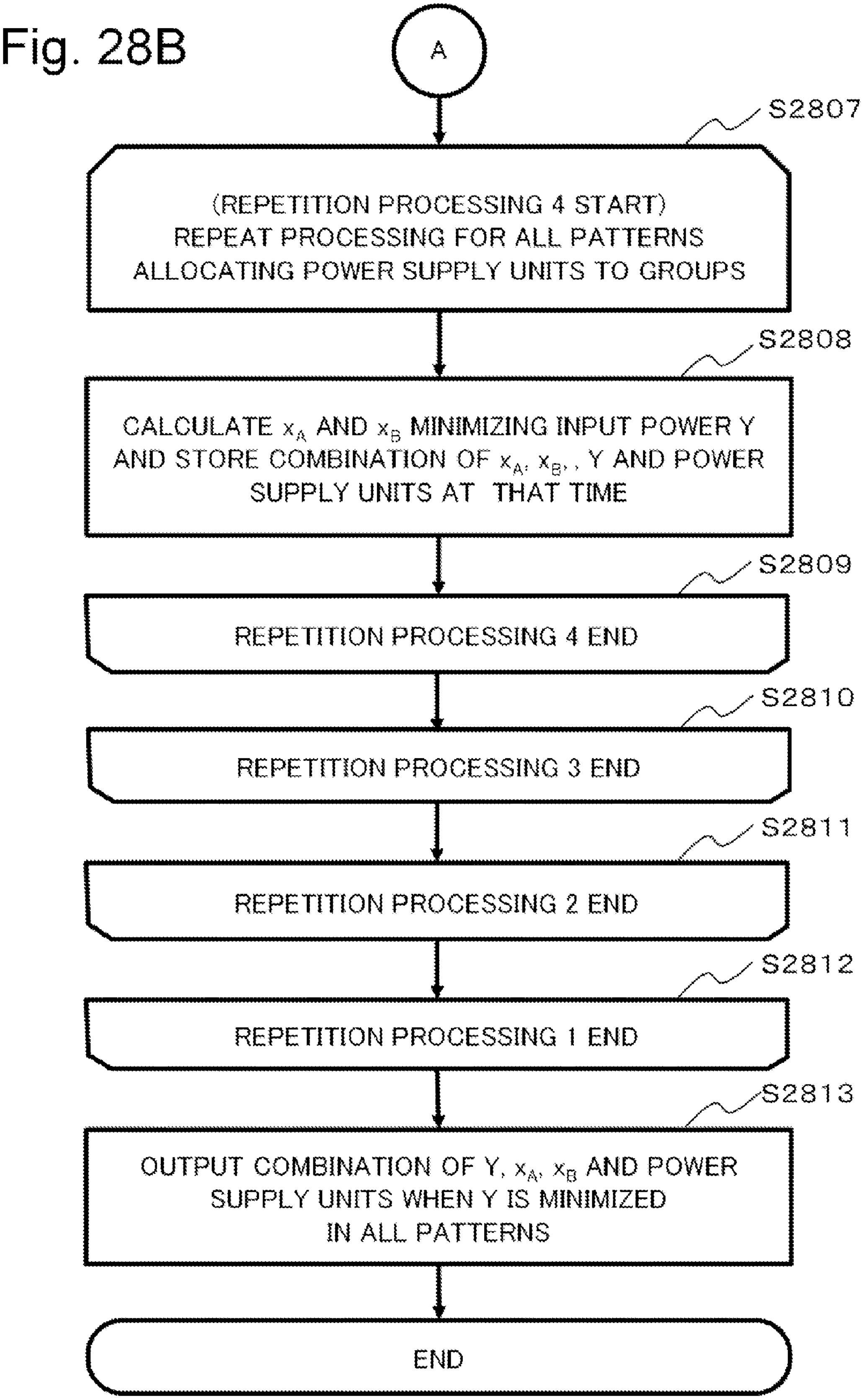
FIG. 28B is a flowchart (2/2) illustrating a process of calculating optimal output powers of the respective power supply units in the sixth exemplary embodiment of the present invention.

Next, one example of processing for calculating $x_A$ and $x_B$ minimizing an input power Y based on Eqs. (38) and (39) will be described with reference to FIG. 28A and FIG. 28B. In Eqs. (38) and (39), output powers to be calculated are $x_A$ and $x_B$. Therefore, $x_A$ and $x_B$ that minimizes Y, is calculated by the calculation method that is the same as in the fifth exemplary embodiment. Therefore, in the following description, the process of calculating specific $x_A$ and $x_B$ values from the above Eqs. (38) and (39) will be omitted.

Initially, the optimal-output-power calculation unit 2203 selects the number of power supply units 2601 to be operated from N power supply units 2601. The number of power supply units to be operated is represented as "n" (step S2801). The optimal-output-power calculation unit 2203 repeatedly executes the following processing while making changes from n=1 to n=N (step S2801 to step S2812).

Then, the optimal-output-power calculation unit 2203 extracts all combinations selecting "n" power supply units from N power supply units (step S2802). The number of combinations is ${}_NC_n$. When, for example, the power supply system includes four (N=4) power supply units (a power supply unit 1, a power supply unit 2, a power supply unit 3, and a power supply unit 4), and then three power supply units are to be operated (n=3), combinations thereof are as follows: ${}_4C_3=4$.

In this example, specific combinations to be extracted are (the power supply unit 1, the power supply unit 2, the power supply unit 3), (the power supply unit 1, the power supply unit 2, the power supply unit 4), (the power supply unit 1, the power supply unit 3, the power supply unit 4), and (the power supply unit 2, the power supply unit 3, the power supply unit 4).

Then, the optimal-output-power calculation unit 2203 repeats the following processing for all the extracted combinations (step S2803 to step S2811).

The optimal-output-power calculation unit 2203 extracts all grouping patterns dividing the "n" power supply units selected in step S2802 into two groups (step S2804). The number of all grouping patterns for division into two groups are [n/2]+1. In the present embodiment, the symbol "[ ]" represents a floor function (Gauss symbol), and [n/2] represents a maximum integer that is at most n/2. When, for example, three power supply units are to be operated, the number of patterns for division into two groups is [3/2]+1=2, and then extracted patterns are (3 units, 0 unit) and (2 units, 1 unit). When four power supply units are to be operated, the number of grouping patterns is [4/2]+1=3, and then extracted patterns are (4 units, 0 unit), (3 units, 1 unit), and (2 units, 2 units).

Then, the optimal-output-power calculation unit 2203 repeats the following processing for all the extracted grouping patterns (step S2805 to step S2810).

The optimal-output-power calculation unit 2203 extracts all combinations allocating the respective power supply units to each group with respect to all the grouping patterns extracted in step S2804 (step S2806). When the power supply units are divided into two groups of {m units, N−m units}, the total number of combinations of power supply units allocated to the groups is ${}_nC_m$. When, for example, three power supply units of (the power supply unit 1, the power supply unit 2, the power supply unit 3) are divided into a group of {2 units, 1 unit}, the number of combinations is ${}_3C_2=3$, that is specifically, {group A, group B}={(the power supply unit 1, the power supply unit 2), the power supply unit 3}, { (the power supply unit 1, the power supply unit 3), the power supply unit 2}, and {(the power supply unit 2, the power supply unit 3), the power supply unit 1}.

Hereinafter, in the present embodiment, the symbol "{ }" represents a grouping pattern that divides the power supply units into two groups. When "n" is an even number and m=n/2, the number of combinations is n!/(m!(n−m)!2!). In the present embodiment, the symbol "!" represents a factorial.

Then, the optimal-output-power calculation unit 2203 calculates $x_A$ and $x_B$ that minimizes Y based on the above Eqs. (38) and (39), with regarding all the patterns, extracted in step S2806, allocating the respective power supply units to two groups.

The optimal-output-power calculation unit 2203 records $x_A$ and $x_B$ that minimizes Y, the minimum value of Y, and combinations of power supply units at that time (step 2807 to step S2809), from the results calculated for all the patterns. In step S2808, these records may be overwritten, every time $x_A$ and $x_B$ that minimizes Y and combinations of power supply units at that time are updated. For example, temporal storage on a memory or the like implemented in the power supply control unit may applicable for storing these records.

The optimal-output-power calculation unit 2203 repeats the aforementioned calculation by changing the number "n" of power supply units to be operated (step S2801 to step S2812), for all combinations of "n" power supply units to be operated (step S2803 to step S2811), extracting all combinations dividing the power supply units into two groups (step S2805 to step S2810)

After the calculation, the optimal-output-power calculation unit 2203 notifies the controller 803 of the output powers of the respective power supply units, where the input power Y is minimized, that is recorded in step S2808 (step S2813).

When the controller 803 receives the notification from the optimal-output-power calculation unit 2203, the controller 803 controls output powers of the power supply units 2601*a* to 2601*n* to output the output powers calculated by the optimal-output-power calculation unit 2203.

A specific method for controlling output powers in the respective power supply units 2601*a* to 2601*n* may be substantially the same as in the fifth exemplary embodiment of the present invention described above and therefore, description thereof will be omitted.

Figure 29:
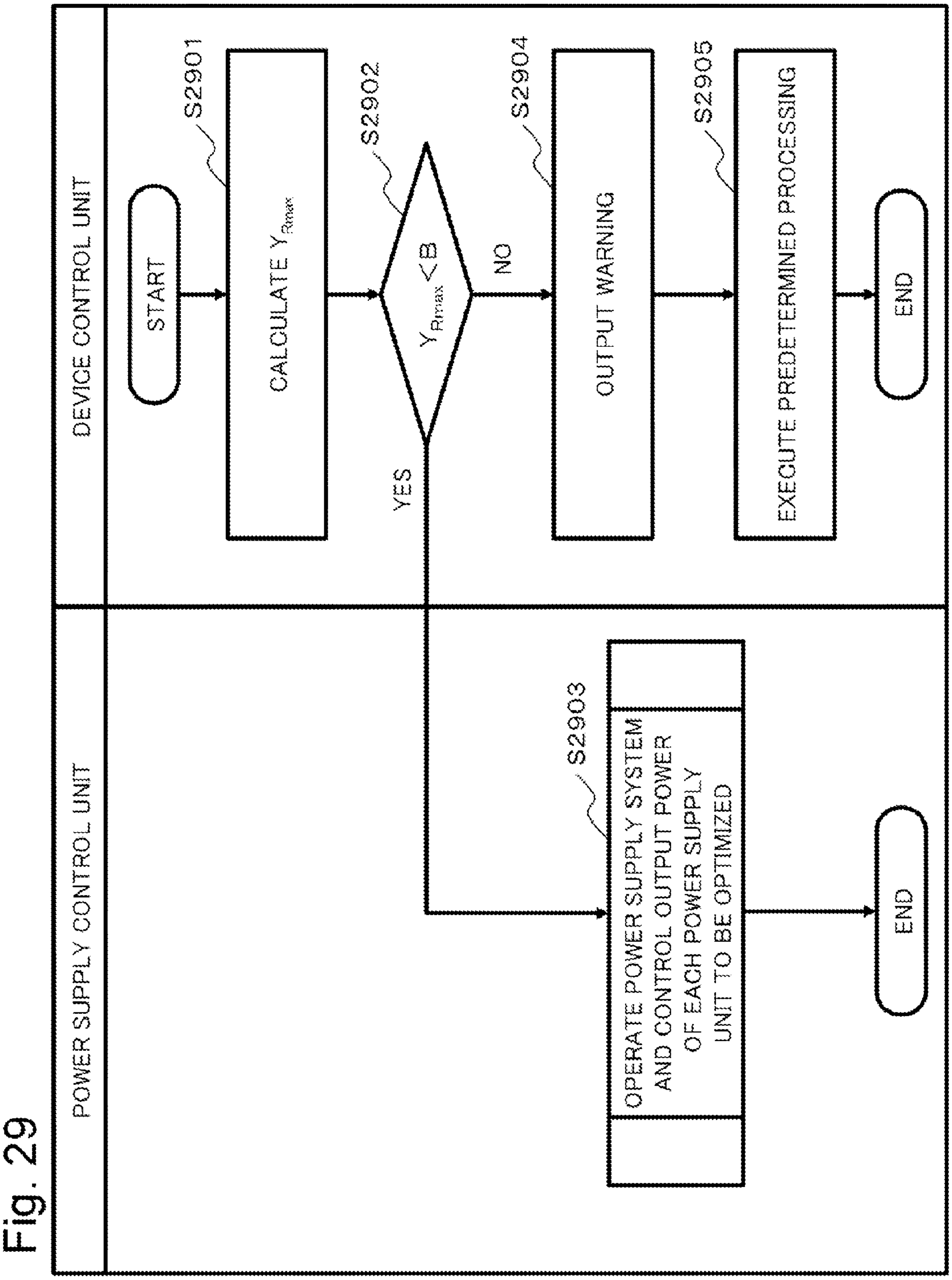
FIG. 29 is a flowchart illustrating a process of determining the consistency between a rated maximum power consumption of a load and a rated maximum output power of a power input unit in the sixth exemplary embodiment of the present invention.

Next, an operation of the device control unit 2603 will be described with reference to FIG. 29.

The device control unit 2603 refers to the rated maximum power consumption $R_{max}$ of the drive circuit 2604 and the input-output conversion function derived by the conversion function derivation unit 801. Then, by using the values referred to, the device control unit 2603 calculates a minimum value $Y_{Rmax}$ of an input power upon consuming power consumption of $R_{max}$ by the drive circuit 2604 (step S2901). A specific calculation method may be substantially the same as for the optimal-output-power calculation unit 2203.

When the drive circuit 2604 includes a plurality of drive circuits 2604*a* to 2604*m*, the device control unit 2603 may calculate a sum of rated maximum power consumption set for the individual drive circuits. In this case, the rated maximum power consumption $R_{max}$ is represented as $R_{max}=\Sigma R_{i\_max}$.

Then, the device control unit 2603 refers to the rated maximum output power B set for the power input unit 2601 and compares the rated maximum output power B with $Y_{Rmax}$ (step S2902).

Upon a determination of Yes (i.e., $Y_{Rmax}<B$) in step S2902, output powers of the respective power supply units are optimized as described above (step S2903).

In step S2903, with respect to power consumption of the drive circuit 2604, output voltages of the respective power supply units 2601*a* to 2601*n* are controlled so that the input power Y is minimized, as described above.

Then, when the determination result in step S2902 is No ($Y_{Rmax} \leq B$), the device control unit 2603 outputs a warning (step S2904). In this case, predetermined processing to prevent starting the power supply system may be executed with the warning output (step S2905).

As an output method for a warning, the device control unit 2603 may select an appropriate method. such as displaying warning messages to a display unit 2605*a* including a display, a warning light, or the like, generating alarm by an alarm unit 2605*b*, communicating (sending) alert message by a communication unit 2605*c*, and the like, according to specifications needed for the power supply system.

The device control unit 2603 can determine, via the aforementioned operation, consistency between the rated maximum output power B that is supplied by the power input unit 2602, and the rated maximum power consumption $R_{max}$ consumed in the drive circuit 2604. Therefore, the device control unit 2603 can determine whether the power supply system according to the present embodiment is operable without exceeding a given rated range.

In the present embodiment, the device control unit 2603 is configured separately from the power supply control unit 103, but the present invention is not limited thereto. For example, the device control unit 2603 may be configured as being integrated with the power supply control unit 103, or may be configured as one function of the optimal-output-power calculation unit 2203 or the controller 803.

In the power supply system according to the present embodiment as described above, when a plurality of power supply units 2601*a* to 2601*n* are divided into two groups and then controlled so that output powers of power supply units included in the respective groups are equal to each other, calculation procedures for output powers for the respective power supply units is simplified. Therefore, the power supply system according to the present embodiment is able to control quickly the output powers of the power supply units in response to a variation in the load.

Also, the power supply system according to the present embodiment is able to determine consistency between the rated maximum output power B supplied by the power input unit 2602 and the rated maximum power consumption $R_{max}$ consumed in the drive circuit 2604. As a result, the power supply system according to the present embodiment is able to determine whether to be operable without exceeding a given rating.

Next, a combination of a switching operation of the respective power supply units in the present embodiment and charge-discharge control of the auxiliary power supply unit 105 in the first to fourth exemplary embodiments will be described. In the same manner as in the fifth exemplary embodiment, the auxiliary power supply unit 105 and the controller 803 in the present embodiment may perform charge-discharge control in the auxiliary power supply unit described in the first to fourth exemplary embodiments. The auxiliary power supply unit 105 and the controller 803 in the present embodiment may combine the charge-discharge control in the auxiliary power supply unit and the output power control of the respective power supply units described in the present embodiment.

In the present embodiment, the controller 803 controls output powers of the respective power supply units 2601*a* to 2601*n* and also the number of power supply units to be operated so as to minimize the input power of the entire power supply system with respect to power consumption in the drive circuit 2604.

Depending on a value of power consumption in the drive circuit 2604, a situation in which only a part of the power supply unit 2601*a* to 2601*n* are operated and other power supply units are stopped, as described above, may occur. Therefore, in the same manner as in the fifth exemplary embodiment, depending on power consumption of a load at a switching timing of each power supply unit, a sufficient power may not be temporarily supplied to the load. Therefore, also in the present embodiment, in the same manner as in the fifth exemplary embodiment, as illustrated in FIG. 25, the controller 803 controls the auxiliary power supply unit 105 to supply power when an output power supplied to the load decreases. And if any power supply unit is stopped, the controller 803 controls to start the power supply unit which is stopped. Specific processing contents therefor are substantially the same as in the fifth exemplary embodiment and therefore, description thereof will be omitted.

According to the power supply system in the present embodiment described above, a power supply system including a plurality of power supply units 2601*a* to 2601*n* switches output powers of the respective power supply units according to power consumption R in the drive circuit 2604. As a result, the power supply system according to the present embodiment is able to minimize the input power with respect to the power consumption R. By a combination with charge-discharge control using the auxiliary power supply unit 105, the power supply system according to the present embodiment is able to prevent a system stop (power system failure) due to an output decrease caused by switching power supply units, and is able to optimize power conversion efficiency over the entire operating time of the power supply system.

In the present invention described with reference to the respective embodiments as examples, processing in the power supply control unit 103, the auxiliary power supply unit 105, the device control unit 2603, and the like may be implemented by using hardware including general-purpose CPU and a memory, and others (each not illustrated), and a variety of software programs executed by the CPU. In other words, software programs (computer programs) that implement processing of the power supply control unit 103, the auxiliary power supply unit 105, and the device control unit 2603 described in the respective embodiments as described above, are supplied to the aforementioned general-purpose hardware, and thereafter, the software programs may be executed by CPU of the hardware. The software programs supplied to the hardware may be stored on a temporary storage memory such as a DRAM (Dynamic Random Access Memory) or a non-volatile storage device such as a flash memory or HDD (Hard Disk Drive).

In the above configuration, the method for supplying a computer program to each of the devices may be a currently available method such as a method of installing the computer program in the device with use of an appropriate tool at the time of manufacturing before shipment or at the time of maintenance after shipment or the like, or a method of downloading the computer program from the outside via a communication line such as the Internet.

In the above configuration, the present invention may be construed as codes configuring the computer program, or as a computer-readable storage medium in which the codes are recorded.

In the present invention described by the foregoing exemplary embodiments, the input-output conversion models of the respective power supply units may be set for the power supply control unit 103. When input-output conversion models are previously known regarding the respective power supply units connected to the power supply control unit 103, optimal output powers of the power supply units can be calculated by setting the input-output conversion models of the power supply units to the power supply control unit 103. The method for setting an input-output conversion model in the power supply control unit 103, for example, the power supply control unit 103 may be mounted with a non-volatile memory such as a flash memory. Then, in a production stage prior to shipment, a maintenance stage after shipment, or the like, the input-output conversion model may be stored within the memory region of the non-volatile memory by using an appropriate tools. When the power supply control unit is constituted of hardware such as a general-purpose CPU and a memory, and a software program as described above, the input-output conversion model may be stored in the software program. That is, the equations may be implemented in the software program. The input-output conversion models of the respective power supply units may exist on outside the power supply system. In this case, by referring to the input-output conversion models exist on outside, the power supply control unit 103 is able to calculate optimal output powers of the respective power supply units. An example of the above case is an environment, in which the power supply system is connected to a communication network. For example, a specific server on the communication network may hold an input-output conversion model of the power supply system, and the power supply control unit 103 may refer to the input-output conversion model by connecting to the server via the communication path.

The present invention has been described as examples applied to the exemplary embodiments. However, the technical scope of the present invention is not limited to the scope described in the respective embodiments. It is apparent to those skilled in the art that various modifications or improvements can be made to the embodiments. Any new embodiment obtained by adding such modifications or improvements can also be included in the technical scope of the present invention. This is apparent from the matters described in the claims. A part or all of the embodiments and the modified examples thereof described above can be also described as the following supplemental notes. However, the present invention exemplarily described by the embodiments and the modified examples thereof is not limited to the following.

(Supplemental Note 1)

A power supply system including:

at least one main power supply unit that converts an input power into an output power and supplies the output power to a load;

an auxiliary power supply unit that supplies an output power to the load, from a power storage unit capable of functioning as a power supply source;

a power measurement unit, that is connected between output sides of the main power supply unit and the auxiliary power supply unit and the load, that measures an output power output by the main power supply unit and the auxiliary power supply unit; and a power supply control unit that calculates an optimal output power of the main power supply unit that maximizes a power conversion efficiency of the main power supply unit in a given output adjustment range for the main power supply unit in accordance with the output power measured by the power measurement unit, calculates an optimal output power or charge power of the auxiliary power supply unit based on the given output adjustment range, controls the main power supply unit based on the calculated optimal output power of the main power supply unit, and controls the auxiliary power supply unit based on the calculated optimal output power or charge power of the auxiliary power supply unit.

(Supplemental Note 2)

The power supply system according to Supplemental Note 1, wherein the power supply control unit calculates an input power to the main power supply unit in accordance with the output power measured by the power measurement unit based on an input-output conversion model expressing power conversion between an input power to the main power supply unit and an output power output from the main power supply unit.

(Supplemental Note 3)

The power supply system according to Supplemental Note 2, wherein the power supply control unit detects a charge remaining amount of the power storage unit included in the auxiliary power supply unit, assigns the output power of the main power supply unit measured by the power measurement unit as a first output power, calculates a first input power to the main power supply unit based on the first output power and the input-output conversion model, calculates a first power conversion efficiency based on the first output power and the first input power, derives a second output power of the main power supply unit where the first output power is converted by using a given adjustment value falling within the given output adjustment range for the main power supply unit, calculates a second input power of the main power supply unit based on the second output power and the input-output conversion model, calculates a second power conversion efficiency based on the second output power and the second input power, and controls the output power of the main power supply unit and the output power or the charge power in the auxiliary power supply unit based on a result obtained by comparing the first power conversion efficiency and the second power conversion efficiency, and the detected charge remaining amount of the power storage unit.

(Supplemental Note 4)

The power supply system according to Supplemental Note 3, wherein the power supply control unit charges the power storage unit included in the auxiliary power supply unit based on a power corresponding to the given adjustment value in an output power of the main power supply unit when the given adjustment value is a positive value, and controls power supply from the power storage unit included in the auxiliary power supply unit based on the given adjustment value when the given adjustment value is a negative value.

(Supplemental Note 5)

The power supply system according to Supplemental Note 3 or Supplemental Note 4, wherein the power supply control unit charges the power storage unit included in the auxiliary power supply unit based on a power corresponding to the given adjustment value in an output power of the main power supply unit when the given adjustment value is a positive value and controls power supply from the power storage unit included in the auxiliary power supply unit based on the given adjustment value when the given adjustment value is a negative value. (Supplemental Note 6)

The power supply system according to Supplemental Note 3, wherein the power supply control unit includes a conversion-characteristic-control unit that adjusts characteristics of a power conversion efficiency of the main power supply unit, and wherein the conversion-characteristic-control unit adjusts characteristics of a power conversion efficiency of the main power supply unit based on power consumption measured by the power measurement unit and the given adjustment value.

(Supplemental Note 7)

The power supply system according to Supplemental Note 6, wherein the main power supply unit includes a plurality of power supply apparatuses and the conversion-characteristic-control unit selects and operates at least a part of the plurality of power supply apparatuses.

(Supplemental Note 8)

The power supply system according to Supplemental Note 6, wherein the main power supply unit includes a plurality of transformers, the plurality of transformers are connected in parallel to each other, and the conversion-characteristic-control unit selects at least a part of the plurality of transformers and connects the selected transformers to each other.

(Supplemental Note 9)

The power supply system according to Supplemental Note 7 or Supplemental Note 8, wherein the main power supply unit includes a power factor correction circuit, a transformer, and a rectifier circuit, the output side of the power factor correction circuit is connected to the input side of the transformer, and the output side of the transformer is connected to the rectifier circuit, and the conversion-characteristic-control unit controls an output voltage of the power factor correction circuit or an operating frequency.

(Supplemental Note 10)

The power supply system according to any one of Supplemental Note 6 to Supplemental Note 9, wherein the power supply control unit calculates an average value of power consumption consumed for a given period of time at the load and the conversion-characteristic-control unit adjusts characteristics of a power conversion efficiency of the main power supply unit based on the calculated average value of the power consumption.

(Supplemental Note 11)

The power supply system according to any one of Supplemental Note 6 to Supplemental Note 10, wherein the power supply control unit calculates an average value of power consumption consumed for a given period of time at the load and the conversion-characteristic-control unit adjusts a power conversion efficiency of the main power supply unit so that an output power of the main power supply unit is equal or substantially equal to the calculated average value of the power consumption.

(Supplemental Note 12)

The power supply system according to Supplemental Note 6, wherein the power supply control unit calculates a total output power amount output for a given period of time in the auxiliary power supply unit, and calculates a total charge power amount charged for a given period of time in the auxiliary power supply unit, and wherein the conversion-characteristic-control unit adjusts characteristics of the power conversion efficiency of the main power supply unit based on the calculated total output power amount and the calculated total charge power amount.

(Supplemental Note 13)

The power supply system according to any one of Supplemental Note 6 to Supplemental Note 12, wherein the power supply control unit calculates a total output power amount output for a given period of time in the auxiliary power supply unit and calculates a total charge power amount charged for a given period of time in the auxiliary power supply unit; and the conversion-characteristic-control unit adjusts characteristics of the power conversion efficiency of the main power supply unit so that the calculated total output power amount and the calculated total charge power amount are equal or substantially equal to each other.

(Supplemental Note 14)

The power supply system according to Supplemental Note 1, wherein the power supply control unit calculates a total output power amount output for a given period of time in the auxiliary power supply unit, calculates a total charge power amount charged for a given period of time in the auxiliary power supply unit, and controls a maximum output power in the auxiliary power supply unit to increase when the calculated total charge power amount is larger than the calculated total output power amount.

(Supplemental Note 15)

The power supply system according to Supplemental Note 1, wherein the power supply control unit controls the auxiliary power supply unit to supply an output power when the power conversion efficiency of the main power supply unit is lower than a minimum power conversion efficiency that is a threshold for determining whether the auxiliary power supply unit supplies a power or not, calculates a total output power amount output for a given period of time in the auxiliary power supply unit, calculates a total charge power amount charged for a given period of time in the auxiliary power supply unit, and controls the minimum power conversion efficiency to increase when the calculated total charge power amount is larger than the calculated total output power amount.

(Supplemental Note 16)

The power supply system according to any one of Supplemental Note 3, wherein the power supply control unit stops the main power supply unit and supplies an output power of the auxiliary power supply unit to the load when the calculated first power conversion efficiency is lower than a given lower limit.

(Supplemental Note 17)

The power supply system according to Supplemental Note 16, wherein the power supply control unit detects a charge remaining amount of the power storage unit included in the auxiliary power supply unit, stops power supply performed by the auxiliary power supply unit when the detected charge remaining amount is smaller than a given lower limit capacity, and stops charge for the power storage unit in the auxiliary power supply unit when the detected charge remaining amount is larger than a given upper limit capacity.

(Supplemental Note 18)

A control method for a power supply system including:

measuring an output power output from at least one main power supply unit that converts an input power into an output power and supplies the output power to a load, and an output power output from an auxiliary power supply unit including a power storage unit capable of functioning as a power supply source;

calculating an optimal output power of the main power supply unit maximizing a power conversion efficiency in the main power supply unit in a given output adjustment range for the main power supply unit in accordance with the measured output power;

calculating an optimal output power or charge power of the auxiliary power supply unit based on the given output adjustment range;

controlling the main power supply unit based on the calculated optimal output power of the main power supply unit; and controlling the auxiliary power supply unit based on the calculated optimal output power or charge power of the auxiliary power supply unit.

(Supplemental Note 19)

A non-transitory computer-readable recording medium recorded with a control program for a power supply system causing a computer to execute:

a processing that measures an output power output from at least one main power supply unit that converts an input power into an output power and supplies the output power to a load, and an output power output from an auxiliary power supply unit including a power storage unit capable of functioning as a power supply source;

a processing that calculates an optimal output power of the main power supply unit maximizing a power conversion efficiency in the main power supply unit in a given output adjustment range for the main power supply unit in accordance with the measured output power;

a processing that calculates an optimal output power or charge power of the auxiliary power supply unit based on the given output adjustment range;

a processing that controls the main power supply unit based on the calculated optimal output power of the main power supply unit; and a processing that controls the auxiliary power supply unit based on the calculated optimal output power or charge power of the auxiliary power supply unit.

(Supplemental Note 20)

A power supply system including:

- a plurality of power supply units that convert an input power into an output power and supply the output power to a load;
- a power measurement unit, which is connected between an output side of the power supply units and the load, that measures the output power output from the power supply units; and
- a power supply control unit that calculates an optimal output power realizing a minimum input power to the power supply units in accordance with the output power measured by the power measurement unit, and controls the power supply units based on the calculated optimal output power.

(Supplemental Note 21)

The power supply system according to Supplemental Note 20, wherein the power supply control unit calculates the input power to the power supply units in accordance with the output power measured by the power measurement unit, based on an input-output conversion model expressing power conversion between input power to the power supply units and output power to be output from the power supply units.

(Supplemental Note 22)

The power supply system according to Supplemental Note 21, wherein the input-output conversion model is a quadratic function of the output power of the power supply unit.

(Supplemental Note 23)

The power supply system according to Supplemental Note 21, wherein the power measurement unit measures a sum of output powers of the plurality of power supply units to be consumed in the load, and the power supply control unit calculates an optimal output power realizing a minimum sum of input powers to the plurality of power supply units, based on the sum of the output powers measured by the power measurement unit, and the input-output conversion model with respect to each of the power supply units, and adjusts the output power of each of the power supply units, based on the calculated optimal output power.

(Supplemental Note 24)

The power supply system according to Supplemental Note 23, wherein in a condition that it is assumed that output powers of one or more specific power supply units included in the plurality of power supply units are equal to each other, and output powers of remaining power supply units are equal to each other, the power supply control unit calculates the optimal output power, for the each power supply unit, that realizes the minimum sum of input powers to the plurality of power supply units, and adjusts the output power of each of the power supply units, based on the calculated optimal output power.

(Supplemental Note 25)

The power supply system according to Supplemental Note 21, further including:

a power input unit, which a rated maximum output power is set, connected to an input side of the power supply units;

a drive circuit unit connected to the output side of the power supply units, the drive circuit unit being a load for which a rated maximum power consumption is set; and a device control unit, wherein the device control unit calculates the minimum sum of input power to the plurality of power supply units, by assuming that the rated maximum power consumption is consumed in the load, and compares between the calculated minimum sum of input power, and the rated maximum output power of the power input unit.

(Supplemental Note 26)

The power supply system according to Supplemental Note 20, wherein the power supply control unit controls the output power of the power supply units by adjusting output voltages of the plurality of power supply units.

(Supplemental Note 27)

The power supply system according to Supplemental Note 20, further including:

a battery unit on the output side of the power supply units.

(Supplemental Note 28)

A control method for a power supply system, including:

measuring output powers output from a plurality of power supply units that convert an input power into the output powers and supply the output powers to a load;

calculating an optimal output power for the power supply units realizing a minimum input power to the power supply units in accordance with the measured output powers; and controlling the power supply units based on the calculated optimal output power.

(Supplemental Note 29)

A non-transitory computer-readable storage medium recorded with a control program that controls an operation of a power supply system, the control program causing a computer to execute:

a process of acquiring a measurement result of output powers output from a plurality of power supply units;

a process of calculating an optimal output power realizing a minimum input power to be input to the power supply unit in accordance with the measurement result of output powers; and a process of controlling the output powers of the power supply units based on the calculated optimal output power.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A power supply system comprising:

at least one main power supply unit that converts an input power into an output power and supplies the output power to a load;

an auxiliary power supply unit that supplies an output power to the load, from a power storage unit capable of functioning as a power supply source;

a power measurement unit, that is connected between output sides of the main power supply unit and the auxiliary power supply unit and the load, that measures an output power output by the main power supply unit and the auxiliary power supply unit; and a power supply control unit that calculates an optimal output power of the main power supply unit that maximizes a power conversion efficiency of the main power supply unit in a given output adjustment range for the main power supply unit in accordance with the output power measured by the power measurement unit, calculates an optimal output power or charge power of the auxiliary power supply unit based on the given output adjustment range, controls the main power supply unit based on the calculated optimal output power of the main power supply unit, and controls the auxiliary power supply unit based on the calculated optimal output power or charge power of the auxiliary power supply unit.

2. The power supply system according to claim 1, wherein the power supply control unit calculates an input power to the main power supply unit in accordance with the output power measured by the power measurement unit based on an input-output conversion model expressing power conversion between an input power to the main power supply unit and an output power output from the main power supply unit.

3. The power supply system according to claim 2, wherein the power supply control unit detects a charge remaining amount of the power storage unit included in the auxiliary power supply unit, assigns the output power of the main power supply unit measured by the power measurement unit as a first output power, calculates a first input power to the main power supply unit based on the first output power and the input-output conversion model, calculates a first power conversion efficiency based on the first output power and the first input power, derives a second output power of the main power supply unit where the first output power is converted by using a given adjustment value falling within the given output adjustment range for the main power supply unit, calculates a second input power of the main power supply unit based on the second output power and the input-output conversion model, calculates a second power conversion efficiency based on the second output power and the second input power, and controls the output power of the main power supply unit and the output power or the charge power in the auxiliary power supply unit based on a result obtained by comparing the first power conversion efficiency and the second power conversion efficiency, and the detected charge remaining amount of the power storage unit.

4. The power supply system according to claim 3, wherein the power supply control unit charges the power storage unit included in the auxiliary power supply unit based on a power corresponding to the given adjustment value in an output power of the main power supply unit when the given adjustment value is a positive value, and controls power supply from the power storage unit included in the auxiliary power supply unit based on the given adjustment value when the given adjustment value is a negative value.

5. The power supply system according to claim 3, wherein the power supply control unit includes a conversion-characteristic-control unit that adjusts characteristics of a power conversion efficiency of the main power supply unit, and wherein the conversion-characteristic-control unit adjusts characteristics of a power conversion efficiency of the main power supply unit based on power consumption measured by the power measurement unit and the given adjustment value.

6. The power supply system according to claim 5, wherein the power supply control unit calculates a total output power amount output for a given period of time in the auxiliary power supply unit, and calculates a total charge power amount charged for a given period of time in the auxiliary power supply unit, and wherein the conversion-characteristic-control unit adjusts characteristics of the power conversion efficiency of the main power supply unit based on the calculated total output power amount and the calculated total charge power amount.

7. The power supply system according to claim 1, wherein the power supply control unit calculates a total output power amount output for a given period of time in the auxiliary power supply unit, calculates a total charge power amount charged for a given period of time in the auxiliary power supply unit, and controls a maximum output power in the auxiliary power supply unit to increase when the calculated total charge power amount is larger than the calculated total output power amount.

8. The power supply system according to claim 1, wherein the power supply control unit controls the auxiliary power supply unit to supply an output power when the power conversion efficiency of the main power supply unit is lower than a minimum power conversion efficiency that is a threshold for determining whether the auxiliary power supply unit supplies a power or not, calculates a total output power amount output for a given period of time in the auxiliary power supply unit, calculates a total charge power amount charged for a given period of time in the auxiliary power supply unit, and controls the minimum power conversion efficiency to increase when the calculated total charge power amount is larger than the calculated total output power amount.

9. A control method for a power supply system comprising:

measuring an output power output from at least one main power supply unit that converts an input power into an output power and supplies the output power to a load, and an output power output from an auxiliary power supply unit including a power storage unit capable of functioning as a power supply source;

calculating an optimal output power of the main power supply unit maximizing a power conversion efficiency in the main power supply unit in a given output adjustment range for the main power supply unit in accordance with the measured output power;

calculating an optimal output power or charge power of the auxiliary power supply unit based on the given output adjustment range;

controlling the main power supply unit based on the calculated optimal output power of the main power supply unit; and controlling the auxiliary power supply unit based on the calculated optimal output power or charge power of the auxiliary power supply unit.

10. A non-transitory computer-readable recording medium recorded with a control program for a power supply system causing a computer to execute:

a processing that measures an output power output from at least one main power supply unit that converts an input power into an output power and supplies the output power to a load, and an output power output from an auxiliary power supply unit including a power storage unit capable of functioning as a power supply source;

a processing that calculates an optimal output power of the main power supply unit maximizing a power conversion efficiency in the main power supply unit in a given output adjustment range for the main power supply unit in accordance with the measured output power;

a processing that calculates an optimal output power or charge power of the auxiliary power supply unit based on the given output adjustment range;

a processing that controls the main power supply unit based on the calculated optimal output power of the main power supply unit; and a processing that controls the auxiliary power supply unit based on the calculated optimal output power or charge power of the auxiliary power supply unit.

* * * * *